US011823232B2

(12) United States Patent
Badenhop

(10) Patent No.: US 11,823,232 B2
(45) Date of Patent: *Nov. 21, 2023

(54) MOBILE BILLBOARD STRUCTURE AND PLATFORM METHOD FOR SMARTPHONE APP MESSAGING SYSTEM INTERFACE

(71) Applicant: Henry Peter Badenhop, Monroe, NJ (US)

(72) Inventor: Henry Peter Badenhop, Monroe, NJ (US)

( * ) Notice: Subject to any disclaimer, the term of this patent is extended or adjusted under 35 U.S.C. 154(b) by 95 days.

This patent is subject to a terminal disclaimer.

(21) Appl. No.: 13/694,742

(22) Filed: Dec. 28, 2012

(65) Prior Publication Data

US 2014/0188616 A1    Jul. 3, 2014

(51) Int. Cl.
*G06Q 30/0251*    (2023.01)
(52) U.S. Cl.
CPC ................. *G06Q 30/0267* (2013.01)
(58) Field of Classification Search
CPC ........... G06Q 30/0269; G06Q 30/0251; G06Q 30/0261; G06Q 30/0267
USPC ...................... 705/14.58, 14.64, 14.66, 14.57
See application file for complete search history.

(56) References Cited

U.S. PATENT DOCUMENTS

| 6,128,651 | A | 10/2000 | Cezar | 709/217 |
|---|---|---|---|---|
| 6,414,635 | B1 * | 7/2002 | Stewart | H04L 67/04 342/463 |
| 6,774,797 | B2 * | 8/2004 | Freathy | G07C 9/28 340/8.1 |
| 7,181,468 | B2 | 2/2007 | Spring et al. | |
| 7,349,923 | B2 | 3/2008 | Spring et al. | 707/792 |
| 7,490,167 | B2 | 2/2009 | Pena et al. | 709/246 |
| 7,890,576 | B2 | 2/2011 | Button et al. | 709/203 |
| 7,970,944 | B2 | 6/2011 | Pena et al. | 709/246 |
| 8,122,051 | B2 | 2/2012 | Spring et al. | 707/770 |

(Continued)

FOREIGN PATENT DOCUMENTS

WO    WO-2012094465 A2 *    7/2012    ............. G06Q 10/10

OTHER PUBLICATIONS

Google, Location targeting, 2012 (Year: 2012).*

(Continued)

*Primary Examiner* — Tarek Elchanti
(74) *Attorney, Agent, or Firm* — Ernest D. Buff & Associates, LLC; Ernest D. Buff

(57) ABSTRACT

A method provides a mobile billboard messaging app and non-transitory computer readable electronic storage medium. The method includes a computer database electronically storing merchant/advertiser and user information in communication with a software application running in a mobile device of the user. The mobile device has GPS technology, a display screen and Internet connectivity. The method displays on the user's device messages from an advertiser that are logically related to user preferences when the user device is in a given location radius. Where a correlation is found, at least one message from the advertiser is displayed. The message is triggered when the device enters within the given radii from the advertiser. When triggered, the messaging app provides relevant real-time promotions, deals and coupons related to the user preferences. The mobile billboard displays target messages based on both the user's preferences and the user's geographical real-time location.

46 Claims, 61 Drawing Sheets

(56) References Cited

U.S. PATENT DOCUMENTS

| | | | | |
|---|---|---|---|---|
| 8,823,507 | B1* | 9/2014 | Touloumtzis | H04L 67/55 709/224 |
| 2004/0076177 | A1* | 4/2004 | Koch | H04W 52/0235 370/465 |
| 2005/0228719 | A1* | 10/2005 | Roberts | G06Q 30/0261 705/14.66 |
| 2006/0036493 | A1* | 2/2006 | Aufricht | G06Q 30/02 705/14.66 |
| 2008/0010133 | A1* | 1/2008 | Pyhalammi | G06Q 30/0257 705/14.66 |
| 2008/0059285 | A1 | 3/2008 | Hamoui | 705/14.69 |
| 2008/0059300 | A1 | 3/2008 | Hamoui | 705/14.64 |
| 2009/0058720 | A1* | 3/2009 | Shaw | H04W 4/029 342/450 |
| 2009/0281849 | A1 | 11/2009 | Choi | 705/7.29 |
| 2010/0100445 | A1 | 4/2010 | Flood et al. | 705/14.64 |
| 2011/0153432 | A1* | 6/2011 | Forbes | G06Q 30/0269 705/14.66 |
| 2012/0323687 | A1* | 12/2012 | Schuster | G06Q 30/0261 705/14.57 |
| 2013/0297416 | A1* | 11/2013 | Dipaola | H04W 12/065 705/14.58 |

OTHER PUBLICATIONS

"In the Age of the Smartphone Adds go Mobile" found at http://www.bits.blogs.nytimes.com/2012/03/07/the-beginning-of-an-era-as-social-ads-go-mobile/.

"Smartphone Advertising: Proof that Businesses Should do More with their Mobile Strategy" found at http://www.yourwebsitemarketingservice.com/smartphone-advertising/.

"Location & Mobile Advertising" found at http://www.sayitsocial.com/location-mobile-advertising/.

* cited by examiner

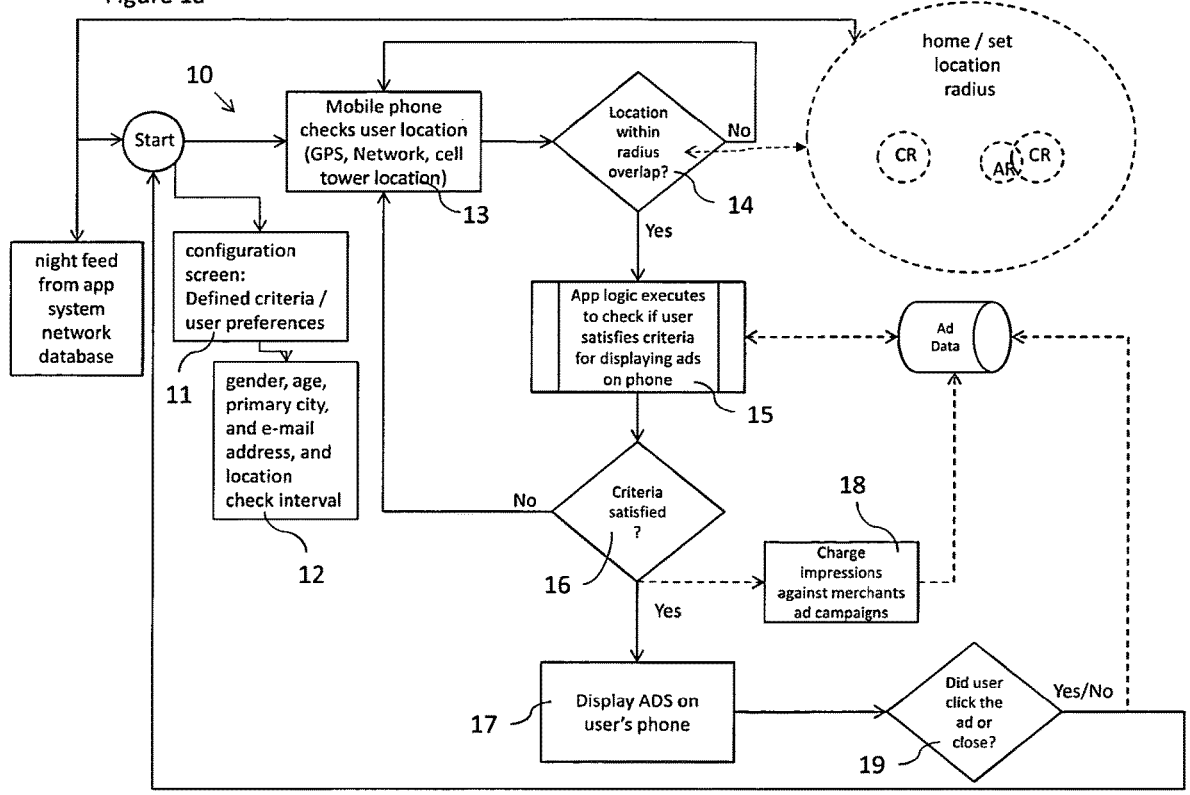

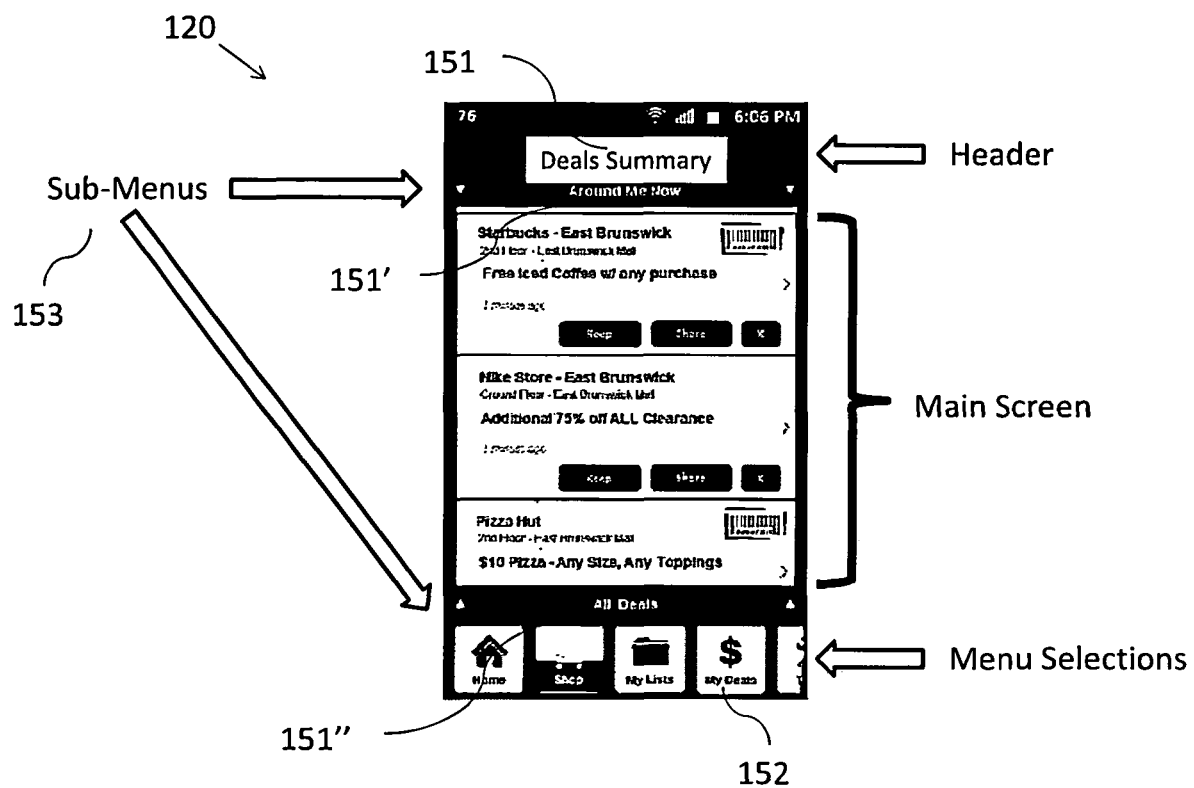

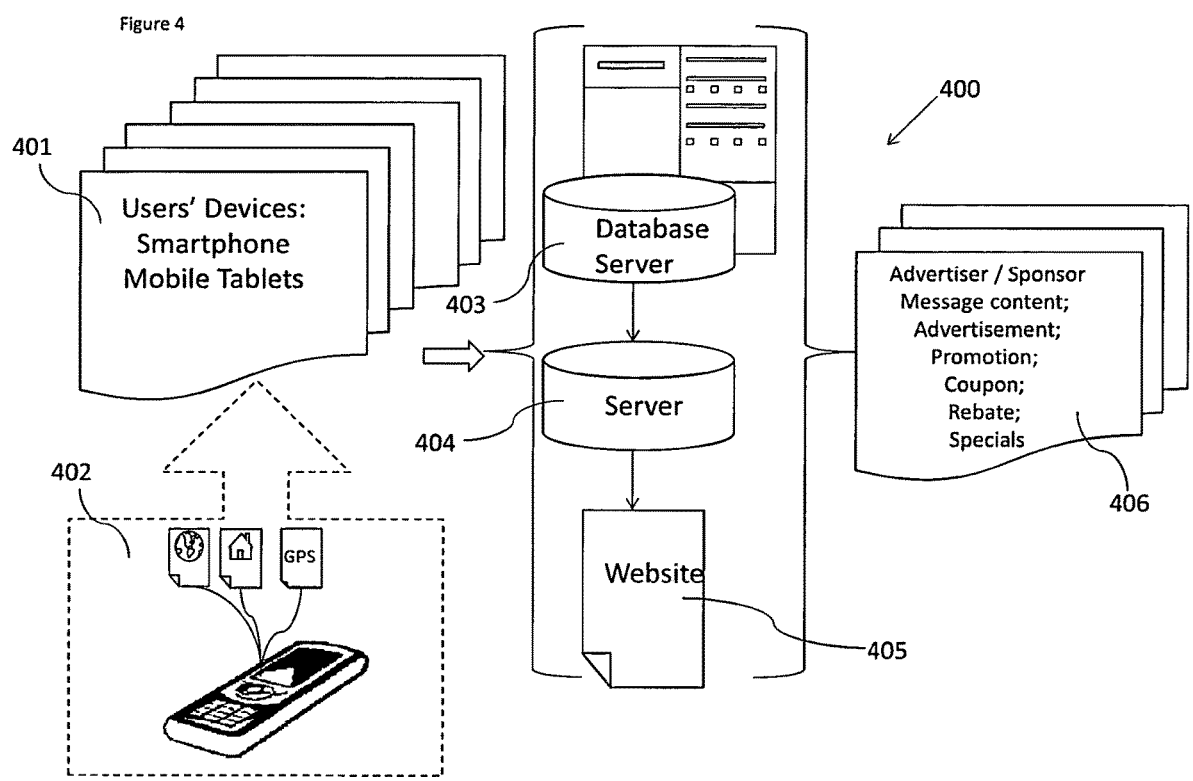

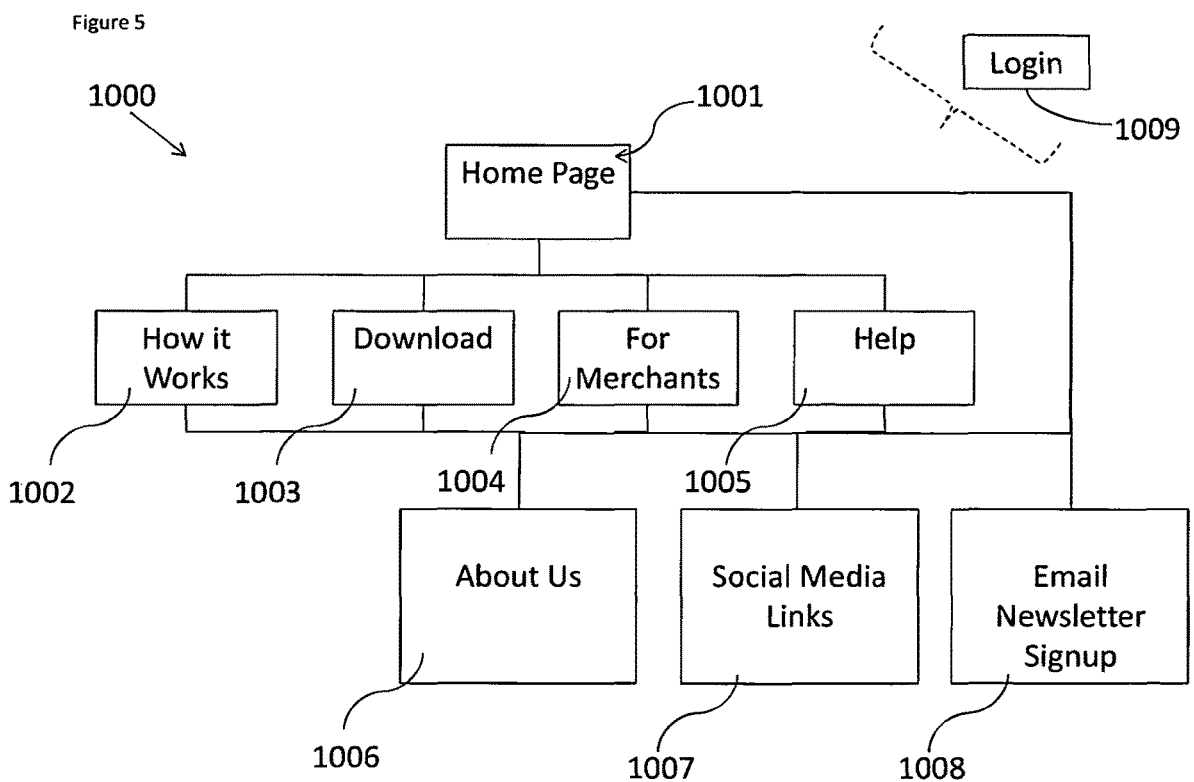

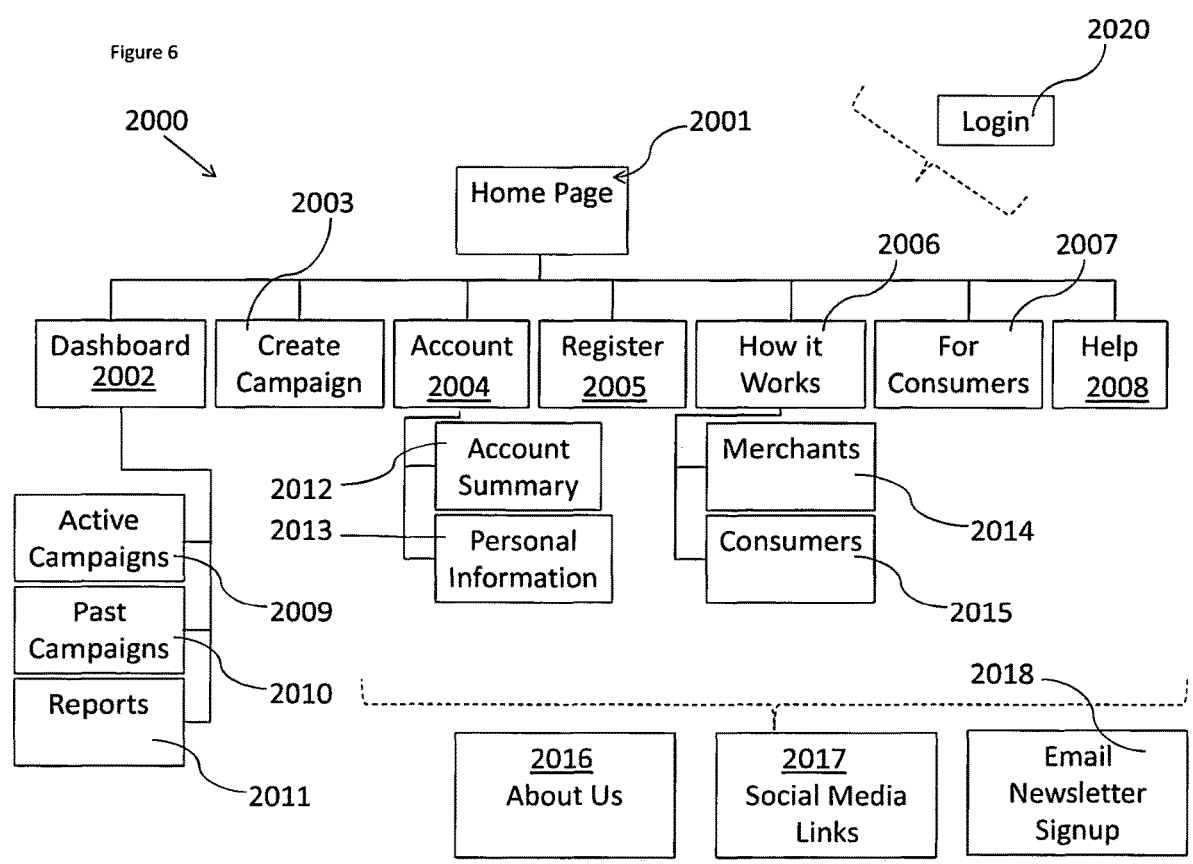

Determining MAIN route pattern stops:

| Time of Day | Period of the day |
|---|---|
| 7:00am – 10:00am | Morning |
| 10:00am – 11:00am | Mid-morning |
| 11:00am – 1:00pm | Noon |
| 1:00pm – 4:00pm | Early afternoon |
| 4:00pm – 7:00pm | Afternoon |
| 7:00pm – 9:00pm | Evening |
| 9:00pm – 7:00am | Night |

7079

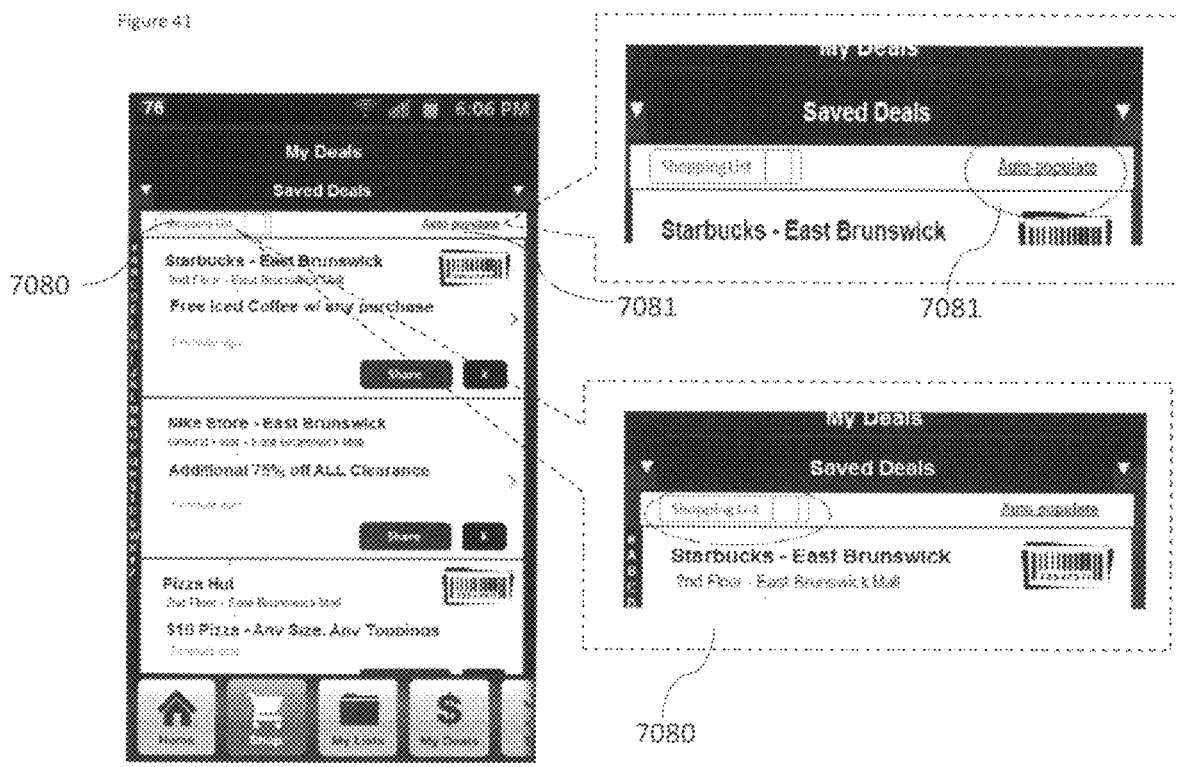

Figure 42

Global Configuration Variables Table

| Variable Key | Variable Name | Value |
|---|---|---|
| 0 | Minimum Ad Impressions Limit | 10000 |
| 1 | Maximum Ad Impressions Limit | No Limit |
| 2 | Minimum Ad Duration Limit | 2 |
| 3 | Maximum Ad Duration Limit | 365 |
| 4 | Minimum Ad Budget Limit | 100 |
| 5 | Maximum Ad Budget Limit | No Limit |
| 6 | Currency | $ |
| 7 | Near Cities Live Query Radius | 25 |
| 8 | Minimum Campaign Radius | 1 |
| 9 | Maximum Campaign Radius | 10 |
| 10 | Minimum No. of Kids Limit | 0 |
| 11 | Maximum No. of Kids Limit | 20 |
| 12 | Minimum Notifications to Add New Location | 10 |
| 13 | Location Check Interval (*** in minutes) | 10 |
| 14 | Main Route Qualifier (*** in minutes) | 240 |
| 15 | Days to Tag as Main Location | 5 |
| 16 | Minimum Ranking bid | 0.02 |
| 17 | Took the Deal | 75 |
| 18 | Auto-populate Radius (in miles) | 3 |

Figure 43

Campaign Model Table

| CM_Key | CModel |
|---|---|
| 0 | Standard |
| 1 | Broadcast |
| 2 | Non-Location |
| 3 | Tag-Along |
| 4 | Around the Neighborhood |

Figure 44

Campaign Radius Table

| CR_Key | CRadius |
|---|---|
| 0 | 1 |
| 1 | 2 |
| 2 | 3 |
| 3 | 4 |
| 4 | 5 |
| 5 | 6 |
| 6 | 7 |
| 7 | 8 |
| 8 | 9 |
| 9 | 10 |
| 10 | Don't Care |

Gender Table

| Gender_Key | Gender |
|---|---|
| 0 | All |
| 1 | Male |
| 2 | Female |

Figure 45

Marital Status Table

| MStatus_Key | Marital Status |
|---|---|
| 0 | Single |
| 1 | Married |
| 2 | Separated |
| 3 | Don't Care |

No. of Children Table

| KidsCount_Key | Kids Count |
|---|---|
| 0 | All |
| 1 | 1 |
| 2 | More than 1 |
| 3 | 0 |

Figure 48

Target App User Age Count Table

| TAC Key | Age Count | Age Type |
|---|---|---|
| 0 | All | Specific |
| 1 | 1 | Specific |
| 2 | More than 1 | Specific |
| 3 | All | Range |
| 4 | 1 | Range |
| 5 | More than 1 | Range |

Figure 49

Children Age Count Table

| CAC Key | Children Age Count | Age Type |
|---|---|---|
| 0 | All | Specific |
| 1 | 1 | Specific |
| 2 | More than 1 | Specific |
| 3 | All | Range |
| 4 | 1 | Range |
| 5 | More than 1 | Range |

Figure 50

Pricing Table

| Price Key | Price |
|---|---|
| 0 | 3.97 |
| 1 | 5.54 |
| 2 | 4.05 |
| 3 | 4.52 |
| 4 | 3.99 |
| 5 | 0.15 |
| 6 | 0.05 |
| 7 | 0.01 |
| 8 | 0.00 |
| 9 | 0.02 |
| 10 | 0.03 |
| 11 | 0.005 |

Offensive Words Table

| Offensive Key | Word |
|---|---|
| Refer to http://onlineslangdictionary.com/lists/most-vulgar-words/ for the initial list | |

Figure 51a

| Time of Day | DayCounterA | CounterA | LearningPeriodFlagA | DayLocationA | MainLocationA |
|---|---|---|---|---|---|
| 6:50 am | 0 | 0 | 0 | null | null |
| 7:00 am | 1 | 1 | 1 | Old Bridge, NJ | null |
| 7:10 am | 1 | 2 | 1 | Old Bridge, NJ | null |
| 7:20 am | 1 | 3 | 1 | Old Bridge, NJ | null |
| 7:30 am | 1 | 4 | 1 | Old Bridge, NJ | null |
| 7:40 am | 1 | 5 | 1 | Old Bridge, NJ | null |
| 7:50 am | 1 | 6 | 1 | Old Bridge, NJ | null |
| 8:00 am | 1 | 7 | 1 | Old Bridge, NJ | null |
| 8:10 am | 1 | 0 | 1 | >1 from Old Bridge | null |
| 8:20 am | 1 | 0 | 1 | East Brunswick | null |
| 8:30 am | 1 | 0 | 1 | >1 East Brunswick | null |
| 8:40 am | 1 | 0 | 1 | Edison, NJ | null |
| 8:50 am | 1 | 0 | 1 | >1 Edison, NJ | null |
| 9:00 am | 1 | 0 | 1 | Woodbridge, NJ | null |
| 9:10 am | 1 | 1 | 1 | Woodbridge, NJ | null |
| 9:20 am | 1 | 2 | 1 | Woodbridge, NJ | null |
| 9:30 am | 1 | 3 | 1 | Woodbridge, NJ | null |
| 9:40 am | 1 | 4 | 1 | Woodbridge, NJ | null |
| 9:50 am | 1 | 5 | 1 | Woodbridge, NJ | null |
| 10:00 am | 1 | 6 | 1 | Woodbridge, NJ | null |
| 10:10 am | 1 | 7 | 1 | Woodbridge, NJ | null |
| 10:20 am | 1 | 8 | 1 | Woodbridge, NJ | null |
| 10:30 am | 1 | 9 | 1 | Woodbridge, NJ | null |
| 10:40 am | 1 | 10 | 1 | Woodbridge, NJ | null |
| 10:50 am | 1 | 11 | 1 | Woodbridge, NJ | null |
| 11:00 am | 1 | 12 | 1 | Woodbridge, NJ | null |
| 11:10 am | 1 | 13 | 1 | Woodbridge, NJ | null |
| 11:20 am | 1 | 14 | 1 | Woodbridge, NJ | null |
| 11:30 am | 1 | 15 | 1 | Woodbridge, NJ | null |
| 11:40 am | 1 | 16 | 1 | Woodbridge, NJ | null |
| 11:50 am | 1 | 17 | 1 | Woodbridge, NJ | null |
| 12:00 pm | 1 | 18 | 1 | Woodbridge, NJ | null |
| 12:10 pm | 1 | 19 | 1 | Woodbridge, NJ | null |
| 12:20 pm | 1 | 20 | 1 | Woodbridge, NJ | null |
| 12:30 pm | 1 | 21 | 1 | Woodbridge, NJ | null |
| 12:40 pm | 1 | 22 | 1 | Woodbridge, NJ | null |
| 12:50 pm | 1 | 23 | 1 | Woodbridge, NJ | null |
| 1:00 pm | 1 | 24 | 1 | Woodbridge, NJ | null |
| 1:10 pm | 1 | 0 | 0 | Woodbridge, NJ | Woodbridge, NJ |
| 1:20 pm | 1 | 0 | 0 | Woodbridge, NJ | Woodbridge, NJ |
| 1:30 pm | 1 | 0 | 0 | Woodbridge, NJ | Woodbridge, NJ |
| 1:40 pm | 1 | 0 | 0 | Woodbridge, NJ | Woodbridge, NJ |
| 1:50 pm | 1 | 0 | 0 | Woodbridge, NJ | Woodbridge, NJ |
| 2:00 pm | 1 | 0 | 0 | Woodbridge, NJ | Woodbridge, NJ |
| 2:10 pm | 1 | 0 | 0 | Woodbridge, NJ | Woodbridge, NJ |
| 2:20 pm | 1 | 0 | 0 | Woodbridge, NJ | Woodbridge, NJ |

Figure 51b

| Time | | | | | |
|------|---|---|---|---|---|
| 2:30 pm | 1 | 0 | 0 | Woodbridge, NJ | Woodbridge, NJ |
| 2:40 pm | 1 | 0 | 0 | Woodbridge, NJ | Woodbridge, NJ |
| 2:50 pm | 1 | 0 | 0 | Woodbridge, NJ | Woodbridge, NJ |
| 3:00 pm | 1 | 0 | 0 | >1 Woodbridge, NJ | Woodbridge, NJ |
| 3:10 pm | 1 | 0 | 0 | Edison, NJ | Woodbridge, NJ |
| 3:20 pm | 1 | 0 | 0 | >1 Edison, NJ | Woodbridge, NJ |
| 3:30 pm | 1 | 0 | 0 | East Brunswick | Woodbridge, NJ |
| 3:40 pm | 1 | 0 | 0 | >1 East Brunswick | Woodbridge, NJ |
| 3:50 pm | 1 | 0 | 0 | Old Bridge, NJ | Woodbridge, NJ |
| 4:00 pm | 1 | 0 | 0 | Old Bridge, NJ | Woodbridge, NJ |
| 4:10 pm | 1 | 0 | 0 | Old Bridge, NJ | Woodbridge, NJ |
| 4:20 pm | 1 | 0 | 0 | Old Bridge, NJ | Woodbridge, NJ |
| 4:30 pm | 1 | 0 | 0 | Old Bridge, NJ | Woodbridge, NJ |
| 4:40 pm | 1 | 0 | 0 | Old Bridge, NJ | Woodbridge, NJ |
| 4:50 pm | 1 | 0 | 0 | Old Bridge, NJ | Woodbridge, NJ |
| 5:00 pm | 1 | 0 | 0 | Old Bridge, NJ | Woodbridge, NJ |
| 5:10 pm | 1 | 0 | 0 | Old Bridge, NJ | Woodbridge, NJ |
| 5:20 pm | 1 | 0 | 0 | Old Bridge, NJ | Woodbridge, NJ |
| 5:30 pm | 1 | 0 | 0 | Old Bridge, NJ | Woodbridge, NJ |
| 5:40 pm | 1 | 0 | 0 | Old Bridge, NJ | Woodbridge, NJ |
| 5:50 pm | 1 | 0 | 0 | Old Bridge, NJ | Woodbridge, NJ |
| 6:00 pm | 1 | 0 | 0 | Old Bridge, NJ | Woodbridge, NJ |
| 6:10 pm | 1 | 0 | 0 | Old Bridge, NJ | Woodbridge, NJ |
| 6:20 pm | 1 | 0 | 0 | Old Bridge, NJ | Woodbridge, NJ |
| 6:30 pm | 1 | 0 | 0 | Old Bridge, NJ | Woodbridge, NJ |
| 6:40 pm | 1 | 0 | 0 | Old Bridge, NJ | Woodbridge, NJ |
| 6:50 pm | 1 | 0 | 0 | Old Bridge, NJ | Woodbridge, NJ |
| 7:00 pm | 1 | 0 | 0 | Old Bridge, NJ | Woodbridge, NJ |
| 7:10 pm | 1 | 0 | 0 | Old Bridge, NJ | Woodbridge, NJ |
| 7:20 pm | 1 | 0 | 0 | Old Bridge, NJ | Woodbridge, NJ |
| 7:30 pm | 1 | 0 | 0 | Old Bridge, NJ | Woodbridge, NJ |
| 7:40 pm | 1 | 0 | 0 | Old Bridge, NJ | Woodbridge, NJ |
| 7:50 pm | 1 | 0 | 0 | Old Bridge, NJ | Woodbridge, NJ |
| 8:00 pm | 1 | 0 | 0 | Old Bridge, NJ | Woodbridge, NJ |
| 8:10 pm | 1 | 0 | 0 | Old Bridge, NJ | Woodbridge, NJ |
| 8:20 pm | 1 | 0 | 0 | Old Bridge, NJ | Woodbridge, NJ |
| 8:30 pm | 1 | 0 | 0 | Old Bridge, NJ | Woodbridge, NJ |
| 8:40 pm | 1 | 0 | 0 | Old Bridge, NJ | Woodbridge, NJ |
| 8:50 pm | 1 | 0 | 0 | Old Bridge, NJ | Woodbridge, NJ |
| 9:00 pm | 1 | 0 | 0 | Old Bridge, NJ | Woodbridge, NJ |
| 9:10 pm | 1 | 0 | 0 | Old Bridge, NJ | Woodbridge, NJ |
| 9:20 pm | 1 | 0 | 0 | Old Bridge, NJ | Woodbridge, NJ |
| 9:30 pm | 1 | 0 | 0 | Old Bridge, NJ | Woodbridge, NJ |
| 9:40 pm | 1 | 0 | 0 | Old Bridge, NJ | Woodbridge, NJ |
| 9:50 pm | 1 | 0 | 0 | Old Bridge, NJ | Woodbridge, NJ |
| 10:00 pm | 1 | 0 | 0 | Old Bridge, NJ | Woodbridge, NJ |
| 10:10 pm | 1 | 0 | 0 | Old Bridge, NJ | Woodbridge, NJ |

Figure 51c

| Time | | | | From | To |
|---|---|---|---|---|---|
| 10:20 pm | 1 | 0 | 0 | Old Bridge, NJ | Woodbridge, NJ |
| 10:30 pm | 1 | 0 | 0 | Old Bridge, NJ | Woodbridge, NJ |
| 10:40 pm | 1 | 0 | 0 | Old Bridge, NJ | Woodbridge, NJ |
| 10:50 pm | 1 | 0 | 0 | Old Bridge, NJ | Woodbridge, NJ |
| 11:00 pm | 1 | 0 | 0 | Old Bridge, NJ | Woodbridge, NJ |
| 11:10 pm | 1 | 0 | 0 | Old Bridge, NJ | Woodbridge, NJ |
| 11:20 pm | 1 | 0 | 0 | Old Bridge, NJ | Woodbridge, NJ |
| 11:30 pm | 1 | 0 | 0 | Old Bridge, NJ | Woodbridge, NJ |
| 11:40 pm | 1 | 0 | 0 | Old Bridge, NJ | Woodbridge, NJ |
| 11:50 pm | 1 | 0 | 0 | Old Bridge, NJ | Woodbridge, NJ |
| 12:00 am | 1 | 0 | 0 | Old Bridge, NJ | Woodbridge, NJ |
| 12:10 am | 1 | 0 | 0 | Old Bridge, NJ | Woodbridge, NJ |
| 12:20 am | 1 | 0 | 0 | Old Bridge, NJ | Woodbridge, NJ |
| 12:30 am | 1 | 0 | 0 | Old Bridge, NJ | Woodbridge, NJ |
| 12:40 am | 1 | 0 | 0 | Old Bridge, NJ | Woodbridge, NJ |
| 12:50 am | 1 | 0 | 0 | Old Bridge, NJ | Woodbridge, NJ |
| 1:00 am | 1 | 0 | 0 | Old Bridge, NJ | Woodbridge, NJ |
| 1:10 am | 1 | 0 | 0 | Old Bridge, NJ | Woodbridge, NJ |
| 1:20 am | 1 | 0 | 0 | Old Bridge, NJ | Woodbridge, NJ |
| 1:30 am | 1 | 0 | 0 | Old Bridge, NJ | Woodbridge, NJ |
| 1:40 am | 1 | 0 | 0 | Old Bridge, NJ | Woodbridge, NJ |
| 1:50 am | 1 | 0 | 0 | Old Bridge, NJ | Woodbridge, NJ |
| 2:00 am | 1 | 0 | 0 | Old Bridge, NJ | Woodbridge, NJ |
| 2:10 am | 1 | 0 | 0 | Old Bridge, NJ | Woodbridge, NJ |
| 2:20 am | 1 | 0 | 0 | Old Bridge, NJ | Woodbridge, NJ |
| 2:30 am | 1 | 0 | 0 | Old Bridge, NJ | Woodbridge, NJ |
| 2:40 am | 1 | 0 | 0 | Old Bridge, NJ | Woodbridge, NJ |
| 2:50 am | 1 | 0 | 0 | Old Bridge, NJ | Woodbridge, NJ |
| 3:00 am | 1 | 0 | 0 | Old Bridge, NJ | Woodbridge, NJ |
| 3:10 am | 1 | 0 | 0 | Old Bridge, NJ | Woodbridge, NJ |
| 3:20 am | 1 | 0 | 0 | Old Bridge, NJ | Woodbridge, NJ |
| 3:30 am | 1 | 0 | 0 | Old Bridge, NJ | Woodbridge, NJ |
| 3:40 am | 1 | 0 | 0 | Old Bridge, NJ | Woodbridge, NJ |
| 3:50 am | 1 | 0 | 0 | Old Bridge, NJ | Woodbridge, NJ |
| 4:00 am | 1 | 0 | 0 | Old Bridge, NJ | Woodbridge, NJ |
| 4:10 am | 1 | 0 | 0 | Old Bridge, NJ | Woodbridge, NJ |
| 4:20 am | 1 | 0 | 0 | Old Bridge, NJ | Woodbridge, NJ |
| 4:30 am | 1 | 0 | 0 | Old Bridge, NJ | Woodbridge, NJ |
| 4:40 am | 1 | 0 | 0 | Old Bridge, NJ | Woodbridge, NJ |
| 4:50 am | 1 | 0 | 0 | Old Bridge, NJ | Woodbridge, NJ |
| 5:00 am | 1 | 0 | 0 | Old Bridge, NJ | Woodbridge, NJ |
| 5:10 am | 1 | 0 | 0 | Old Bridge, NJ | Woodbridge, NJ |
| 5:20 am | 1 | 0 | 0 | Old Bridge, NJ | Woodbridge, NJ |
| 5:30 am | 1 | 0 | 0 | Old Bridge, NJ | Woodbridge, NJ |
| 5:40 am | 1 | 0 | 0 | Old Bridge, NJ | Woodbridge, NJ |
| 5:50 am | 1 | 0 | 0 | Old Bridge, NJ | Woodbridge, NJ |
| 6:00 am | 1 | 0 | 0 | Old Bridge, NJ | Woodbridge, NJ |

Figure 51d

| | | | | | |
|---|---|---|---|---|---|
| 6:10 am | 1 | 0 | 0 | Old Bridge, NJ | Woodbridge, NJ |
| 6:20 am | 1 | 0 | 0 | Old Bridge, NJ | Woodbridge, NJ |
| 6:30 am | 1 | 0 | 0 | Old Bridge, NJ | Woodbridge, NJ |
| 6:40 am | 1 | 0 | 0 | Old Bridge, NJ | Woodbridge, NJ |

Figure 51e

| DayCounterB | CounterB | LearningPeriodFlagB | DayLocationB | MainLocationB |
|---|---|---|---|---|
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |
| 0 | 0 | 0 | null | null |

Figure 51f

| | | | | |
|---|---|---|---|---|
| 0 | 0 | 0 | null | null |
| 0 | 0 | 0 | null | null |
| 0 | 0 | 0 | null | null |
| 1 | 1 | 1 | >1 Woodbridge, NJ | null |
| 1 | 0 | 1 | Edison, NJ | null |
| 1 | 0 | 1 | >1 Edison, NJ | null |
| 1 | 0 | 1 | East Brunswick | null |
| 1 | 0 | 1 | >1 East Brunswick | null |
| 1 | 0 | 1 | Old Bridge, NJ | null |
| 1 | 1 | 1 | Old Bridge, NJ | null |
| 1 | 2 | 1 | Old Bridge, NJ | null |
| 1 | 3 | 1 | Old Bridge, NJ | null |
| 1 | 4 | 1 | Old Bridge, NJ | null |
| 1 | 5 | 1 | Old Bridge, NJ | null |
| 1 | 6 | 1 | Old Bridge, NJ | null |
| 1 | 7 | 1 | Old Bridge, NJ | null |
| 1 | 8 | 1 | Old Bridge, NJ | null |
| 1 | 9 | 1 | Old Bridge, NJ | null |
| 1 | 10 | 1 | Old Bridge, NJ | null |
| 1 | 11 | 1 | Old Bridge, NJ | null |
| 1 | 12 | 1 | Old Bridge, NJ | null |
| 1 | 13 | 1 | Old Bridge, NJ | null |
| 1 | 14 | 1 | Old Bridge, NJ | null |
| 1 | 15 | 1 | Old Bridge, NJ | null |
| 1 | 16 | 1 | Old Bridge, NJ | null |
| 1 | 17 | 1 | Old Bridge, NJ | null |
| 1 | 18 | 1 | Old Bridge, NJ | null |
| 1 | 19 | 1 | Old Bridge, NJ | null |
| 1 | 20 | 1 | Old Bridge, NJ | null |
| 1 | 21 | 1 | Old Bridge, NJ | null |
| 1 | 22 | 1 | Old Bridge, NJ | null |
| 1 | 23 | 1 | Old Bridge, NJ | null |
| 1 | 24 | 1 | Old Bridge, NJ | null |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |

Figure 51g

| | | | | |
|---|---|---|---|---|
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |

Figure 51h

| | | | | |
|---|---|---|---|---|
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |
| 1 | 0 | 0 | Old Bridge, NJ | Old Bridge, NJ |

Figure 52a

Ave CPM 2011                                                3.97
CPI                                                           0.00397

CPI Cost
CPM Cost

| | Primary Campaign Setup (can only select one of the ff) | | | |
|---|---|---|---|---|
| Pricing Model | Standard (one location, max radius 3 miles) | | Broadcast (send to all, no other criteria) | |
| | CPM | CPI | CPM | CPI |
| Base Cost | $3.97 | 0.00397 | $5.54 | 0.00554 |
| | | | | |
| Ranking bids (added to total CPI to increase ranking position) | | | | minir |
| | | | | |
| Only against competitors | $0.10 | 0.0001 | | |
| | | | | |
| Stop Tag-Along Bid (added to total CPI to try to eliminate tag-alongs) | minimum bid is $0.00002 CPI ($.02 CPM) or whatever the higl | | | |
| Tag-Along Bid (added to total CPI) | | | | |
| | | | | |
| Membership Program Options | | | | |
| - only send to members | | | | |
| - members and non-members | | | | |
| - | | | | |
| | | | | |
| Location options | | | | |
| - additional location | $0.15 | 0.00015 | | |
| - each additional 1 mile radius increase/decrease (per location) max. 10 mile total radius from center | $0.05 | 0.00005 | | |
| - additional Primary City | | | | |
| - each additional 1 mile radius increase | | | | |
| | | | | |
| Main Demographic Fields options | | | | |
| - target specific Gender (i.e. female only, male only) | $0.05 | 0.00005 | | |
| - target specific status | | | | |
| - single only, married only, separated, etc | $0.05 | 0.00005 | | |
| - target specific age or age groups | | | | |

Figure 52b

| | | |
|---|---|---|
| - specific age (user enters age value) | $0.05 | 0.00005 |
| - each additional specific age value | $0.01 | 0.00001 |
| - Age range (user enters low and high age value) | $0.05 | 0.00005 |
| - each additional age range | $0.01 | 0.00001 |
| | | |
| Keywords options | | |
| - 0 - 1 keyword - NO CHARGE optional | $0.00 | 0 |
| - 0 - 1 keyword - mandatory | $0.02 | 0.00002 |
| - each additional keyword (optional) | $0.01 | 0.00001 |
| - each additional keyword (mandatory) | $0.03 | 0.00003 |
| | | |
| Other options | | |
| - Only those with kids | | |
| - only 1 kid, 2 kids, 3 or more | $0.05 | 0.00005 |
| - kids ages (if don't select multiples and more than 1 kid selected, then all kids checked for only the age selected) | | |
| - infants (6 weeks - 12 months) | $0.01 | 0.00001 |
| - woddlers (12-18 months) | $0.01 | 0.00001 |
| - toddlers (18 months - 2 yrs) | $0.01 | 0.00001 |
| - preschool (2-3 yrs) | $0.01 | 0.00001 |
| - preschool2 (3-4 yrs) | $0.01 | 0.00001 |
| - pre-K (4-5 yrs) | $0.01 | 0.00001 |
| - aged 6 - 11 | $0.01 | 0.00001 |
| - aged 12 - 16 | $0.01 | 0.00001 |
| - aged 16-18 | $0.01 | 0.00001 |
| - aged 18-21 | $0.01 | 0.00001 |
| - aged 22-26 | $0.01 | 0.00001 |
| - aged 26+ | $0.01 | 0.00001 |
| | | |
| - report number of missed prospects | $0.00 | 0 |
| - report specific criteria not satisfied for missed prospects (cost is per missed prospect) | $0.01 | 0.00001 |
| - report specific criteria met to satisfy triggers | | |

Figure 52c

Example 1
$0.00458
$4.58000

| Primary Campaign Setup (can only select one of the ff) | | | | | |
|---|---|---|---|---|---|
| Non-location campaign (can select anything except location options) | | Tag-along (broadcast. Attach to random active campaigns) | | Around the Neighborhood (pick a Primary City, max radius 3 miles) | |
| CPM | CPI | CPM | CPI | CPM | CPI |
| $4.05 | 0.00405 | $4.52 | 0.00452 | $3.99 | 0.00399 |
| | | | | | |
| minimum bid is $0.00002 CPI ($.02 CPM) | | | | | |
| | | | | | |
| $0.10 | 0.0001 | $0.10 | 0.0001 | $0.10 | 0.0001 |
| highest Tag-Along Bid value is | | ■ | ■ | minimum bid is $0.00002 CPI ($.02 CPM) or whatever the highest Tag-Along Bid value is | |
| ■ | ■ | minimum = whatever the highest Stop Tag-Along Bid is; or if none, minimum bid is $0.00002 CPI ($.02 CPM) | | ■ | ■ |

$0.00397

$0.00015
$0.00005

| | | | | $0.15 | 0.00015 |
| | | | | $0.05 | 0.00005 |
| $0.05 | 0.00005 | | | $0.05 | 0.00005 |
| $0.05 | 0.00005 | | | $0.05 | 0.00005 |

| | | | | | | |
|---|---|---|---|---|---|---|
| $0.05 | 0.00005 | | | $0.05 | 0.00005 | $0.00005 |
| $0.01 | 0.00001 | | | $0.01 | 0.00001 | |
| $0.05 | 0.00005 | | | $0.05 | 0.00005 | $0.00005 |
| $0.01 | 0.00001 | | | $0.01 | 0.00001 | |
| | | | | | | |
| | | | | | | |
| $0.00 | 0 | | | $0.00 | 0 | |
| $0.02 | 0.00002 | $0.02 | 0.00002 | $0.02 | 0.00002 | |
| $0.01 | 0.00001 | | | $0.01 | 0.00001 | |
| $0.03 | 0.00003 | $0.03 | 0.00003 | $0.03 | 0.00003 | |
| | | | | | | |
| | | | | | | |
| | | | | | | |
| $0.05 | 0.00005 | | | $0.05 | 0.00005 | $0.00005 |
| | | | | | | |
| $0.01 | 0.00001 | | | $0.01 | 0.00001 | $0.00001 |
| $0.01 | 0.00001 | | | $0.01 | 0.00001 | |
| $0.01 | 0.00001 | | | $0.01 | 0.00001 | |
| $0.01 | 0.00001 | | | $0.01 | 0.00001 | |
| $0.01 | 0.00001 | | | $0.01 | 0.00001 | |
| $0.01 | 0.00001 | | | $0.01 | 0.00001 | |
| $0.01 | 0.00001 | | | $0.01 | 0.00001 | $0.00001 |
| $0.01 | 0.00001 | | | $0.01 | 0.00001 | |
| $0.01 | 0.00001 | | | $0.01 | 0.00001 | |
| $0.01 | 0.00001 | | | $0.01 | 0.00001 | |
| $0.01 | 0.00001 | | | $0.01 | 0.00001 | |
| $0.01 | 0.00001 | | | $0.01 | 0.00001 | |
| | | | | | | |
| $0.00 | 0 | $0.01 | 0.00001 | $0.00 | 0 | |
| $0.01 | 0.00001 | $0.02 | 0.00002 | $0.01 | 0.00001 | |
| | | $0.01 | 0.00001 | | | |

Figure 52e

| assumptions | |
|---|---|
| no. of end-users | 100000 |
| cost per ad campaign | #REF! |
| total impressions/month | #REF! |
| CPM | $4.58 |
| annual revenue | #REF! |

MOBILE BILLBOARD STRUCTURE AND PLATFORM METHOD FOR SMARTPHONE APP MESSAGING SYSTEM INTERFACE

BACKGROUND OF THE INVENTION

1. Field of the Invention

The present invention relates to a mobile structure and platform method for supporting Internet messaging systems; and, more particularly, to a mobile messaging structure and platform method that communicates with a Smartphone, tablet or mobile device, or stationary device, having Internet connectivity and GPS technology, to display a mobile app.

2. Description of the Prior Art

Advertising revenue has become a driving business force in today's business market. Electronic devices have been increasingly employed in the advertising forum, including advertising on computers and mobile devices, such as Smartphones and tablets. The vast majority of advertising platforms and models utilizing such devices randomly provide advertisements with web page links, email links, and contemporaneously with mobile applications and games, or via spam in email. Other advertising platforms utilize tracking algorithms or phishing methods to track consumer's web site searches and visits to attempt to provide advertising geared toward the consumer. Discussions generally concerning these phishing type methods are generally found in the following articles: "In the Age of the Smartphone, Ads Go Mobile" found at http://bits.blogs.nytimes.com/2012/03/07/the-beginning-of-an-era-as-social-ads-go-mobile/ which discusses tracking user's web site visits for targeting advertisements; "Smartphone Advertising: Proof that Businesses Should Do More with their Mobile Strategy" found at http://yourwebsitemarketingservice.com/smartphone-advertising/ which discusses Smartphone advertising as the most successful way for businesses to advertise a message in this on-the-go, short-attention-spanned-society that demands instant gratification and real-time information; "Location & Mobile Advertising" found at http://www.sayitsocial.com/location-mobile-advertising/discussing criticality of location based, and mobile (Smartphone) advertising for marketing online business, including digital advertising under trade names Google AdMob, Apple iAd mobile advertising network, location based advertising on Foursquare, Gowalla, Facebook and advertising platforms.

Examples of advertising platforms utilizing phishing for advertisements for mobile devices are provided herein below.

U.S. Pat. No. 6,128,651 to Cezar discloses a non-scrolling ad display lodged in a website. Browsers hitting the website are caused to undertake centrally controlled and recorded ad display for guaranteed minimum timed intervals. The system enables precise controlled advertising to each web page viewing browser and accurate advertising budgeting and programming which can be monitored and upgraded to meet marketing needs. The components participating in the system include a website at a webserver for transmitting a page with code for installing a non-scrolling ad frame. Ad content for the non-scrolling ad frame each have individual timers for timing out, commencing with display at the browser and an Internet address for fetching by the browser.

U.S. Patent Application Publication No. 20100100445 to Flood et al. discloses a method and system for targeting online advertisements including receiving a request for an advertisement from a publisher, wherein the request includes an identifying data uniquely associated with a user. The method includes sending a response to the publisher, wherein the response includes the advertisement and an image URL. The method includes receiving a request for the image identified by the image URL and a unique user cookie from the user. If the identifying data has been previously received, the method includes determining a unique user identifier associated with the user from the identifying data. If the identifying data has not been previously received, the method includes determining the unique user identifier associated with the user from the unique user cookie, and associating the identifying information with the unique user identifier.

U.S. Patent Application Publication No. 20090281849 to Choi discloses exemplary systems and methods for developing a mobile network. Exemplary methods include receiving a request to include a mobile network site in a ranked menu of mobile network sites, including the mobile network site in the ranked menu of mobile network sites, sending the ranked menu of mobile network sites to a mobile communications device, receiving a communication from the mobile communications device indicating that the mobile network site should have a different rank, processing the received communication to update the ranked menu of mobile network sites, and sending the updated ranked menu to the mobile communications device.

U.S. Patent Application Publication Nos. 20080059300 and 20080059285 to Hamoui discloses various techniques for improving the delivery of mobile ads to devices. For example, ads are matched with parameters passed to an ad source and then delivered to a publisher to be included with downloaded content. Ads may be targeted to specific devices as specified by an advertiser. Targeting information may be gathered from the device and from information previously provided to the publisher.

U.S. Pat. No. 8,122,051 to Spring et al. discloses support applications for rich media publishing that identify a source of user referral for a media publishing website. The application includes: storing a referring URL in a cookie variable; retrieving the referring URL from the cookie variable during a registration process to enter the media publishing website; dynamically customizing a home page of the media publishing website according to the referring URL; and adding a distinction between original and current session referrals.

U.S. Pat. Nos. 7,970,944 and 7,490,167 to Pena et al. discloses a system and method for platform and language-independent delivery of page-based content. Content defined in a relatively abstract format is rendered into multiple platform formats in client-side application user interfaces in multiple human languages. The relatively abstract format is a subset of XML and is used to define user interface elements to be displayed on a page. A Model-View-Controller architecture is implemented, comprising a plurality of servlet filters, a servlet pipeline and a plurality of rendering processors for client detection, client tracking, relatively abstract format preprocessing, relatively abstract format processing and validating, and transforming and rendering of the relatively abstract format into multiple platform formats in client-side application user interfaces in multiple human languages. A creation, modification and management tool is also disclosed for creating, modifying and managing platform and language-independent page-based content.

U.S. Pat. No. 7,349,923 to Spring et al. discloses a repository system for media publishing, comprising: a plurality of storage devices configured to store a plurality of media items. Each storage device is configured to store a different type of media item than that of other storage devices in the plurality of storage devices. Metadata information relating to the media items is stored in the plurality of storage devices. The metadata information enables hierarchical organization of the media items so that the media items can be relatively easily accessed, moved, added, and deleted.

U.S. Pat. No. 7,181,468 to Spring et al. discloses a content management system for media publishing, comprising: a plurality of content management tools for managing media contents during a publication process. A publishing pipeline is configured to operate in concert with the plurality of content management tools during the publication process to control development, distribution, and access of the media contents. The publishing pipeline provides a plurality of environments for staged and organized development and publication of the media contents.

U.S. Pat. No. 7,890,576 to Button et al. discloses a technology by which information (an electronic note from a producer) that is available for delivery to a client consumer is only selectively delivered. The selective delivery may be based on metadata associated with the information, client identity data and other criteria, including a location of a client device. The information to selectively deliver may be obtained from an external information source, or generated by a service, such as when the user is near a location of interest. The client may report location changes, such as a rate corresponding to a rate of location change of the client. An information service scale involves any practical number of clients via client state servers and location (of interest) servers. Each client state server is associated with a set of one or more clients, and each location server is associated with a set of one or more regions.

None of the heretofore disclosed and/or utilized systems or methods provides a free standing application that links a user to a remote Internet based database or updated app which provides strictly advertisements according to user set preferences such as male, female, age group, types of products or services needed. Additionally, none of the heretofore disclosed and/or utilized systems or methods provides an application that is capable of providing the advertisements when a mobile devices GPS location is active or non-active providing, where active, the distance of the advertising location from the mobile user GPS location or, where non-active, providing distance based on cellular location via cell towers.

Based on the foregoing, there remains a need for an advertisement means that provides a free standing application method operative to link a user to a remote Internet based database that provides advertisements according to user set preferences. Further, there exists a need in the art for a method providing an application operative to correlate these user set preferences with advertisers located in a given geographical location with respect to the mobile user's GPS location.

SUMMARY OF THE INVENTION

The present invention provides a method utilizing structure for the function of a remote database that communicates with a Smartphone, the structure including advertiser programming and upload instructions and pages to be created using available development languages, such as JAVA, HTML5, and development kits from Google, Apple, Microsoft. The present invention is directed to a method for executing a mobile billboard messaging structure and platform that communicates with a Smartphone, tablet or mobile device, or stationary device, having Internet connectivity and a GPS determined location, to display a mobile app. In turn, the mobile app displayed is a free standing application for a mobile device that is capable of linking the user to a remote Internet based database which provides advertisements according to user set preferences. Preferences include, inter alia, male, female, age group, types of products or services needed, as well as the distance of the advertising location from the mobile user GPS location or, where the GPS is non-active, distance is determined by cellular/mobile device location via cell towers.

The mobile billboard messaging app method displays messages targeted to a user's preferences from an advertiser on the display of a user's devices, such as Smartphone or tablet, having Internet and GPS connectivity when the user device is within a preselected vicinity from the advertiser's location. The GPS coordinate location of the device is used to identify advertiser's locations within a preselected distance that correlate with user's preferences. Wherein the GPS is non-active, location can be determined by way of cell tower transmission location technology. Where a correlation is found, at least one message from the advertiser is displayed on the Smartphone or tablet device. The message is triggered when the device enters within the given radii from the advertiser. When triggered, the messaging app provides relevant real-time promotions, deals and coupons for purchase of goods and services of the advertisers or sponsors related to the user preferences. The mobile billboard messaging displays target messages based on both the user's specific preferences and the user's geographical real-time location.

The mobile billboard messaging app system and method is appointed for use with a device having GPS technology, a display screen and Internet connectivity, and wherein the display screen displays a plurality of applications. The app system is constructed having a mobile billboard messaging app associated with software that includes entry of user preferences associated with a user of the device and advertiser or sponsor data. The mobile billboard messaging app is displayed through the Internet connectivity displaying at least one message related to the user preferences generated from at least one advertiser or sponsor. The mobile billboard messaging app is operative to establish an Internet connection between the device and the mobile billboard messaging app software. Meanwhile, the GPS location of the device is provided relevant to a given radial distance from at least one location associated with at least one of the advertisers displaying the message. When the GPS is non-active or in standby, the location of the device is provided based on cellular tower positioning and the determined location is then provided relevant to a given radial distance from at least one location associated with at least one of the advertisers displaying the message. The mobile billboard messaging app only displays the messages when the GPS location is within the given radii from the advertiser. Thus, the message is triggered when the device enters within the given radii from the advertiser. When triggered, the app provides relevant real-time promotions, deals and coupons for purchase of goods and services of the advertisers or sponsors based on the user preferences.

The mobile billboard messaging app is displayed on the touch screen of a Smartphone or a tablet that has Internet connectivity and GPS location identifying features. Activation of the app is automatically in standby. When the user's device (and, consequently, the user of the mobile device) enters within a given geographical radius from the locus where an advertiser's goods/services are offered for sale the app is activated. This triggers application logic to check for deals, active Internet connectivity between the Smartphone or tablet, and a web location with which the mobile billboard messaging app is associated. For example, if Mr. Jones lives in Motown, NJ, then data downloaded on the phone (via nightly feed) would be all deals within the set radius miles from Motown, NJ, let us say for example 20 miles of Motown, NJ Nightly feed over the app communicates new changes—for example 20 advertisers creating adds—wherein if tomorrow one of the campaigns is completed, the nightly fee updates lists of advertising to contain current active campaigns for the next day, updating same, and removing non-active campaigns. If Mr. Jones travels outside his home radius—when there is a location check the system will say the devise is not within location—then the app will prompt the user, Mr. Jones in this example, to ask if he wants new data correlated with the current location. If Mr. Jones selects "yes", then the app will run a real time pull of the local deals. The real time pull is preferably only necessary when the user, in this case Mr. Jones, move outside the set radius (home radius, or other set radius). For example, if Mr. Jones travels to Philadelphia, PA, the app will ask the user (Mr. Jones) if he wants to download the Philadelphia, PA data. If Mr. Jones selects "yes", the app downloads associated with Philadelphia, PA then will appear; conversely, the app will not download advertisements with the new location unless the user selects "yes". The night before, or so, the user may log onto the app and request the nightly feed for the given new location rather than the current/home/set location via the nightly feeds.

The app's web component houses campaign data, billing, etc., which is in communication with the application on the phone—when checking where the mobile device/user is located preferably the app does not communicate real time with app web server. Instead app logic is tied to phone so that only during "feed" of data from the app's web component does the phone/or mobile device communicate with the app system, preferably via a nightly feed. In the event that the mobile device/mobile phone communicates back to the system that it generated 10 adds on a given day, then the app system can charge for the 10 apps and provide or feedback the updated adds in the mobile device's location via logic run. Logic runs efficiently with the phone without being dependent on real-time check in. Network dependency is minimal as long as the phone tells or communicates to the app system that there is no location change; however, when there is a location change network dependency increases and the system will check for a location change. Upon triggering the app, the software associated with the app correlates or matches the user preferences associated with the specific user of the device with advertisements in the locality or within the given vicinity. When at least one match or correlation is determined, the mobile billboard messaging app notifies the user of the match by displaying at least one message on the display of the device. Alternatively, the mobile billboard messaging app may also generate an audible sound or vibration (as selected by the user) to alert the user that a message has been generated by the app, displaying an advertisement or promotional image.

Generally, the app logic includes three separate radius logics:
1) Radius one: is a home location radius—the purpose is to know what radius to download on the phone so the user gets all the deals in his/her location—for example, the home location radius may be set at various mile radius from Motown, NJ, for example 40 miles, 30 miles, 20 miles, 10 miles, 5 miles, most preferably i.e. 20 miles out from Motown, NJ;
2) Radius two: is a personal radius—the personal radius is set relative to the mobile device itself, and may for example be set at 10 miles, 5 miles, 2 miles, or 1 mile. Most preferably the personal radius is set for a two (2) mile radius. Whereupon, stores or deals that are extant within the two mile radius result in an alert to the user;
3) Radius three: advertiser's radius (advertiser's circle)—set by the advertiser wherein the advertiser can control the display of the add based on the advertiser's deal local radius in relation to either radius one or radius two. For example, if advertiser Dunkin Donuts® wants to only show the add within three miles of the local store, then the advertisement/deal will not appear on the app unless the advertiser's radius is reached.

In operation, the system check one examines whether it is satisfying the personal radius, as the personal radius changes while the user and visa vie mobile device travel; the advertiser radius does not change. As the user's personal radius changes through traveling, the app looks for other advertiser circles as it hits.

Criteria and advertising targeting is utilized by the app as the location is factored in and then gets triggered when the three radius have any overlap. The advertiser can selectively hit a target audience and is provided the ability to pull information from the targeted audience/market into a data warehouse. Specifically, the advertiser can obtain that with which he/she is interested from the consumer, empowering the advertiser and optimizing the advertiser's ability to target market to a specific group or demographic. It also empowers the consumer to filter out advertisements. The value of the ads, owing to the fact that they are targeted, increases vastly.

Once a match is generated based on the user's location and user preferences, a message is displayed on the Smartphone or tablet device and the user is presented with the ability to receive coupons, promotional deals, special services, products and the like. The user may dismiss the mobile billboard app message by selecting "x" or delete or ignore, may "keep" the message, saving it for later, or may select the message to view and utilize immediately. Preferably, for basic service of the app the user may not have to pay a fee for the app services. However, there may be provided a premium version wherein the user has advanced user features not offered in the basic service app package. For example, with the premium app version, the user may have increased capability to control the ads coming in via increased specifics as to what the user is interested in selected by the user; in premium service the user has the capability to filter out further—only feed out deals/advertisements pertaining to golf, etc. Premium app membership would allow the user the feature of picking and choosing which ads appear. Preferably, advertisers or sponsors contract for use of the mobile billboard app messaging system by subscribing to a website associated with the billboard app messaging system. Advertisers can design or control content of the app that is displayed on the smartphone of the user. Alternatively, the app can link directly to the advertiser's web site for the promotional images and/or messages.

A method for providing a mobile billboard messaging app is presented. The method includes implementation of a computer database electronically storing merchant/advertiser and user information in communication with a software application running in a mobile device of the user, the mobile device having a location determination means (i.e. GPS, or where the GPS is non-active, location determination by way of cell tower location relevant to the cellular device), a display screen and Internet connectivity. The mobile billboard messaging app is operative to establish an Internet connection between the device and the mobile billboard messaging app software for downloading data. Preferably, the Internet connection download is automatically run once in a twenty-four hour period, and most preferably the download takes place as a nightly or very early morning feed. The method comprises the steps of: (a) providing a mobile billboard messaging app associated with software for download on at least one device that provides for entry of user preferences associated with a user of the device; (b) providing entry means for at least one ad campaign to be entered by at least one advertiser on the computer database for electronically storing at least one message; (c) providing a radial distance entry means for determining a given radial distance from at least one location associated with at least one of the advertiser's message; (d) communicating with the device to determine the user's device location through GPS. When the GPS is non-active or in standby, the location of the device is provided based on cellular tower positioning and the determined location is then provided relevant to a given radial distance from at least one location associated with at least one of the advertisers displaying the message; (e) determining if the user's device location is within the given radial distance from at least one location associated with at least one of the advertiser's message; (f) checking to determine if at least one user preference correlates with the message within the given radial distance from the location; and (g) displaying a notification of the message on the device. The message is triggered when the device enters within the given radii from the advertiser or when an event is activated by the system. Upon being triggered, the message provides relevant real-time promotions, deals and coupons for purchase of goods and services of the advertisers or sponsors related to the user preferences.

The triggering event may take place when the user's device enters within the radial distance from the advertisement location. Alternatively, the triggering event may instead be a determination that at least one user preference correlates with the message without regard for the device location.

Additionally presented is a method for providing a non-transitory computer readable electronic storage medium storing one or more programs comprising instructions executable by a portable multifunction device having a touch screen display, Internet and GPS capability to cause the device to: display a mobile billboard messaging app associated with software that provides entry of user preferences associated with a user of the device and advertiser or sponsor data; display at least one ad campaign entered by the advertiser on the medium containing at least one message related to the user preferences; the steps including: (1) enabling the mobile billboard messaging app to be operative to establish an Internet connection between the device and the mobile billboard messaging app software; (2) checking to determine if at least one user preference correlates with at least one message; and (3) providing the ability to display at least one of the advertisers messages when an event is triggered. Upon being triggered, the method provides relevant promotions, deals and coupons for purchase of goods and services of the advertisers or sponsors related to the user preferences. Preferably, the event comprises determining location of the user and visa vie mobile device within a given radii from the advertiser's location, whereby the message is triggered when the device enters within the given radii from the advertiser.

In one embodiment the non-transitory computer readable electronic storage medium comprises instructions that cause the device to: install the mobile billboard message application onto the user's mobile device; display a configuration screen that will allow the user to receive specific ads that meet the user's preferences or defined criteria; configure and display entry of a primary city of the user; execute and display a location check interval value determined by the GPS onboard the mobile device/when the GPS is non-active, location check is determined by way of cell tower positioning technology; determine the user's location and checking to assess whether the location is within an active ad campaign radius, and if it is within radius, execute a logic check to determine if the use satisfies campaign criteria; if satisfied, transmit the campaign ad message to the user; and display a message on the user's device notifying the user of the message.

BRIEF DESCRIPTION OF THE DRAWINGS

The invention will be more fully understood and further advantages will become apparent when reference is had to the following detailed description of the preferred embodiments of the invention and the accompanying drawing, in which:

FIG. 1a illustrates a flow chart schematic of the mobile billboard message app application system of the subject invention;

FIG. 2b illustrates an example screenshot on a Smartphone display of the User Interface after executing the app;

FIG. 4 illustrates the system chart for the mobile billboard message app system;

FIG. 5 illustrates a screen shot showing a first level of navigation for consumer users on the web site;

FIG. 6 illustrates a screen shot showing first and second levels of navigation for merchant users on the web site;

FIG. 15 illustrates a screenshot showing optional Membership Programs;

FIG. 16 shows a snapshot of a screenshot illustrating a merchant's budget;

FIG. 17 illustrates a blown-up screenshot of an existing campaign to discourage the tag-along in the Tag-Along Campaign Model;

FIG. 41 illustrates a screenshot display on a Smartphone (or mobile device) My Deals, as well as blow-up features of the screenshot, including Shopping List and Auto Populate functions;

FIG. 42 illustrates a Global Configuration Variables Table utilized by the subject system and method software;

FIG. 43 illustrates a Campaign Model Table utilized by the subject system and method software;

FIG. 44 illustrates a Campaign Radius Table utilized by the subject system and method software;

FIG. 45 illustrates a Gender Table utilized by the subject system and method software;

FIG. 46 illustrates a Marital Status Table utilized by the subject system and method software;

FIG. 47 illustrates a Number of Children Table utilized by the subject system and method software;

FIG. 48 illustrates a Target App User Age Count Table utilized by the subject system and method software;

FIG. 49 illustrates a Children Age Count Table utilized by the subject system and method software;

FIG. 50 illustrates a Pricing Table utilized by the subject system and method software;

FIG. 51a-51h shows a sample route pattern determined via a route learning algorithm extrapolated in FIG. 18;

FIGS. 52a-52e show an embodiment of a pricing model of the subject mobile billboard messaging app method.

DETAILED DESCRIPTION OF THE INVENTION

Figure 1B:
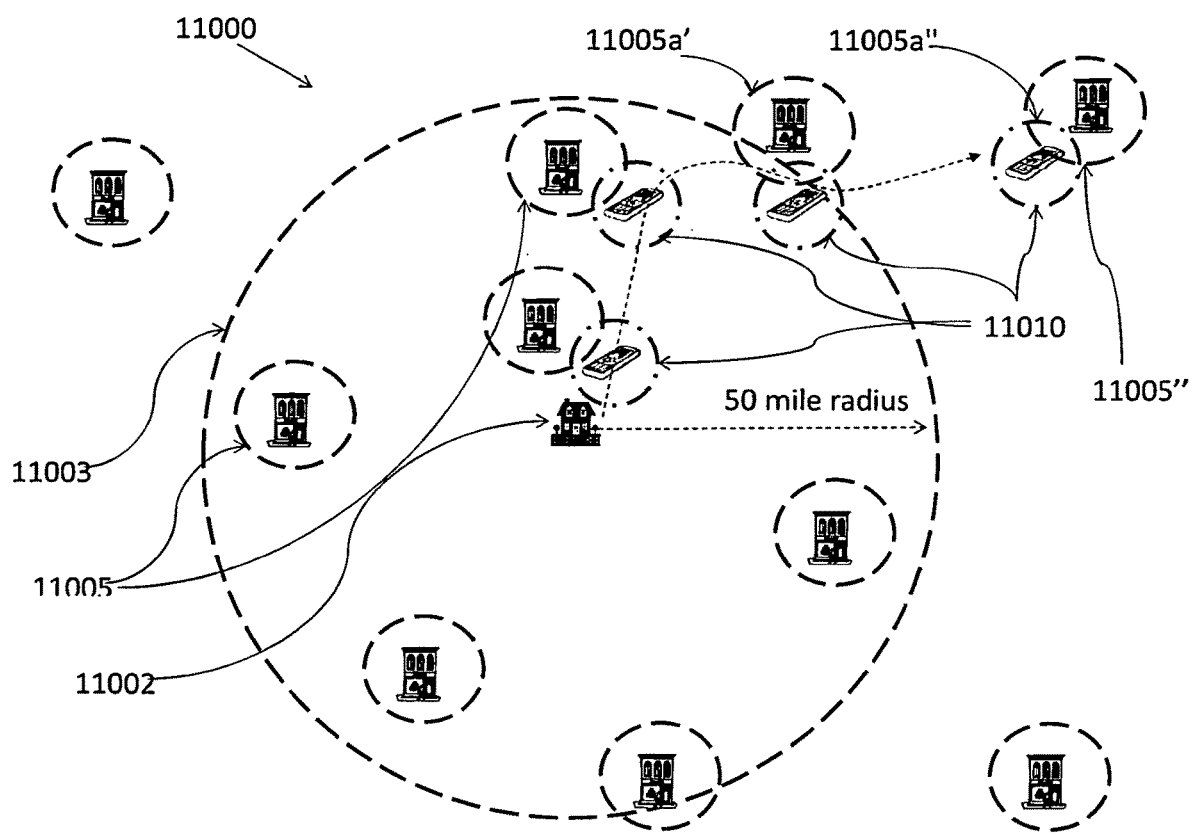
FIG. 1b illustrates the apps route planning feature showing HLR, CR and AR relationships.

This invention relates to a mobile billboard messaging app method that displays messages targeted to a user's preferences from an advertiser on the display of a user's devices, such as Smartphone or tablet, having Internet and GPS connectivity when the user device is within a preselected vicinity from the advertiser's location. The GPS coordinate location of the device is used to identify advertiser's locations within a preselected distance that correlate with user's preferences. Where a correlation is found, at least one message from the advertiser is displayed on the Smartphone or tablet device. The message is triggered when the device enters within the given radii from the advertiser. Upon being triggered, the messaging app provides relevant real-time promotions, deals and coupons for purchase of goods and services of the advertisers or sponsors related to the user preferences. The mobile billboard messaging app displays target messages based on both the user's specific preferences and the user's geographical real-time location.

A method for providing a mobile billboard messaging app is presented. The method includes implementation of a computer database electronically storing merchant/advertiser and user information in communication with a software application running in a mobile device of the user, the mobile device having a GPS determined location/location determined via cell tower positioning, a display screen and Internet connectivity. The mobile billboard messaging app is operative to establish an Internet connection between the device and the mobile billboard messaging app software. The method comprises the steps of: (a) providing a mobile billboard messaging app associated with software for download on at least one device that provides entry of user preferences associated with a user of the device; (b) providing entry means for at least one ad campaign to be entered by at least one advertiser on the computer database for electronically storing at least one message; (c) providing a radial distance entry means for determining a given radial distance from at least one location associated with at least one of the advertiser's message; (d) communicating with the device to determine the user's device location through GPS/cell tower determination; (e) determining if the user's device location is within the given radial distance from at least one location associated with at least one of the advertiser's message; (f) checking to determine if at least one user preference correlates with the message within the given radial distance from the location; and (g) displaying a notification of the message on the device. The message is triggered when the device enters within the given radii from the advertiser or when an event is activated by the system. Upon being triggered, the message provides relevant real-time promotions, deals and coupons for purchase of goods and services of the advertisers or sponsors related to the user preferences.

The triggering event may take place when the user's device enters within the radial distance from the advertisement location. Alternatively, the triggering event may instead be a determination that at least one user preference correlates with the message without regard for the device location.

Additionally presented is a method for providing a non-transitory computer readable electronic storage medium storing one or more programs comprising instructions executable by a portable multifunction device having a touch screen display, Internet and GPS capability to cause the device to: display a mobile billboard messaging app associated with software that provides entry of user preferences associated with a user of the device and advertiser or sponsor data; display at least one ad campaign entered by the advertiser on the medium containing at least one message related to the user preferences. The steps including: (1) enabling the mobile billboard messaging app to be operative to establish an Internet connection between the device and the mobile billboard messaging app software; (2) checking to determine if at least one user preference correlates with at least one message; and (3) providing the ability to display at least one of the advertisers messages when an event is triggered. Upon being triggered, the method provides relevant real-time promotions, deals and coupons for purchase of goods and services of the advertisers or sponsors related to the user preferences. Preferably, the event comprises determining location (via GPS or, if the GPS is non-active by way of cell tower positioning relevant to the mobile device wireless usage) within a given radii from the advertiser's location, whereby the message is triggered when the device enters within the given radii from the advertiser.

Uniquely, the method executes the display of an advertisement on the display screen of a Smartphone or tablet device of a user; this advertisement is specific to the user's likes, interests, and/or hobbies—as well as the real-time geographical position of the device and, consequently, the user. A free standing mobile billboard application is provided, which directs advertisements to a user on a mobile smart phone or tablet so that the advertisements are specifically directed toward the individual phone user. The mobile app requires the user to enter preference data including gender, age group, types of products or services interested and desired distance from the mobile smartphone or tablet to the advertiser location. The distance from the mobile Smartphone or tablet is determined by the GPS facility present within the mobile device. The mobile billboard app connects the user to a remote database present in the Internet that has an accumulation of current advertisements and coupons. A filter present in the remote database only provides advertisements in the Smartphone that meet the preferences of the user. In a preferred embodiment, each time the user clicks the mobile device app the preferences page is presented. The user may add a new desired item or select a previously provided item; and only the advertisements that relate to the particular item will be presented in the Smartphone.

The mobile billboard Internet messaging method provides a message app displayed on a Smartphone, a tablet or a mobile device, or stationary computer device, having a display screen and Internet connectivity. Advantageously, the mobile billboard smart phone application of the present invention empowers advertisers, either directly or indirectly (through advertising agencies), to deliver advertisements to potential customers through targeted advertising notifications on the customers' Smartphones. The mobile billboard application attracts and excites a diverse audience of smart phone users or mobile devices with a mobile application that allows them to receive notifications and alerts on discounts, promotions, and savings specific to their hobbies, interests, likes, and/or selections. Uniquely, the subject mobile billboard application allows advertisers to create and run their own ad campaigns using their web browser. A data warehouse is established with a robust reporting tool that captures vital usage data. The usage data thereby obtained can benefit advertisers that are analyzing general customer habits and buying behavior to create more effective ad campaigns.

Customer installation of the mobile billboard application is readily achieved through use of an easy usable interface, including location based notification and alerts. Ad data is capable of real-time, continuous update to ensure ad data is always up-to-date. Incorporation of multimedia applications such as HTML5, video, Flash, and the like is provided for use with the subject mobile billboard. An application referral program may also be provided. Members/customers can further be kept informed of the mobile billboard application features by way of an opt-in email newsletter tool, automatic pop-up tools, and the like, which can further be tailored for specific mobile billboard territories. Links to social media networking sites such as those under the trade names Facebook, Twitter pages, and the like, are also provided through the mobile billboard smart phone/mobile device application.

The mobile billboard application method provides a web portal for advertisers, wherein an easy to use interface supports multiple ad campaigns (various advertiser accounts). Simultaneous add campaigns within the same advertiser account are also supported by the systems platform. Agency-managed ad campaigns, including multiple ad campaigns within multiple advertiser accounts managed within each ad agency account, are readily supported by the mobile billboard platform. Each customer's account information is protected in a secured environment to ensure confidentiality of personal information. An administrative level account management feature is integrated within the application's platform to allow mobile billboard account managers to effectively market the mobile application to clients by providing custom offerings and promotions, and the ability to track advertiser account payment status. Further, an advertising cost charging model is provided that supports pay-per-click and ad placement bidding, discount/coupon distribution via barcodes. Multimedia applications, such as HTML5, video, Flash, and the like, are further utilized by the mobile billboard application.

A reporting tool is provided through the mobile billboard application for providing reports to advertisers through an easy to use interface. The reporting tool captures and stores all fields in the data warehouse to allow robust reporting and the ability to create ad hoc reports to allow advertisers to create their own custom reports. Reports may be automatically generated on scheduled intervals, such as via a given time interval (i.e. day 2), thus allowing advertisers to track the status of their ad campaigns. The ability to create ad campaigns from advertiser's Smartphones may further be provided, as well as links to networking/social networking sites.

A diverse audience is appointed to utilize the subject mobile billboard smart phone/mobile device application. Users of the application include customers/members having the customer installed mobile application downloaded on their mobile device, including Smartphones and mobile tablets with data usage enabled. Users of the application's web portal include advertisers (small business owners, large corporations, professionals, and the like) that manage their own advertising accounts; and advertising agencies creating ad campaigns on behalf of their clients. The mobile billboard's account managers utilize the system to manage advertiser relationships by offering promotions and business package deals; and to manage account receivables and payment status of advertiser accounts.

The mobile billboard app is displayed on a touch screen of a Smartphone or mobile tablet device having Internet connectivity and GPS location technology features. The mobile billboard app displays on the screen automatically when the user enters within a given radius from an advertisement location. For example, if the user elects that he/she likes coffee, such as from a specific coffee franchise associated with the trade name STARBUCKS, when the user is in a given radius from a STARBUCKS that has an active ad campaign via the mobile billboard app the mobile billboard app will display on the Smartphone notifying the user that a STARBUCKS is in the vicinity, and providing the user with applicable discounts, coupons, or other promotional information. The mobile billboard application may provide an audible sound as well as the visual indicator. The user can have the mobile billboard activate automatically, or the user can elect to manually activate the mobile billboard. Wherein the app notifies the user of the STARBUCKS, the user can then either select or activate the app for more information by touching the icon, or the user can select ignore the app. If the user selects to activate the information to be displayed by the app, the user touches the icon which in turn triggers Internet connectivity between the Smartphone or tablet and a web location with which the mobile billboard app is associated. Once connected to the web location, the Smartphone or tablet user is presented with information as to location, discounts, promotions, coupons, specials, products and the like.

A notification window pops-up on the user's Smartphone display when the app detects that the user is within a location range where advertisers have active ad campaigns. Within that window, the user has the option to navigate by 1) clicking the notification, 2) saving the notification, or 3) deleting the notification. If the user clicks on the notification, the application app launches the app screen detailing the content of the advertisement. If the user clicks "keep", the ad is stored or saved in a saved deals queue of the user. If the user wishes to ignore the notification, the user can delete the notification by selecting "X" or the like, removing the ad from view.

Once the user clicks on the notification and the content of the advertisement is downloaded onto the Smartphone, the deals summary is displayed. Preferably, the newest deal is displayed by default. The user then is capable of selecting the desired advertising deal. The user's deal queue via "My Deals" lists all active (non-expired deals) for the user. The user selects settings and preferences, allowing the user to configure his/her preferences—such preferences may include demographic information, preferred stores, hobbies, and the like.

Advertising media for each advertiser/business client are stored on the server of the website hosting the mobile billboard app messing program. Advertisements may be presented to the user at random time periods, specified (advertiser specified) time intervals, or based on GPS location of the user via the location of the Smartphone or mobile device. The GPS enabled Smartphone or tablet looks for the user's preferences located within a fixed distance, for example 10 miles from the location of the Smartphone or tablet. Specific radii from a given location may be provided based on the location identified by the GPS. Radii may include within a 2 to 30 mile radius; 5 to 20 mile radius; or most preferably a 3 to 5 mile radius.

Generally, the app logic includes three separate radius logics:

1) Radius one: is a home location radius—the purpose is to know what radius to download on the phone so the user gets all the deals in his/her location—for example, the home location radius may be set at various mile radii from Motown, NJ, for example 40 miles, 30 miles, 20 miles, 10 miles, 5 miles, most preferably i.e. 20 miles out from Motown, NJ;
2) Radius two: is a personal radius—the personal radius is set relative to the mobile device itself, and may for example be set at 10 miles, 5 miles, 2 miles, or 1 mile. Most preferably the personal radius is set for a two (2) mile radius. Whereupon, the existence of a store or deal within the two mile radius triggers an alert to the user;
3) Radius three: advertiser's radius (advertiser's circle; or campaign radius)—set by the advertiser wherein the advertiser can control the display of the add based on the advertiser's deal within a local radius in relation to either radius one or radius two. For example, if advertiser Dunkin Donuts® wants to only show the add within three miles of the local store, then the advertisement/deal will not appear on the app unless the advertiser's radius is reached. Campaign radius 1-5 miles (most preferred) but configurable such that setting it can be changed. Advantageously, the campaign radius or advertiser's radius is particularly good for local businesses.

In operation, the system check one examines whether it is satisfying the personal radius as the personal radius changes while the user and visa vie mobile device travel; the advertiser radius does not change. As the user's personal radius changes through traveling, the app looks for other advertiser circles as it hits.

Criteria and advertising targeting is utilized by the app as the location is factored in and then gets triggered when in the three radius have any overlap. The advertiser can selectively hit a target audience and is provided the ability to pull information from the targeted audience/market into a data warehouse. Specifically, the advertiser can get that with which he/she is interested from the consumer, empowering the advertiser and optimizing the advertiser's ability to target market to a specific group or demographic. It also empowers the consumer to filter out advertisements. The value of the ads, because they are targeted, increases significantly. Upon intersection of the three radii, the mobile app alerts the user.

This distance can be modified through selection of the user. Advertisement of particular interest may be selected using the preference menu of the mobile billboard application's software program or controlling website associated with the mobile billboard app object. The user/customer may disable the mobile billboard application messaging feature by setting the preferences menu of the app software program, or through a website link to the application's app messaging where the software resides, and likewise may turn the app on anytime.

Businesses that advertise using the mobile billboard messaging app system optionally pay a fee for the system operator to present the advertisement on the Smartphone, tablet or a mobile device with Internet connectivity. The mobile billboard messaging app is delivered through the Internet connection. Additional charges may be applied when a user elects to look at a specific presented advertisement. The user of a Smartphone, tablet or stationary computer is not charged for the mobile billboard messaging app's advertisements. The advertiser or sponsor of the mobile billboard messaging app advertisement is preferably charged when the user clicks on or selects an app. Software for implementing the mobile billboard messaging app system can be preloaded on the Smartphone or tablet, or installed or downloaded as an application after purchase of the Smartphone or tablet for no additional charge.

Smartphones and mobile tablets contemplated herein comprise any of commonly available Smartphones including but not limited to those sold under the trade names iPhone, iPad, HTC Inspire, Freestyle, HD7S, Surround, LG Quantum, Encore, Phoenix, BlackBerry Bold, Torch, Pearl 3G, Curve, Samsung Solstice, Focus, Captivate, Infuse, MOTOROLA ATRIX, FLIPSIDE, Google tablet, and HP Veer 4G.

A user's Smartphone or tablet device generally includes installed software adapted to generate the mobile billboard app and display same on the display screen of the Smartphone or tablet. An actuating means is provided for actuating the mobile billboard app through use of a touch sensitive Smartphone or tablet screen. Touching the mobile billboard app launches the linked web page through Internet connectivity. Software for displaying the mobile billboard app and matching preferences with GPS location is provided. GPS enabled software is provided in association with the Smartphone or tablet which communicates with the software for providing location of advertisers and user's for correlation of user preferences.

FIG. 1a illustrates a flow chart schematic of the mobile billboard message application system of the subject invention, shown generally at 10. The consumer (end-user) downloads and installs the mobile billboard message application onto his/her Smartphone, mobile device or broadband device. After the initial install and when the app is open/launched for the first time, the user is taken to the configuration screen to complete fields that will allow them to receive specific ads that meet their defined criteria as shown at 11. Mandatory fields preferably include gender, age, primary city, and e-mail address, and location check interval as indicated at 12. Primary City—in the UI screen, it will be displayed with the first letter of each word capitalized (i.e. Makati, Trenton, New York), but preferably converted into all lower case when stored in the database. Location Check Interval—how often the app polls the user's current location, for example 10 minutes is preferably the longest time interval that can be selected. Other values preferably include: 8, 5, 3 minutes. Optional fields include Occupation/Profession, Status, Interests, and Favorite Stores/Shops. The user is notified that the more data they enter, the better are their expected results, and that they can always return to the configuration screen to change/update their selections. Notifications are active by default preferably. As the application can be turned off in the iOS version, the mobile billboard app screen displays a message to the user that they are not receiving potential discounts and savings because their notifications are off for the mobile billboard app. Scenario: User notices that there are no ad alerts from the mobile billboard messaging, so the user clicks the mobile billboard app icon, and the advertising message is displayed. The mobile billboard app executes in the background, polling the user's location based on the Location Check Interval value via GPS, or in cases where the GPS is non-active, by way of cell tower location at 13. After discerning the user's location, the app checks to see whether the location is within 1) home/set location radius, 2) device location radius, and 3) an active ad campaign radius at 14. If it is not in radius, the app sleeps until the next poll; if it is in within radii overlap then, the app runs the logic to check if the user satisfies the ad campaign criteria at 15, 16. Upon satisfying the ad campaign criteria, the ad is displayed on the user's phone at 17.

If the logic is satisfied and the user's profile matches an ad campaign criteria, the following events occur: 1) the ad campaign data is updated, charging the impression against the merchant at 18; 2) the notification is sent to the user's phone; and 3) if there are multiple ad campaign conditions that were satisfied, the ad campaign data is also updated for the other merchants and they are charged the ad impression. The notification displayed on the user's phone would indicate multiple ads (discounts/promotions) available. The user receives the notification and if he/she opens an ad to read the details, the app records the open action in the merchant's ad campaign data at 19. Conversely, if he/she did not open the ad (not interested), the app records the "ignore" action in the merchant's ad campaign data. Even if the user is looking at the details of an ad (from a notification), the app continues its function of polling on the next time interval. To avoid app users from feeling that they are being spammed; the mobile billboard app will have a "deals summary" feature that lists the deals of the day. Broadcast and non-location type campaign models that have their "Ad Display Interval" values set to any value other than "One Time" will have their ad listed in the Deals Summary rather than sending individual ad notifications.

Figure 1C:
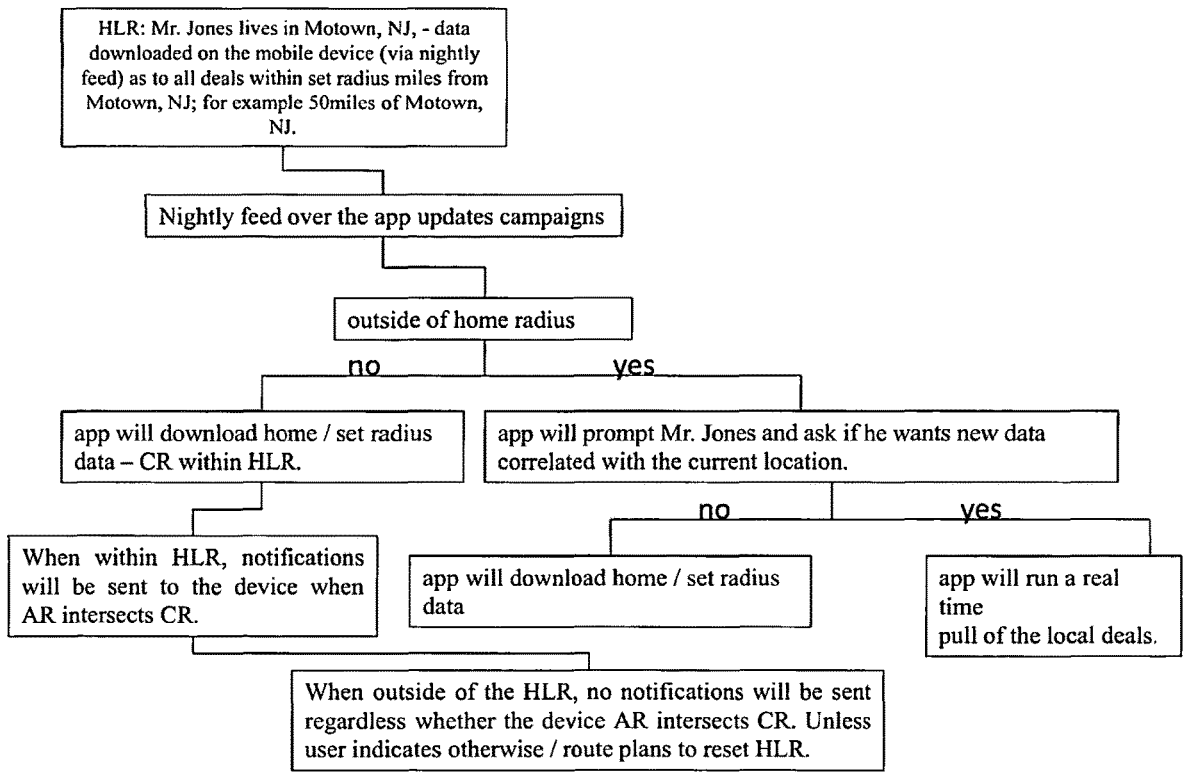
FIG. 1c illustrates the apps route planning feature showing a flow chart.

FIGS. 1b and 1c illustrate the app system's route planning feature and alerts of the system and app, shown generally at 11000. In the profile section of the app the mobile user defines their "Home" location 11002. This is the primary location the app uses to download relevant ads/campaigns within the user's area. The user can enter a zip code or an exact address. Entry of the "Home" location is mandatory. On the average, a typical user will go on their daily activities within proximity of the "Home" location 11002. Someone in, for example, New Jersey, would not likely be interested in a deal in California. To ensure the user only gets those relevant campaigns, the app uses the "Home Location Radius" (HLR) 11003 to retrieve only active campaigns that are within the HLR. The radius is set to be enough to cover a user's typical daily route. For example, the HLR radius may be 50 mile radius, 30 mile radius, or 20 mile radius. The HLR is refreshed daily via a feed from the main application server to ensure the most up-to-date campaign information. Preferably, it mimics the first time the user installs the app on the mobile phone. The user enters his/her zip code, i.e. "08831", as the home location in the profile menu of the app.

Herein, the HLR 11003 is set to 50 miles, indicated by the phantom circle. The app initiates a feed request from the main app server in the cloud to send an advertiser's active campaign that is within the HLR 11003. Each advertiser's campaign defines a "Campaign Radius" (CR) 11005. The CR is the area that the advertiser wants its advertising to be seen. What is downloaded onto the user's phone is based on CR that fall within the HLR, indicated as 11005'. Conversely, CR that does not fall within the HLR is indicated at 11005". CR's that do not fall within the HLR are not included within the user's alerts/are not downloaded. Note that this store's location CR 11005a' is outside of the HLR circle, but because the CR 11005a' ad campaign's defined radius (phantom small circle) is large enough that it intersects with the HLR, it is considered within the user's HLR and it is thus included in the download onto the user's mobile device.

Advertisers are given great control in terms of how their campaign targets their audience. Control mechanisms include, ad demographic conditions, such as gender (male only; female only), age and/or age groups, marital status (single; married), children status (have children; if so, ages/age ranges of children; gender of children; no children), and/or special interests (sports, hobbies, etc.). Only users who meet the criteria will then get the advertisement from the merchant.

Further, the users had a defined radius "Alert Radius" (AR) 11010. The AR is a smaller radius than the HLR and falls within the HLR. Preferably the AR radius range options 1 mile, 3 miles, 5 miles, and/or 10 miles. Whenever the AR intersects with an active campaign's radius (CR) 11005', it will trigger the notification on the mobile device letting the user know there's a deal/ad nearby. As the user travels, the AR intersects CR within the HLR and the user is alerted as to the deal/ads. Only new ad triggers a notification, even though the user is still in the radius of the other advertiser. The system recognizes that the notification for the other ad was sent recently, so it will not send a duplicate.

Once the phone/mobile device AR 11010 is outside of the HLR there are no notification triggers even if a CR is intersected, as indicated at 11005a". This is because the campaign is outside the user's HLR. Essentially, the campaign data is not part of what's synched on the user's mobile device.

Further, the app and system thereof may include a route planning feature that allows the route planning to be done on the mobile device, and/or on the webpage. If for example John Doe is traveling but lives in East Brunswick NJ, Boston would be outside of John Doe's "Home Radius"/HLR, so 50 miles outside of that, John Does wouldn't get the deals. John Doe would go to the website and login with his account information. John Doe selects Route Planning, and is taken to a page almost similar to Google maps, for example, where John Doe enter "From" and "To location". The system would leverage Google maps to do the route and direction mapping. The user, John Doe, would then confirm that that's the route he wants to take. The system would then display all the deals along the route, within X radius of the route. The user can select to load all the deals found along the route on their mobile device, or they can pick and choose which deals they want to load on the phone. Since the trip is still several weeks away, the system would prompt the user to schedule the download sometime close to the trip date. The date entered would be the date the system will send the campaigns along the route to the user's phone. There will also be an option for the user to "Get Me More Deals". If selected, the trip route will be made available to advertisers/merchants within the route—anonymously. No user information is passed on to the advertisers. This will tell advertisers of the possible sales lead and can create a campaign to entice the user to stop by during the trip. Additional campaigns could then be created prior to the trip and by the time the route is downloaded to the user's phone, there would be more deals available along the route.

Figure 2A:
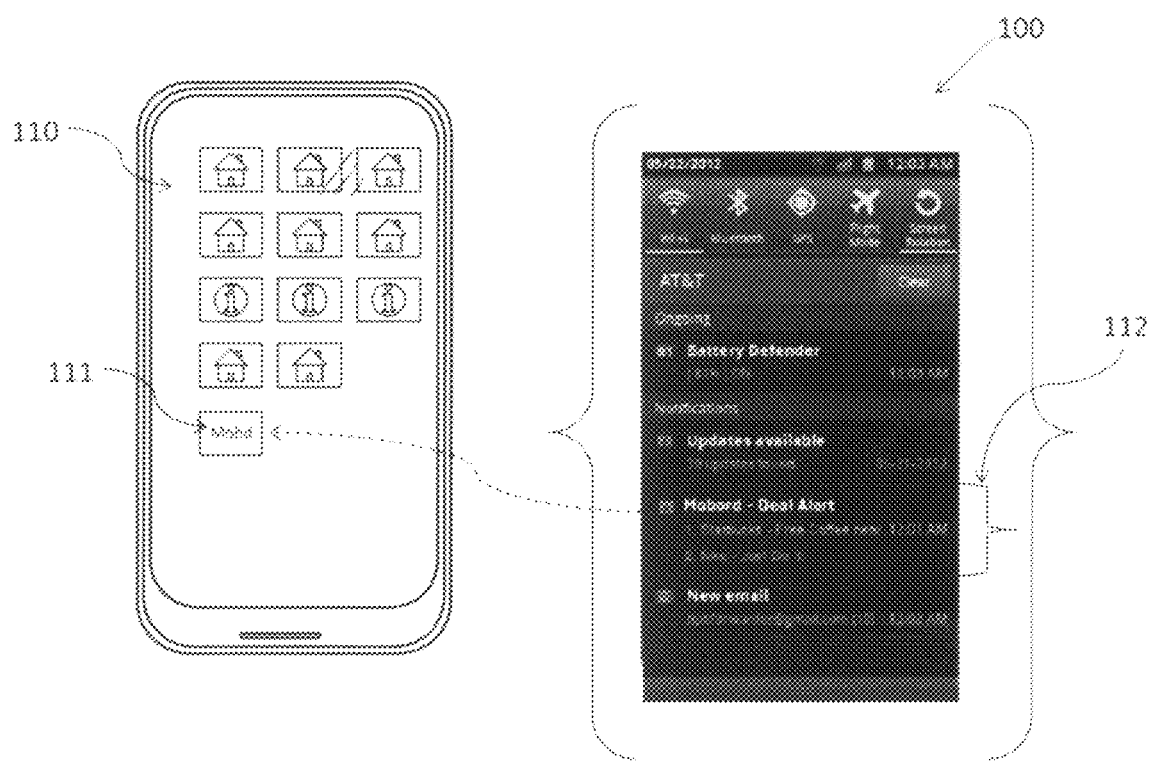
FIG. 2a illustrates a Smartphone with a mobile billboard message icon on the display.

FIG. 2a illustrates a Smartphone with a mobile billboard message icon on the display, shown generally at 100. FIG. 2b illustrates an example screenshot showing execution of the mobile billboard message icon, shown generally at 120. A Smartphone 110 is shown with the mobile billboard app icon 111 displayed on the screen. The Smartphone 110 is a mobile broadband device, such as those sold under the trade names IPhone, IPad Android, HTC Smartphone or other Smartphone or PDAs of the type sold by Samsung, Apple, Blackberry or the like. Using the phone's platform, i.e. Android® for example, deal alerts may be presented directly on the display 110 via the phone's built-in notification screen as illustrated at 100. As shown, the mobile billboard application, selection of 112, shows a deal alert. Selection 112 and 111 are points of entry to execute the app. FIG. 2b illustrates an example screenshot showing execution of the mobile billboard message icon, shown generally at 120. Touching the icon 111 selects the feature. In the image shown, the mobile billboard app 111 is selected. Upon selection by the user, the user's notifications are displayed as shown at 112 after the app runs the logic to ascertain whether the user satisfies the ad campaign criteria as set forth in regards to FIG. 1a. When you press 111 it does not go straight to 100; 100 is the notification screen, look and feel will be different based on operating system (such as those sold under the trade names Android and iphone for example).

Referring to FIG. 2b, screen components include menu selection, providing the main navigation facility of the app. The button selected by the user drives what is displayed in the Main Screen. The user can scroll left to right or right to left to sift through the button choices. The Menu Selections preferably include (from left to right): a) Deals Summary 151; b) My Deals 152; c) Find (not shown); d) Profile (not shown); e) Settings (not shown); and f) Refresh—which provides the user the ability to refresh their Deals list data. Deals Summary 151 provides the "Home" option and displays the Deals Summary screen. When the user selects from the Menu Selections icons, the Main Screen displays the content of that selection. The Header displays the name of the selected menu to allow the user to know which screen is currently active. Sub-Menus 153 provide the user additional choices to browse within their selection. Depending on the selection, there may or may not be sub-menus. As an example, if the Deals Summary icon is selected, Deals Summary 151 has 2 sub-menus→Around Me Now 151' and All Deals 151". In the user selected Settings, there are no sub-menus displayed. As in the screenshot above, a user picks a sub-menu by dragging the sub-menu header. In the example, Around Me Now is displayed. If they want to see the All Deals list, the user would drag the All Deals sub-menu header up. That would collapse the Around Me Now screen and expand the All Deals screen. The main screen area of the app is where the details are displayed.

Figure 3A:
FIG. 3a illustrates an example display screen wherein the user manually opens the app and executes a location query manually.
Figure 3B:
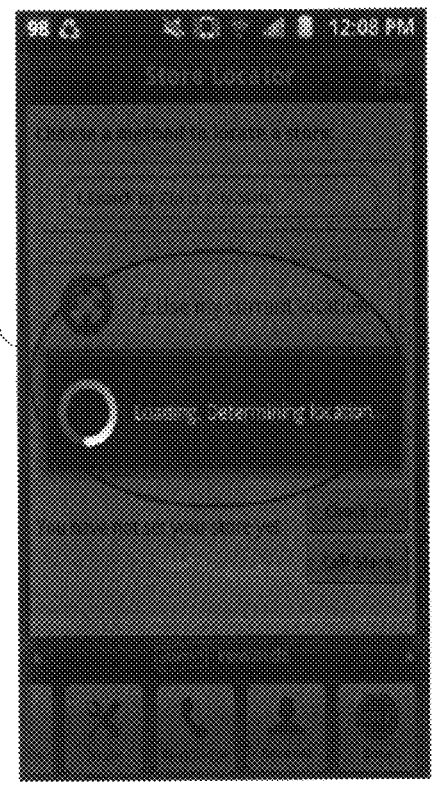
FIG. 3b illustrates the example display screen wherein the user manually opened the app and executed a location query manually, and the app is searching at the determined location.

FIGS. 3a and 3b illustrate example display screens wherein a user manually opens the app and executes a location query manually initiating a location search at the determined location. The user can manually open the app and execute a location query manually anytime as indicated at 301. Once the location query is activated the app loads the location determination and logic check to determine location and user and ad campaign criteria at 302.

Location is determined by way of GPS, network, via cell tower positioning or the like, in order to get the current location of the device and, consequently, the user, such as by latitude and longitude location, which is then converted to an address and converted into all lower case letters. The address is saved into a field called "Current Address". City and zip code are extracted from the address field and converted into all lowercase letters. The current city and zip is then saved. Some applications turn off the smart phone's wifi connectivity when the screen is off to avoid issues with the mobile billboard's ability to find the user's location; such issues may be prevalent when the user's GPS is turned off Depending on the type of battery-saving application installed, the wifi, GPS, or cellular network could be turned off. In that event, the mobile billboard app is capable of detecting whether such an application is installed and running on the device. If installed, the mobile billboard app is preferably able to work around the issue by turning ON at least the cellular network to allow it to connect and find the user's location. If it cannot turn on, the screen preferably displays a notification to the user that the mobile billboard app will not work since the battery-saving app is inhibiting it from determining location information. When the user opens the mobile billboard app, the screen also displays this message.

In building the location list table, when merchants are creating ad campaigns, they define the target locations they want to run the ad at. They select from a list of locations that are "near" their search criteria. Preferably the list is continuously updated/built based on profiles of end-users. In the configuration settings of the app, the end-user enters their "Primary City". This value enables construction of a build a basic list of where the app users are. Since the Primary City can be changed by the end user and is data-entry driven, it is prone to inaccuracies since the value the user entered may not necessarily be their real primary city. Example: If A was just interested in getting deals around where A works, instead of entering A's Home city as his/her Primary City, A would enter his/her work city as his/her Primary City. All the Primary City values are stored in the Location list table. Generation of list locations can also be based on target Locations from "successful" ad campaigns. A merchant can add "New" locations if the ones they want to target are not on the list. These "New" locations are not automatically added to the Location List table. They are only added to the table if the ad campaign generates at least the minimum notifications to add new location value in that target location. For example: Nike wants to run a campaign in Providence, Rhode Island Providence is currently not on the list of locations, so Nike adds it as a "New" location. When the ad campaign runs, if Nike's ad appears at least 10× within 3 miles of Providence (assume they used the default 3 mile radius criteria), then the system adds Providence to the location list table. If there were 9 notifications and the campaign ends, Providence is not added to the table.

In another embodiment, a route learning algorithm is provided. Since the app continuously queries an end-user's location to determine if they are in range of running ad campaigns, the system preferably uses the queried location information to create a route profile for each user. This doesn't mean the system will store all location information. Each user will typically go through the same routine almost on a regular basis. For example: Home→Stops along the way such school drop-offs, etc→Work→Lunch, errands, etc→Home. By allowing the app to "learn" this common pattern it can build a list of locations that end-users typically go to, which would essentially be the most valuable location values that advertisers/merchants would want.

FIG. 4 illustrates the system chart of the mobile billboard message app system, shown generally at 400. A Cloud system chart of the mobile billboard messaging app system is shown. The users 401 of the system are users of Smartphones 402 having Internet connectivity, or Mobile broadband Wi-Fi connection to access the Internet and provide GPS capability. Cloud computing server 403 is a physical location, website, database resident on the server, and is accessed by the Smartphones that have the mobile billboard messaging app software. Server 404 controls the application's functionality by performing detailed processing. The database or business rules can be placed in a server 404 which retrieves data to be sent to Smart phone 402 having Internet connectivity. Cloud based applications may be used for delivery of content to the Smartphone. The database server 403, 404 has information of a number of advertising groups and may include promotions, images, advertisements, coupons, rebates, and the like. The information may be stored as a link so that the database servers 403, 404 would store webpage links and pictures appointed for display by the mobile billboard messaging app. Selection of the mobile billboard messaging app by the user executes the website 405 initiating the logic query detailed above.

The web site design preferably conforms to various requirements. For example, the web site is preferably HTML 5.0 compliant (or other later developed platforms). All pages, except video or multimedia, preferably download in less than 10 seconds over a 56 k modem connection. Further, all pages preferably fit in a web browser displayed on a computer set to 640×480 pixels and all pages use a web safe color palette. The app and web site hosting is compatible with IE 7, Mozilla 9, Chrome 18, Safari X and later versions thereof and conforms to the WAI Accessibility Guidelines outlined at http://www.w3.org/TR/WAI-WEBCONTECT/, wherever possible. Preferably, the site does not use frames and all site pages should be available for search engine robots, except pages which are secure. All pages that use multimedia, such as Flash, must 'sniff' for the correct plug-in and display a static image if necessary. Mouse-over functionality is provided so that in the registration form and ad campaign creation form, when the mouse pointer is hovered over the field names, a description box appears, providing the user details about the field, what's it's for, etc. The mobile application 'look' preferably conforms to the various requirements, including that it be compatible with the mobile operating systems, such as those associated with trade names Android and iOS, with a future release supporting Windows Mobile and RIM. The app and web site are presented in a plethora of languages to suit various geographic and demographic regions—English, Chinese, Russian, French, Spanish, Portuguese, Japanese, etc.

FIG. 5 illustrates a screen shot showing a first level of navigation for consumer users on the web site, shown generally at 1000, depicting a first level of navigation for consumer users. Generally, the first level of navigation on the app includes a "Home Page" 1001 with links to a "How It Works" 1002 tab, "Download" 1003 tab, "For Merchants" 1004 tab, and "Help" 1005 tab. Upon selection of the "How It Works" 1002 tab the user/consumer is shown details of how the mobile app is used. Selection of the "Download" 1003 tab provides links to downloading software, such as that sold under the trade names Google Play, to download the specific app platform for the Smartphone or table brand, such as for example utilizing Google Play to download an Android version of the app, and iTunes to download the iOS version of the mobile application. Selection of the "For Merchants" 1004 tab links to the Merchant sector (i.e. MERCHANTS.MOBORD.COM) of the subject mobile billboard app. Lastly, selection of the "Help" 1004 tab links the user/consumer to general help information, or availability via direct contact with a live chat helpline or email communication, on the subject mobile billboard app. Each link 1001-1005 includes a set of secondary 'standard' links, as well: "About Us" 1006, providing information about the application's company; "Social Media Links" 1007, providing direct links to social media venues, such as those associated with the trade names Facebook, Twitter, Four Square, etc.; and "Email Newsletter Signup" 1008, providing opt-in email lists for all consumers registered with the subject mobile billboard app. The consumer user is prompted to "Login" 1009 throughout any of the link tabs provided.

FIG. 6 illustrates a screen shot showing first and second levels of navigation for merchant users on the web site, shown generally at 2000. Generally, the first level of navigation for merchant users includes a merchant "Home Page" 2001 with links to a "Dashboard" 2002 tab, "Create Campaign" 2003 tab, "Account" 2004 tab, "Register" 2005 tab, "How it Works" 2006 tab, "For Consumers" 2007 tab, and a "Help" 2008 tab; "Login" 2020 tab is provided on the "Home Page" 2001, as well as for each link 2002-2008. Selection of "Dashboard" 2002 results in displays of ad campaign summary(s), including default to display active ad campaigns 2009, as well as the ability to view previous and/or inactive campaigns—past campaigns 2010. A "Reports" 2011 tab is provided to display marketing data generated relevant to campaigns. "Create Campaign" 2003 tab links the merchant to a wizard-type guided setup of new ad campaigns. "Account" 2004 tab links the merchant user to an "Account Summary" 2012 tab, "Personal Information" 2014 tab/link, such as "Billing Information", and "Contact Preferences". "Register" 2005 link enables the merchant to have access to and complete a registration form. Selection of the "How It Works" details on how the subject mobile billboard app works, breaking it down via a "Merchants" 2014 and "Consumer" 2015 link. Upon selection of the "Consumer" 2015 link, the page discussed in FIG. 5 preferably appears, leading to the links provided thereon. The "Help" 2008 tab links the user to a general help section, contact section via live messaging, email, or a phone number for administrative and/or use help. At any point the merchant can "Login" via link 2020. When the user accesses the Dashboard, Create Campaign or Account pages, they are required to login first with their username (email) and password. If cookie is enabled in the user's computer, a cookie will be saved to remember login information for 48 hours.

Generally, the second level of navigation for merchant users includes the Dashboard 2002 with: Active Campaigns 2009, current running ad campaigns; Past Campaigns 2010, previous campaigns, split as completed campaigns and canceled campaigns; and Reports 20122, link to the reporting tool. Within the second level of navigation, the Account 2004 link includes links for: Account Summary 2012, lists latest invoice amount, the amount due as of X date, and the current balance; Personal Information 2013, name, registered email, password, payment methods, communication preferences, etc.

All pages will include a set of secondary 'standard' links, as well, including an "About Us" 2016 link, providing information about the app host company; a "Social Media Links" 2017 link, providing links to social medias, such as those associated with trade names Facebook, Twitter, etc.; and "Email Newsletter Signup" 2018 link, opt-in email list for all of the subject apps consumers.

Figure 7:
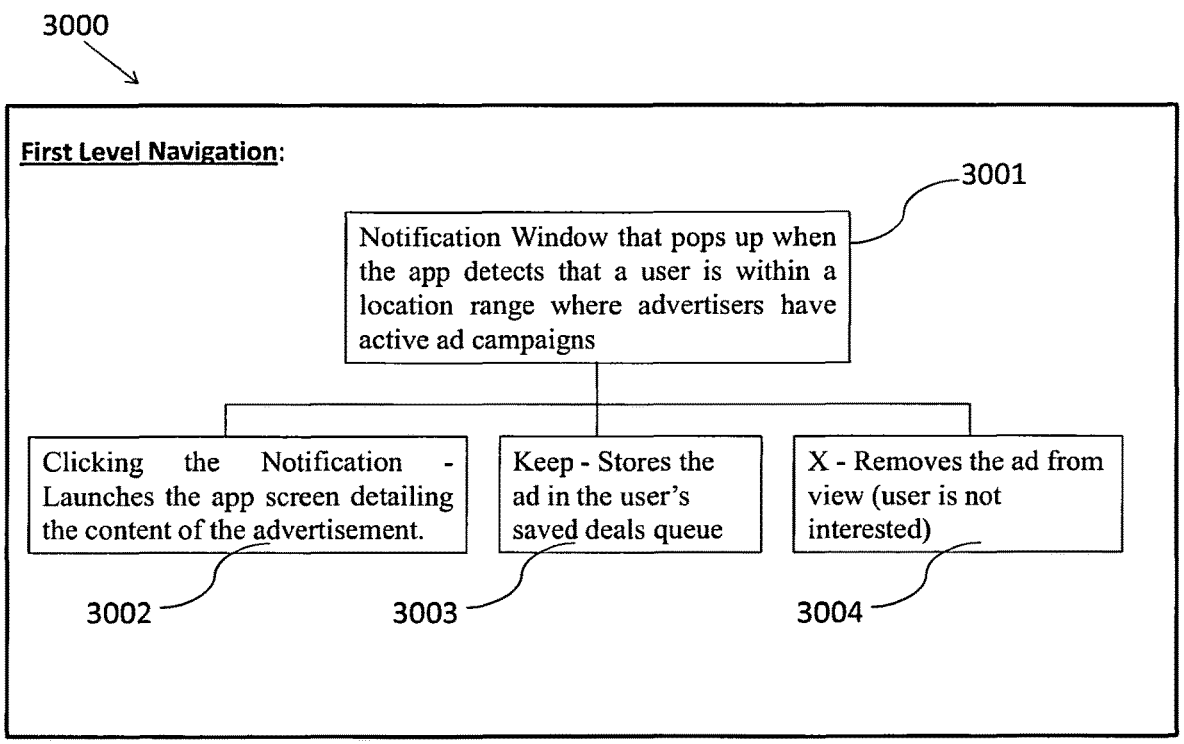
FIG. 7 illustrates a flow chart structure of the launch of the mobile billboard app, showing the first level of navigation.
Figure 8:
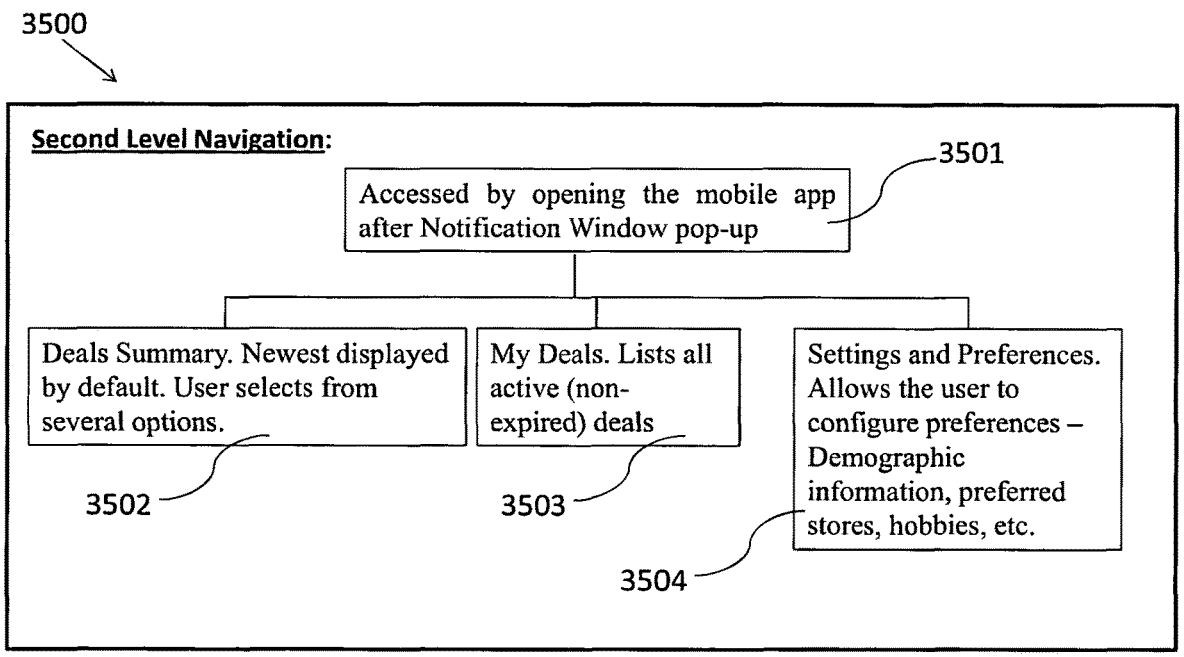
FIG. 8 illustrates a general flow chart structure of the launch of the mobile billboard app, showing the second level of navigation.

FIGS. 7 and 8 illustrate the general flow chart structure of the launch of the mobile billboard app, showing the first level of navigation generally at 3000, and the second level of navigation generally at 3500. The mobile application structure and navigation delivers a compelling user experience without sacrificing usability and accessibility. First level navigation is essentially the notification window 3001 that pops-up or alerts a user when the app detects that the user is within a location range where advertisers have active ad campaigns. Within that window, the user navigates via selection of tabs. The tabs include the ability to launch the application by "Clicking the Notification" 3002, thus launching the app screen detailing the content of the advertisement. Alternatively, the user can select a "Keep" 3003 tab, thereby storing the ad in the user's saved deals queue. If the user is not interested in launching the details of the advertisement, or keeping the advertisement, the user can select a "X" 3004 or ignore tab to remove the ad from view (user is not interested).

If the user opens the mobile app, via "Clicking the Notification" 3002, the app launches and the second level of navigation is provided for access as illustrated in FIG. 8 at 3500. At 3501 the mobile app is accessed by opening the app after Notification Window pop-up. Upon executing the application, a series of links appear. A "Deals Summary" 3502 is presented wherein if selected the user is presented with the deals—with the most recent or newest deal displayed by default. At that point the user can select from several options (see FIG. 11 hereinafter). A "My Deals" 3503 tab link is provided wherein the link lists all active and/or non-expired deals. A "Settings and Preferences" 3504 tab link is displayed that allows the user to configure preferences—such as demographic information, preferred stores, hobbies, etc.

Figure 9:
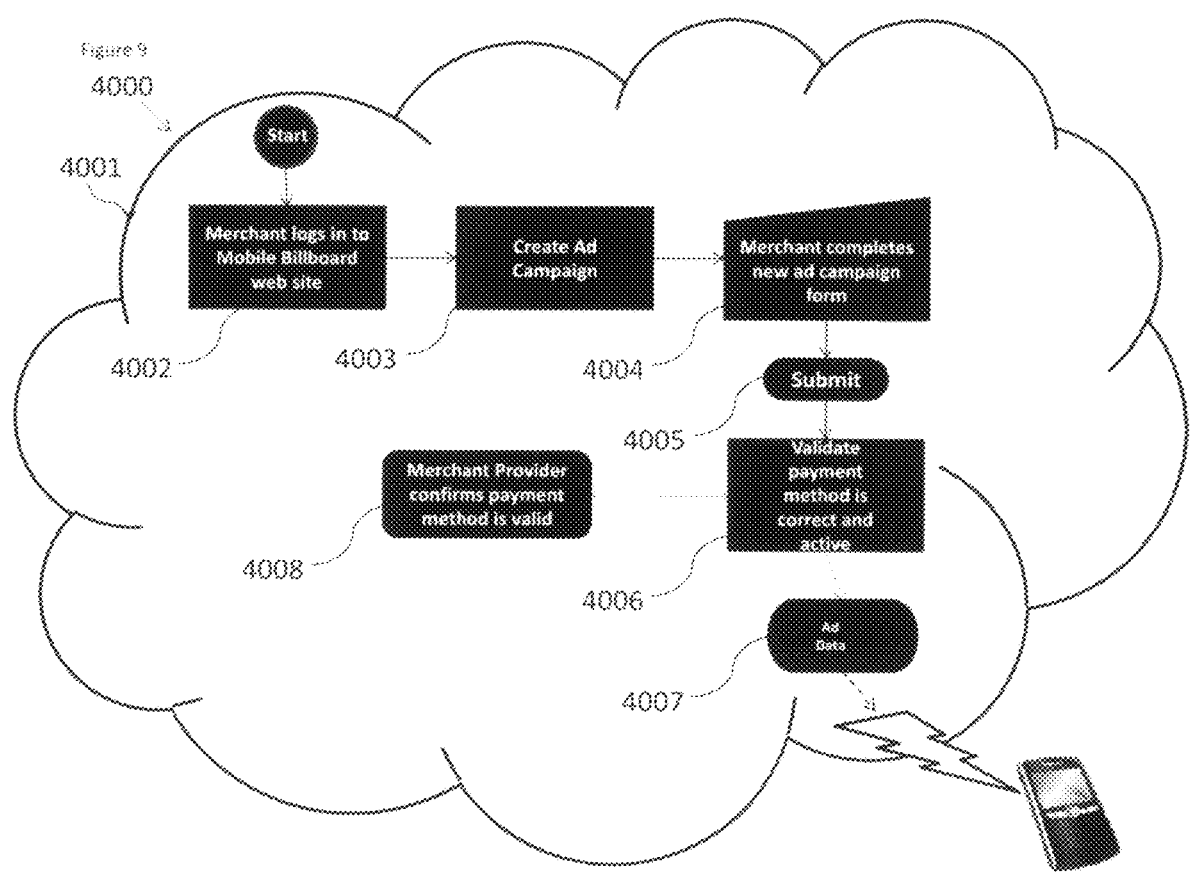
FIG. 9 illustrates how an ad campaign is created and sent to the subject mobile billboard app.

FIG. 9 illustrates how an ad campaign is created and sent to the subject mobile billboard app, shown generally at 4000. The mobile billboard app message app website and the main database reside in a high-availability hosted environment 4001, such as that under the trade name Amazon Cloud services. Ad campaign data, such as ad details, merchant names, campaign radius, number of impressions, target audience criteria, are sent to the mobile billboard mobile application via regular nightly feeds. After starting 4002 the merchant logs in to the mobile billboard web site at 4003 and selects the "Create Ad Campaign" link 4004. Merchant completes the New Ad Campaign 4004 creation form and submits the form. On submission of the New Ad Campaign 4004 form at 4005, the system checks the current stored payment method of the merchant at 4006. If the payment method stored is a bank account, the form submission is allowed and the new ad campaign 4007 is created and scheduled. If the payment method stored is a credit card account, the system communicates with the merchant provider to verify that the Merchant's credit card number is valid (for billing purposes). If the validation fails (i.e. expired, over the credit limit, etc) as indicated at 4008, the user is returned to the new ad campaign submission form 4004. Display a new section in the form 4005 to allow the merchant to update their billing information. The fields in the section of the form 4005 are preferably mandatory. Once the section is completed, the merchant resubmits the form 4005 and the validation cycle happens again. On successful validation, the updated payment method is stored in the merchant's account information. If the validation is successful, the form 4005 submission is allowed and the new ad campaign is created and scheduled. New ad campaigns/ad data 4007 are downloaded to the mobile application on the next feed cycle.

Figure 10:
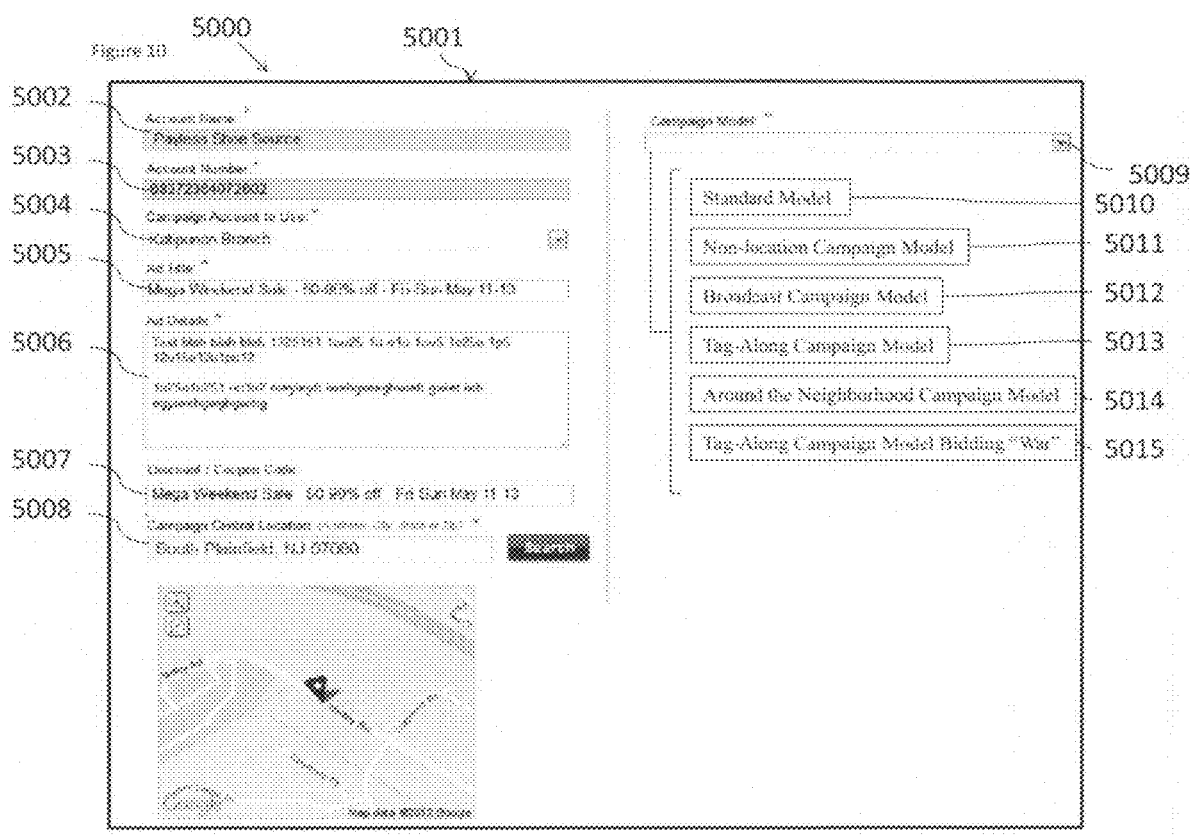
FIG. 10 illustrates a screen snapshot layout of a merchant screen for creating an advertisement campaign.

FIG. 10 illustrates a screen snapshot layout of a merchant screen for creating an advertisement campaign, shown generally at 5000. In "Creating an Ad Campaign" only registered merchants can create ad campaigns. In "Creating an Ad Campaign" only registered merchants can create ad campaigns. To create an ad, the merchant clicks the "Create Campaign" link from the mobile billboard merchant web site. Throughout the web page fill-able form 5001 preferably visual indicators, such as a red asterisk *, to indicate fields that are mandatory are provided. The merchant Account Name is shown at 5002 as corresponding the merchant's registration when originally registered. The field is already pre-populated and cannot be edited. The form includes the Account Number 5003 corresponding to the merchant account name 5002, and same is preferably pre-populated and read-only. The Campaign Account to Use 5004 is provided wherein a merchant/advertiser may have multiple campaign accounts to allow them to define ads for specific items, scenarios, or clients. For example, if a merchant was advertising, such as Starbucks®, they may create a Campaign Account for each of their branches, so that they can run ad campaigns on the branches level. Or each Campaign account can represent a type of product, such as a campaign account for running an ad related to iced coffee, another for hot coffee, and another for tea, etc. If it was an ad agency, they may setup the Campaign Accounts to represent their clients. Say Agency 1 has clients Starbucks®, Gatorade®, and Nike®. They might create 3 different Campaign accounts to represent each of their clients. It is up to the merchant how they want to use the Campaign Account(s). At a minimum, each registered merchant/advertiser must have at least 1 Campaign Account 5004. The Campaign Accounts are managed in the advertiser/merchant's account section. Ad Title 5005 is provided for entry. The ad title 5005 is what is displayed to the user(s) in the popup notification on the phone or tablet or mobile device. Ad Details 5006 are entered by the merchant/agency. The Ad Details 5006 are displayed on the phone when the phone user clicks the Details option of the ad notification. A Discount/Coupon Code entry is provided at 5007. The ad campaign's reference point is entered in the Campaign Central Location 5008 entry, which in turn determines the ad campaign's reference point for defining the ad campaign radius. This is the point the mobile billboard app uses when determining if an end-user is within the radius of the campaign to display the ad. Campaign Model 5009 is provided, which drives additional fields to be displayed on the form. The selected model determines the whole logic if an ad is displayed to a user or not.

Campaign Model 5009 includes various campaign models, including: (i) a Standard Model 5010; (ii) Non-location Campaign Model 5011; (iii) Broadcast Campaign Model 5012; (iv) Tag-Along Campaign Model 5013; (v) Around the Neighborhood Campaign Model 5014; and (vi) Tag-Along Campaign Model Bidding "War" 5015.

The Standard Model 5010 is the primary campaign model. The other campaign models are generally variations of the Standard Model 5010. In this model, by default (no additional options selected), when the mobile billboard app user is within 3 miles of the Central Campaign Location 5008, and the keyword set for the campaign is satisfied, the ad will be displayed on the phone. The merchant can add additional options to refine the target demographics, such as adding a condition for the target gender, target age groups, additional keywords, etc. The addition of those options would then make the ad placement more selective, as those conditions have to be met before the ad can be displayed on the phone. Examples are set forth herein below:

Example 1

Merchant: Nike®; Objective: Run an ad to anyone who has an interest in shoes and who's within the vicinity of their new store in Times Square, New York City. Campaign Central Location: 1 Times Square, New York, NY; Keyword: Shoes; Campaign Additional Options No additional Options selected. In operation, when ANY user with the mobile billboard on his phone is within 3 miles of the Nike Store (3 miles of 1 Times Square, New York, NY) and he/she set "Shoes" as an interest in his/her profile, the condition of the ad is satisfied and the Nike ad is displayed on the phone.

Example 2

Merchant: Nike®; Objective: Run an ad to ONLY women who have interest in shoes and who are within the vicinity of the new Nike store in Times Square, NY; Campaign Central Location: 1 Times Square, New York NY; Keyword: Shoes; Campaign Additional Options: Gender=Female. In operation, when a WOMAN with the mobile billboard app is within 3 miles of the Nike store, and she set "shoes" as an interest in her profile, the condition of the ad is satisfied and the Nike ad is displayed on the phone. When a MAN with the mobile billboard app is within 3 miles of the Nike store, and he set "shoes" as an interest in his profile, the condition of the ad is NOT satisfied (since Gender=Female only) and so the ad is not displayed on the phone. When a WOMAN with the mobile billboard app is within 3 miles of the Nike store, but did not set "shoes" as an interest in her profile, the condition of the ad is NOT satisfied (since Keyword should be "shoes") and so the ad is not displayed on the phone.

Example 3

Merchant: Nike®; Objective: Run an ad to ONLY women who have interest in shoes and who are within the vicinity of the Nike stores in Time Square NY, Jersey City, and Main St. Boston; Campaign Central Location: 1 Times Square New York; Keyword: Shoes; Campaign Additional Options: Gender=Female; Target Locations=New York, NY, Jersey City, NJ, Boston, MA In operation, when a WOMAN with the MOBORD app is within 3 miles of the store in New York, and she set "shoes" as an interest in her profile, the condition of the ad is satisfied and it is displayed on the phone. A similar WOMAN within 3 miles of the Jersey City store will also get the ad. Same if there is another WOMAN who is within 3 miles of the Boston store. If Nike had a store in Los Angeles, CA and there was a WOMAN within 3 miles of that store, the ad wouldn't show up even if the "shoes" keyword is satisfied since the Los Angeles store is not setup as a Target Location. The app however should record this as a "missed opportunity" since it satisfied partial conditions of the campaign. Nike would see this in their report and can use it to improve their future campaigns.

In the Non-location Campaign Model 5011, which is a variance of the Standard campaign model 5010, there is no dependence on the mobile billboard app user's location to trigger an ad notification. It allows the merchant to target specific demographics and send out ads to them without the dependency of them being within the radius of specific locations. In this model, the merchant defines how often (interval) the target demographics will receive the ad. The "Ad Display Interval" definitions are: (a) One Time—once the campaign goes live, each user that satisfies the campaign criteria will receive the ad once. It will never repeat an ad for the same user; (b) Daily Summary—A user that satisfies the campaign criteria will receive the ad as part of the Daily Summary list section of the mobile billboard app. The ad will be listed in the list section every day until the Duration and/or Budget condition of the campaign is satisfied; (c) Every Other Day—Summary—A user that satisfies the campaign criteria will receive the ad as part of the Daily Summary list section of the mobile billboard app. The ad will be listed in the list section every OTHER day until the Duration and/or Budget condition of the campaign is satisfied; or (d) Once a Week—A user that satisfies the campaign criteria will receive the ad as part of the Daily Summary list section of the mobile billboard app. The ad will be listed in the list section every week, on the day when the ad campaign started, until the Duration and/or Budget condition of the campaign is satisfied (i.e. if the ad started on a Tuesday, then the user will see the same ad every succeeding Tuesday). For examples, see Example 4 below Example 4

Merchant: Nike®; Objective: Run an ad to ONLY women who have an interest in shoes; Campaign Central Location: {the merchant will still enter a value since it's a required field, but it is irrelevant to this model's logic}; Keyword: Shoes; Campaign Additional Options: Gender=Female; Ad Display Interval=One Time. In operation, when the campaign goes live, the app looks at the user's profile database and finds those that are Gender=Female, and have "Shoes" as an interest. WOMAN A, who satisfies the condition, gets the ad notification, whether she's 3 miles or 300 miles from the Campaign Central Location if the Ad Display Interval=One Time. If the Ad Display Interval=Daily, WOMAN A wouldn't receive the ad immediately. At 5 pm in her time zone, the Daily Summary list in her phone would refresh. When she goes to the mobile billboard app and looks at the Summary list, the Nike ad would be listed.

In the Broadcast Campaign Model 5012 the merchant/advertiser just wants to advertise to any mobile billboard app user. There are no demographic criteria, keywords, or other options that limit who should get the ad. Once the campaign goes live, it just sends the ad to mobile billboard users. If there are more app users than the number of impressions set by the advertiser, the app will randomly send the required number of impressions to RANDOM app users. The merchant defines how often (interval) the target demographics will receive the ad. The "Ad Display Interval" definitions are: (a) One Time—once the campaign goes live, each user that satisfies the campaign criteria will receive the ad once. It will never repeat an ad for the same user; (b) Daily Summary—A user that satisfies the campaign criteria will receive the ad as part of the Daily Summary list section of the mobile billboard app. The ad will be listed in the list section every day until the Duration and/or Budget condition of the campaign is satisfied; (c) Every Other Day—Summary—A user that satisfies the campaign criteria will receive the ad as part of the Daily Summary list section of the mobile billboard app. The ad will be listed in the list section every OTHER day until the Duration and/or Budget condition of the campaign is satisfied; (d) Once a Week—A user that satisfies the campaign criteria will receive the ad as part of the Daily Summary list section of the mobile billboard app. The ad will be listed in the list section every week, on the day when the ad campaign started, until the Duration and/or Budget condition of the campaign is satisfied (i.e. if the ad started on a Tuesday, then the user will see the same ad every succeeding Tuesday). Similar to the Non-Location campaign model, unless the Ad Display Interval selected is "One Time", the ads will show up in the app's Daily Summary list.

In the Tag-Along Campaign Model 5013, similar to the Broadcast Campaign model, there are no demographic criteria or location options that are defined in the campaign. The main difference, and what is the main feature of this model, is that the ads' trigger depends on other campaigns to trigger their ads. The model relies on ACTIVE Standard, Non-Location, and Around-the-Neighborhood campaigns to run and execute their logic for it to deliver the ads to MOBORD users. When those other ACTIVE campaigns satisfy their conditions and send ads, the ad from this model "tags along" with the other ads. If there are no ACTIVE campaigns running, the merchant will not be able to create the campaign, and it ONLY tags along Standard, Non-Location, and Around-the-Neighborhood campaigns (not Broadcast). A merchant can "tag-along" any campaign or their competitors' campaigns. They can also define to "tag-along" only specific keywords those campaigns are using. There are a maximum number of tag-along ads per Standard, Non-Location, or Around-the-Neighborhood ad displayed. Refer to the global variable "Maximum Tag-Along Ads" herein for the limit. Unless they are tag-alongs specific to their competitors, the system randomly selects which tag-along ads would tag-along to an ad. Merchants typically select this type of campaign owing to its abundant reporting. If a merchant is building hype on a product for example, but is still trying to understand their target audience, they want to get a feel of what data is triggering successful campaigns. If they opted to receive the report on what specific criteria were met to trigger the ads, they would get valuable information on how to build their future ad campaigns. This would not hurt other of merchant's campaigns since the ads "tag-along" randomly with those campaigns when they trigger and no information about those campaigns is given. Merchants pay a premium (higher CPM costs) to run this type of model since it essentially serves as a data gathering campaign for them. Example 5 below illustrates the Tag-Along Campaign Model 5013:

Example 5

Merchant: Nike®; Objective: Though MOBORD may give Nike a list of app user's interests (the keywords), or where users normally go in the submission form, it doesn't provide a lot of details as to which locations and/or keywords are triggering active campaigns. By tagging-along over a certain period, it will allow Nike to gather data that could be useful in building a good campaign in the future. In operation, Nike creates a tag-along campaign that just features their Nike brand as the content of the ad. It will run for duration of 1 month. During the time they execute the campaign, 3 ACTIVE campaigns are running in the system (campaign A, B, and C). Person 1 meets Campaign A's condition and triggers. The ad is displayed on Person 1's phone. The ad displayed would be a list, with Campaign A's ad ranked first, then Nike's (see FIG. 11). When Person 2 meets Campaign C's condition and triggers, the Campaign C ad would appear on Person 2's phone, together with Nike (similar to the screenshot of FIG. 11).

Figure 11:
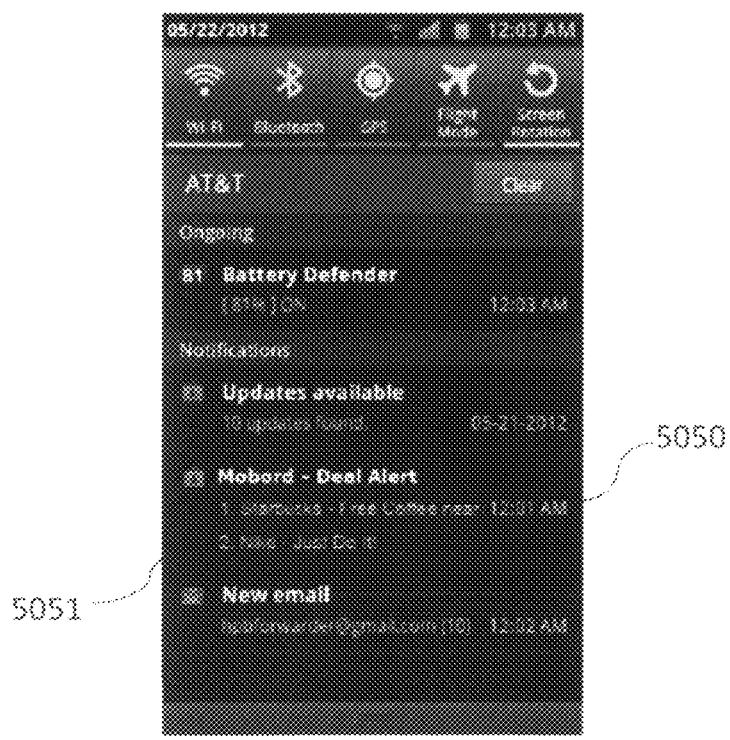
FIG. 11 illustrates a screenshot display showing two add campaigns being displayed.

FIG. 11 illustrates a screenshot display showing two add campaigns being displayed. As shown, Campaign A's ad is shown first at 5050 while Campaign B's ad is shown second at 5051.

Figure 12:
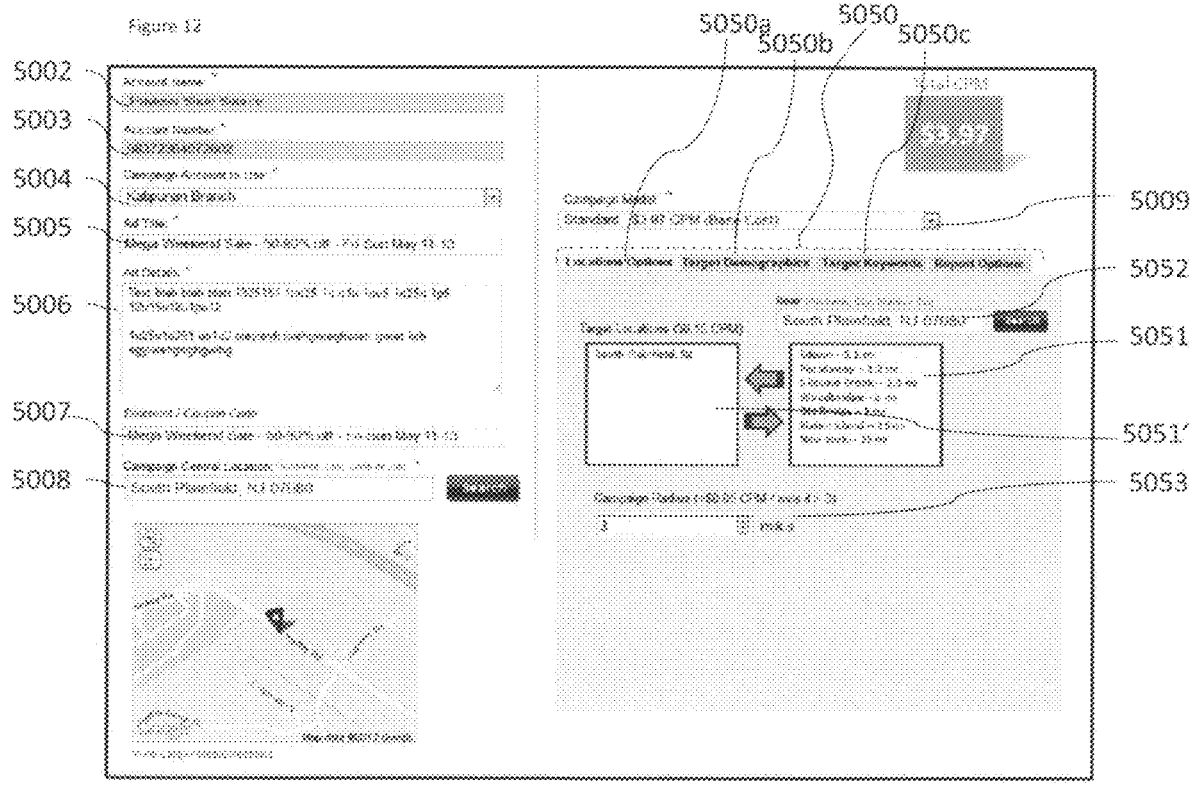
FIG. 12 illustrates a screenshot detailing an embodiment upon selection of the Campaign Model.

FIG. 12 illustrates a screenshot detailing an embodiment upon selection of the Campaign Model 5009. On selection of the Campaign Model 5009 the merchant elects to use, the five Options tabs—Location, Target Demographics, Target Keywords, Membership Programs (not shown), and Report Options, appearing on the screen to enter location details, demographic options, keywords, etc. as illustrated at 5050. Preferably, an option to bid to stop tag-alongs or, in the case of tag-alongs, the option to bid to "tag-along" appears also after a Campaign Model is selected (discussed hereinafter). In the subject figure Location Options 5050a is selected. Location Options 5050a defines the location criteria that will be used to target the placement of the ad. Only those users that satisfy the criteria set on the Location Options 5050a will get the ad notification. The Location Options tab 5050a only appears for the following Campaign Model values: Standard and Around the Neighborhood. By default, the "Campaign Central Location" value is added to the Target Locations list 5051. Merchant uses the "Near" field 5052 to list the available locations from the Location List table, sorted by how close those locations are from the "Near" search criteria. The "Near" field is pre-populated with the "Campaign Central Location" value. User must click the "Search" button to populate the location list field. If the merchant wants to see all the list of available locations, the "Near" field is left blank and they click the Search button. The location list field is populated with ALL location values, sorted alphabetically. The user chooses target locations by selecting from the location list field and dragging them to the Target Locations field 5051'. User can select multiple values by holding the CTRL key and then clicking the selections. Campaign Radius field 5053 defaults to 3 miles. This defines the radius to check to satisfy the campaign condition. The merchant can expand the radius range, but the minimum value is 3 miles. The Campaign radius field value applies to all Target Locations added.

Figure 13:
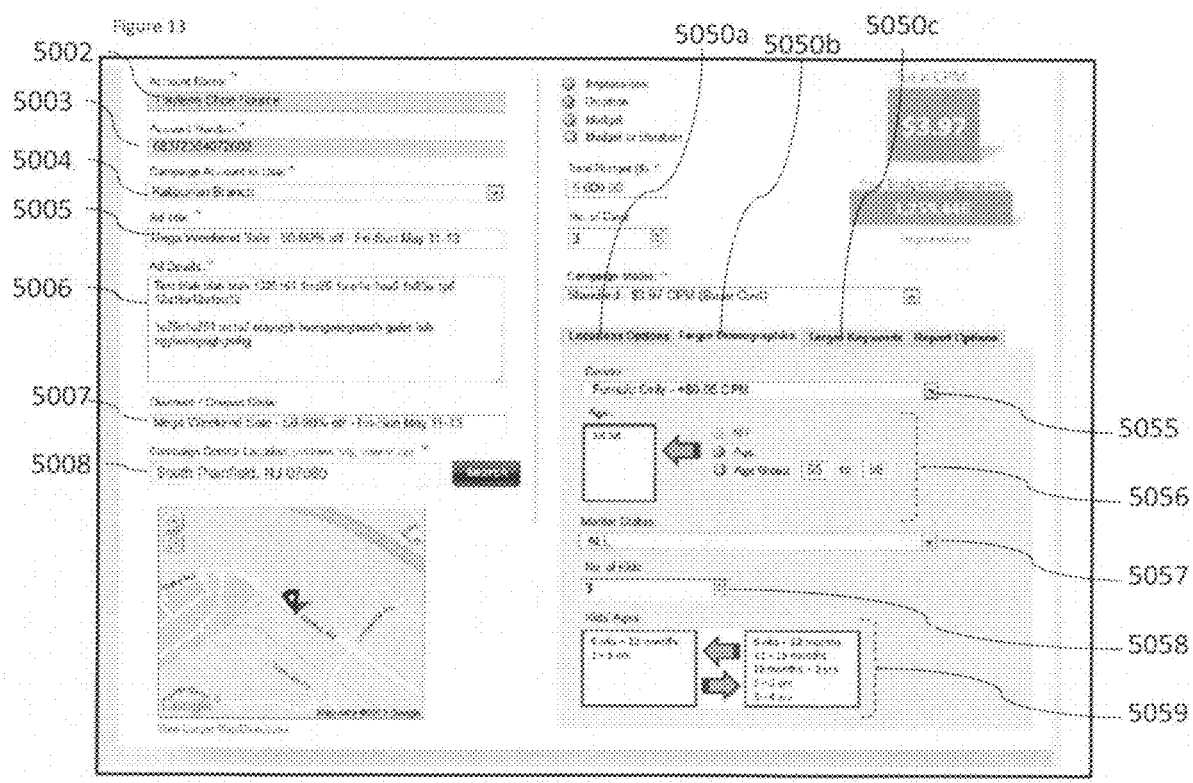
FIG. 13 illustrates a screenshot showing Target Demographics selected from the Campaign Model.

FIG. 13 illustrates a screenshot showing Target Demographics 5050b selected from the Campaign Model 5009. Target Demographics 5050b defines additional criteria based on specific demographic information that will be used to target the placement of the ad. Only those users that satisfy the criteria set will get the ad notification. Meeting the demographics criteria of a campaign relies on the information available on the app user's profile. Since the app user has the option on what information they complete in their profile, ad campaigns may not accurately hit their target demographics. Example: If a user does not indicate that their marital status is Married, and an ad campaign targeting Married users is active, then that user will not receive that campaign ad even if they meet the other campaign criteria for location, etc, since the ad campaign specifically looks for "Married" users. The tab only appears for the following Campaign Model values: Standard, Non-location, and Around the Neighborhood. By default, the ad campaigns go out to all gender types (default value of dropdown: ALL). The merchant can target gender 5055 to only send it to Males or Females and status (married, single, divorced, etc.) at 5057. The ad campaign can also be targeted to specific ages or age groups at 5056. To add an age or age group, the merchant selects the appropriate age selection and then clicks the arrow to add to the Age selection field. If ALL is selected, no additional age or age group can be added. If specific age or age groups are added to the Age selection field, ALL cannot be selected (radio button is grayed-out). The app calculates age based on the current date the app is validating the age criteria. Similar to the Age selection field, the merchant can also define Kids at 5058 and specific Kids' ages or age groups to target at 5059. The Kids' Ages selection fields only appear if the "No. of Kids" field value is 1 or more.

Figure 14:
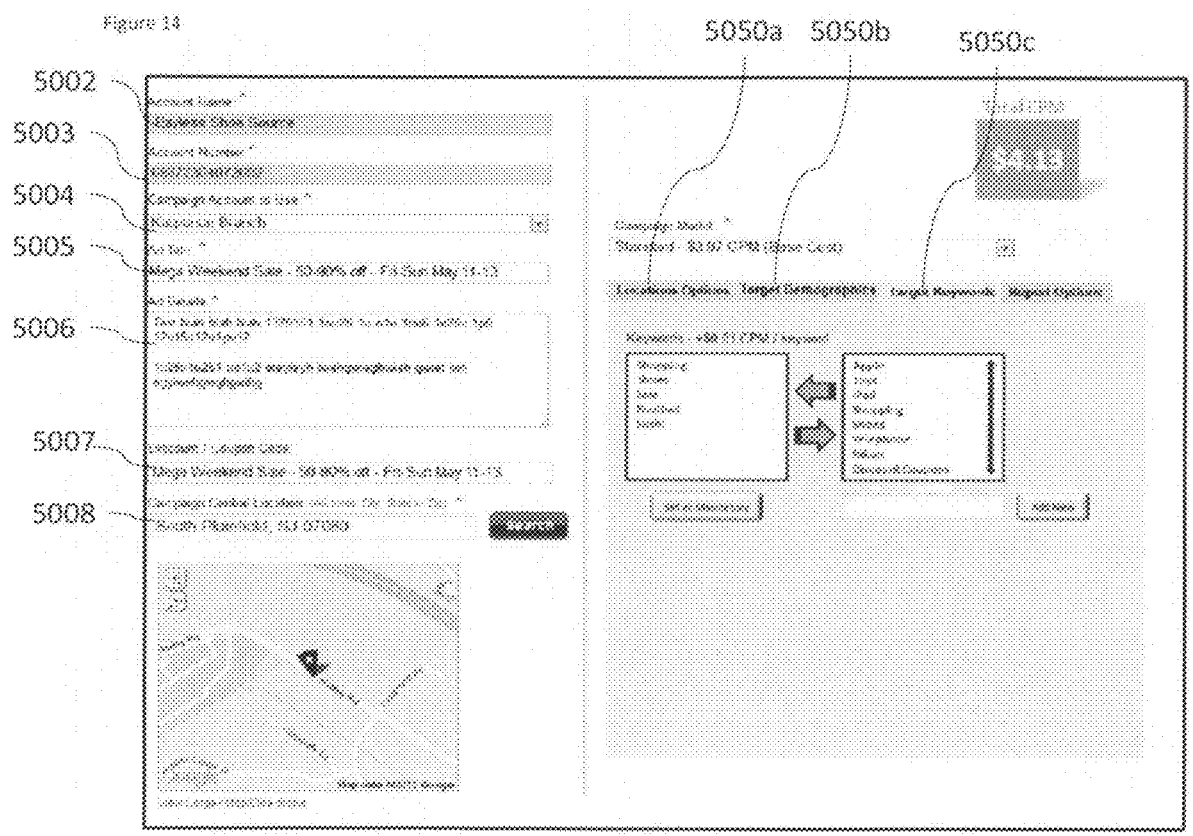
FIG. 14 illustrates a screenshot showing Target Keywords selected from the Campaign Model.

FIG. 14 illustrates a screenshot showing Target Keywords 5050c selected from the Campaign Model 5009. Target Keywords 5050c provides the ability for the merchant to also add additional filtering criteria to limit the scope of their campaign based on specific keywords. For Standard, Non-Location, and Around Models—the-Neighborhood models, the list of keywords available for selection is pulled from the app user's Interests that they set on their profiles. For the Tag-Along model, the list of keywords available for selection depends on the following: If they selected "Only Competitors" to tag-along their ads, limit the list of keywords to only those currently being used in ACTIVE campaigns of their "competitors"; If all, the list of keywords available for selection are those currently being used in ALL ACTIVE campaigns. The tab only appears for the following Campaign Model values: Standard, Non-Location, and Around the Neighborhood.

Figure 15:
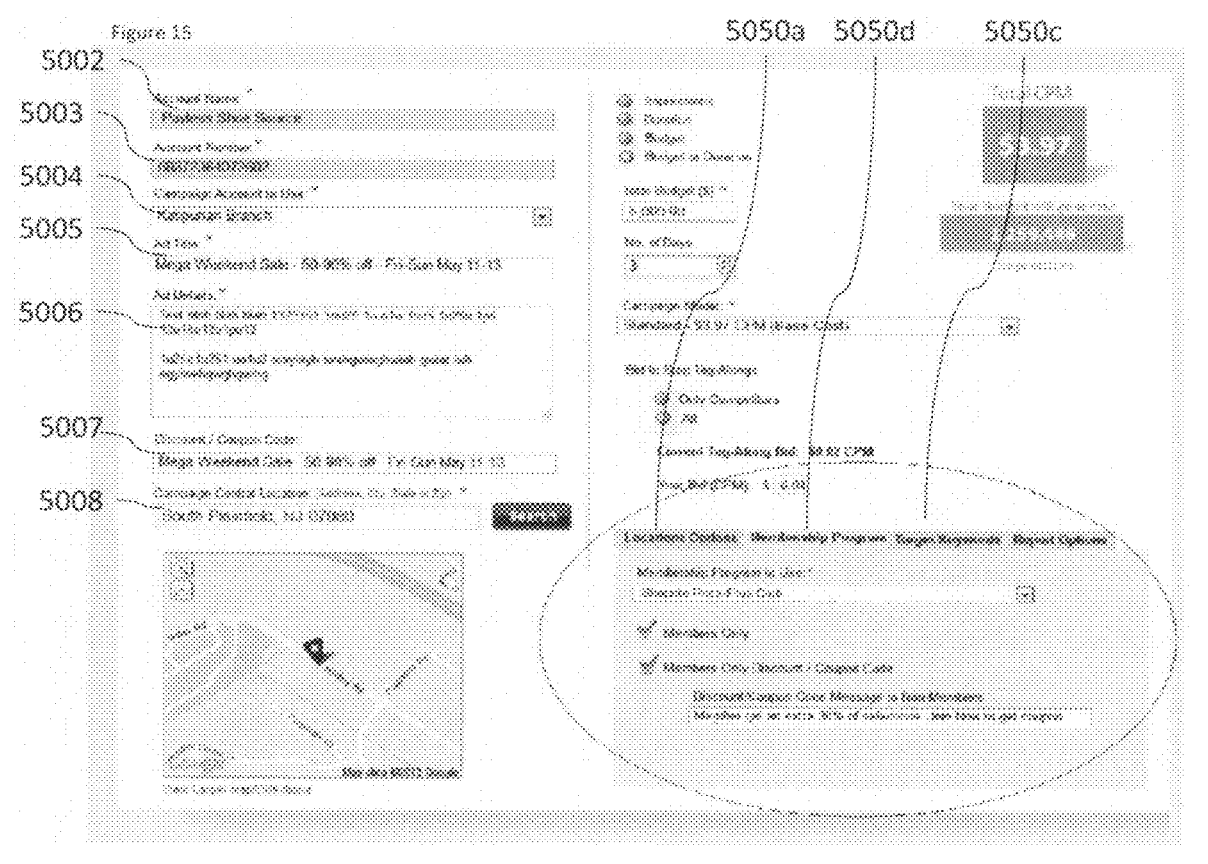

FIG. 15 illustrates a screenshot showing optional Membership Programs 5050d. Membership Programs 5050d can be opted into by the merchant and involves setting the merchant's ad campaign to target members. As stated previously (refer to the merchant profile registration section), when a merchant/advertiser registers for an account, they are assigned a unique Account Name and Account Number. Within their account, they can then create multiple Campaign Accounts. And within each Campaign Account, they can create multiple Membership Programs. The Membership Programs tab ONLY appears if: (i) The "Campaign Account to Use" field value selected has associated Membership Programs; (ii) The Target dropdown allows the merchant to set the campaign to either be sent only to Members (selecting the "Members Only" checkbox), OR to Members and Non-Members; (iii) The Membership Program also allows the merchant/advertiser to limit the coupon/discount code to display only to Members. If the "Members Only Discount/Coupon Code" checkbox is selected, the Discount/Coupon code field will be tied to the membership number and will only display if an end user is part of the advertiser's membership program. If the user is not part of the membership program, the merchant/advertiser can provide a text verbiage that would display to the user in lieu of the coupon.

Figure 16:
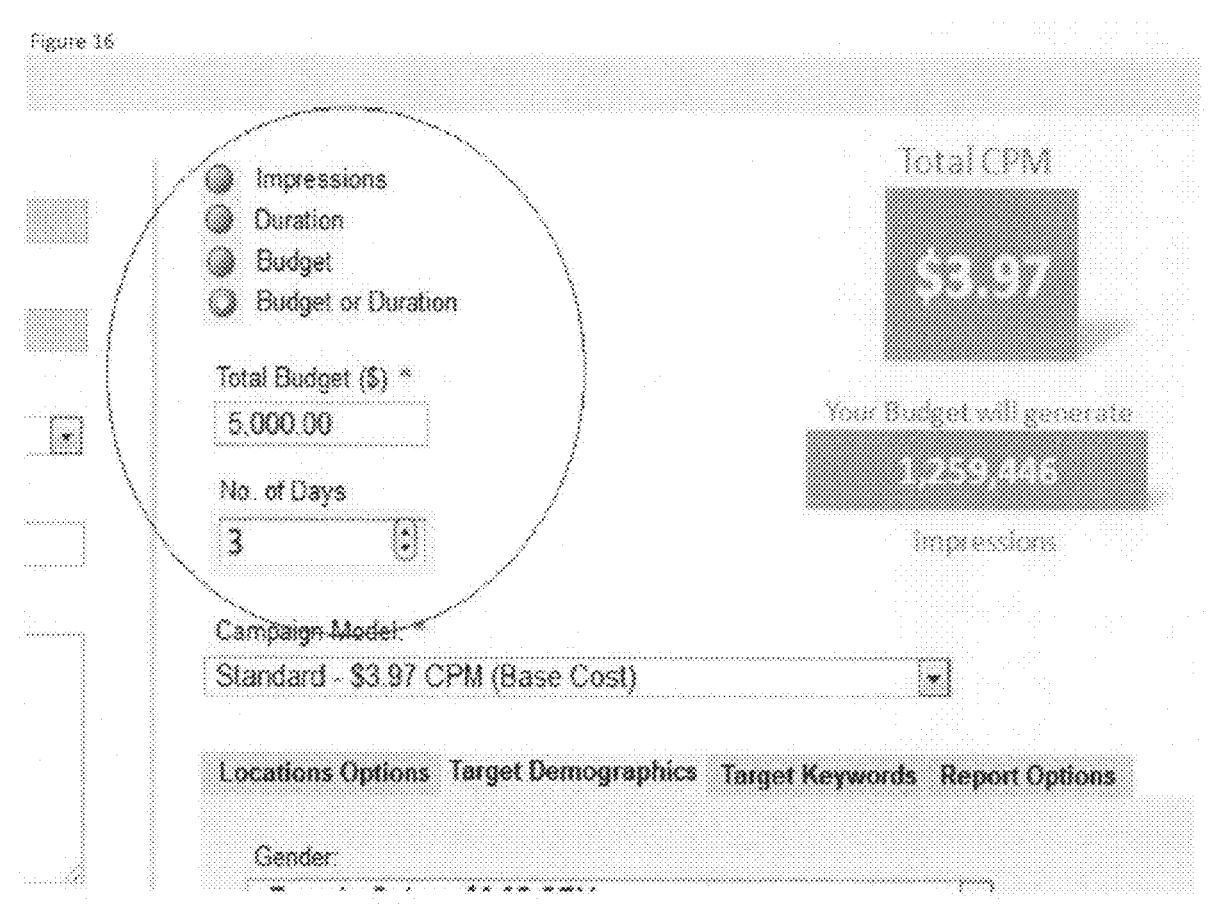

FIG. 16 illustrates a snapshot of a screenshot illustrating a merchant's budget. Ideally, after the merchant picks options for locations and demographics, the merchant would click a button such as "Next" to then have them pick the options on the Campaign Type Section, where they enter how the campaign will run—by number of Impressions, using a budget, or duration. Refer to the field definition table for details on the section. By doing it this way, it allows the "Your budget will generate" to calculate based on the value they enter. In reality, a merchant might want to complete the Campaign Type Section anytime so that while they're picking options on locations, demographics, etc, they can see how much the additional options cost impact the number of impressions they'll get for their budget. So the "Your Budget will generate" should dynamically change immediately as they are selecting/picking options. If Impressions is selected as the Campaign Type, the ad campaign will run continuously until the number of impressions is met. Do not display the "Your Budget will generate" read only box. (Day 2) Reminder functionality—if the number of impressions being displayed over a certain period falls off drastically a certain threshold, generate a notice to the merchant to allow they to take a look at their metrics and maybe either stop the campaign or change it to improve. (Day 2) Alert functionality—Though the merchant doesn't have a set budget and would like the ad campaign to run continuously until the Impressions are all used up, they might want an alert when the cost hits a certain amount. This can also be used for the other Types such as Duration. For Example Merchant selects Impressions, and enters "10000". This means the ad campaign will run until 10,000 ads are generated based on the campaign criteria. If Duration is selected, the ad campaign will run over the defined duration period. Since the ad campaign data on a user's phone gets refreshed by a nightly feed, new ad campaigns don't start immediately. Instead of displaying the "Your budget will generate" box, display "Your ad campaign ends on" with the end date of the campaign. All new campaigns start and end times will be based on the submitter's (the merchant) time zone. When they are creating the ad campaign and select Duration, HTML5 can pull the user's local time zone information. This data is stored to allow the system to know at what time to start and end the campaign. All new campaigns start at 6 am of the start date and end at 11:59 pm of the end date on the time zone set for that campaign. In another Example: Merchant selects Duration and enters 3 days. Current date: 06/01/12. His local time zone is PST (California). Assume the current time on the central cloud server is 06/01/12 6 pm EST. After he enters 3 days, the "Your ad campaign ends on" box appears and will display "06/05/12 PST". This is because once he submits, the campaign will start on 6/2, not 6/1. The central server would then sync with the phone apps and load the latest data at the start of 6/2 (see Sync information Section). At 9 am EST on 6/2, which would be 6 am PST, the ad campaign will be marked "Started" and will start generating ads if the campaign criteria is satisfied. At 2:59 am EST on 6/6, which would be 11:59 pm PST 6/5, the ad campaign will be marked "Completed" If Budget is selected, the ad campaign will run until the defined budget is used up.

Since the individual phone apps sync up with the central source only via the nightly feed sync-up, there is no way to track how many impressions have been generated on an ad campaign real-time. Therefore, the calculation of number of impressions generated vs. budget can occur only after returning data to the central system and consolidating all phone apps data for each campaign. That is why there are 2 nightly feeds, run at different intervals (See Sync Information Section herein). The first sync is to get all phone data back to the central system. The second sync is the nightly feed of fresh data back to the phone. If after getting the phone data back and calculating the number of impressions generated, it results in an ad campaign already hitting the budget, the system tags the Campaign as completed. When the second sync triggers it will send back information to the phone so that the campaign will not run anymore on the user's phones. If after getting the phone data back and calculating the number of impressions generated, it results in the ad campaign still within the budget, no additional action is necessary. Since it will still be possible that the budget may run out while the ad is still active, the extra ads that are generated can simply be absorbed. On the next sync up, the ad campaign will be updated to reflect how many impressions were generated, when the budget limit was reached, but the merchant will not be charged extra for the additional impressions. By allowing them to see the additional impressions that were generated that was over their budget, they can then adjust their budget accordingly on future campaigns. (Day 2) Once the threshold for time and duration, and even Impressions are met, let the ad run an additional period −1 day, 2 days, etc. but without displaying actual ads to users. For reporting purposes, this allows the merchant to receive "missed" opportunities; if they continued to run the ads, they could have reached those "missed" impressions.

In another Example: Merchant sets a $5000 budge on the campaign, at a CPM cost of $3.97. That should generate 1,259,446 ad impressions: Scenario 1: On day 4, when the nightly feed occurs, the central system receives all the activities for the campaign and finds that the ad has already generated 1,259,500 impressions. That means the campaign has used up the entire budget, so the campaign closes. Scenario 2: On day 4, when the nightly feeds occur, there were only 400,000 ads generated so far. Since it is still below the budget, the ad continues. Scenario 3: On day 4, the campaign had 1,230,000 ad impressions. Since it's still within the budget, the ad continues. Throughout Day 4, it generated another 30,000 impressions. So by the time the Day 5 sync up occurs, it will register 1,260,000 impressions, which would be over the budget. The additional 554 impressions generated are recorded, and the campaign will stop, but the merchant will not be charged for the additional impressions that were generated on the user's phones. If Budget or Duration option is selected, the behavior is the same as Budget or Duration options except that the system just checks for whichever threshold is hit first, the budget or the campaign duration period.

Merchant can click on the "Preview Ad" button anytime to let them see what the notification and the ad would look like on the phone. Once the merchant completes the form, they click "Start Campaign". The merchant can verify that all mandatory fields are populated. If not, do not allow the form to be submitted. If all validations are successful, the new campaign is tagged with Status=Queued. On the next sync, it will be activated.

Figure 17:
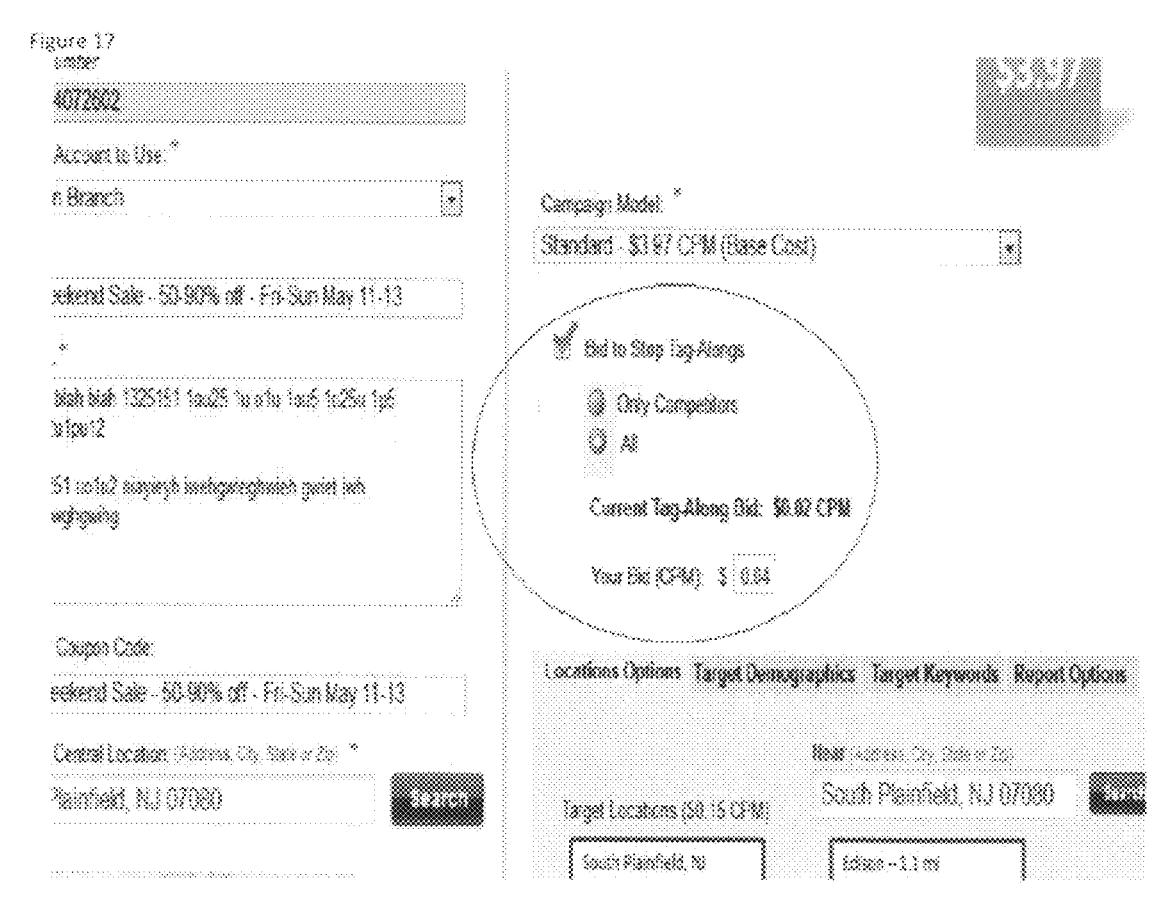

FIG. 17 illustrates a blown-up screenshot of an existing campaign to discourage the tag-along in the Tag-Along Campaign Model. Advantageously, the mobile billboard advertising campaign allows merchants/advertisers to bid/outbid competitors or other advertisers to either stop them from using the Tag-Along Campaign model to "tag-along" their ad campaigns, or bid/outbid them so they can "tag-along". There are two aspects of this bidding feature. First, if a merchant/advertiser is running a campaign and wants to try to avoid a competitor or other advertiser from tagging-along the campaign, the merchant can place a "Stop Tag-Along Bid". On the other hand, if a merchant/advertiser wants to "tag-along", placing a "Tag-Along Bid" will give the merchant a higher possibility of tagging along the campaign with other merchants/advertisers, specially the merchant's competitors. If the "Stop Tag-Along Bid" of a merchant is higher than the "Tag-Along Bid" of a merchant who wants to tag-along, that merchants campaign will not tag-along since the Stop Tag-Along bid is superior. But if the Tag-Along Bid is higher than the Stop Tag-Along Bid, then the merchant who's trying to tag-along will see her/his campaign get tagged-along that other merchant's campaign.

The Stop Tag-Along Bid option preferably appears for the following Campaign Models: Standard, Non-Location and Around the Neighborhood. Merchant/Advertiser selects if the bid is to stop Tag-Alongs of Competitors (those defined in their profiles) or all tag-along attempts. If there are active Tag-Along campaigns that have placed "Tag-Along Bids", the "Current Tag Along Bid" will display that and the minimum "Stop Tag-Along Bid" should be higher than that. If after the campaign goes live, a tag-along campaign bids a higher "Tag-Along Bid" that causes that campaign to tag-along, the merchant can go back to their ad campaign and increase their "Stop Tag-Along Bid". Merchant/Advertiser selects if the bid is to "tag-along" only their competitors (those defined in their profiles) or all. If there are active non-tag along campaigns that have placed "Stop Tag-Along Bids", the "Current Tag Along Bid" will display that and the minimum "Tag-Along Bid" should be higher than that. If after the campaign goes live, a campaign bids a higher "Stop Tag-Along Bid" that stops this campaign to tag-along, the merchant can go back to their ad campaign and increase their "Tag-Along Bid".

For Example: Assumptions: a. There are 20 active ad campaigns. 3 are Tag-Along campaigns, but those 3 didn't make a "Tag-Along Bid", and be in those 20 active ad campaigns, the 3 Tag-Along campaigns would "tag-along" every time an ad from the 17 non-Tag-Along campaigns appears. Merchant A creates a Standard Model campaign (this would then be the $21^{st}$ active campaign). They opt to make a "Stop Tag-Along Bid" of $0.02 CPM. Assume that with that bid, their total CPM would be $4.97. When Merchant A's campaign goes live, their campaign (out of the 18 non-Tag-Along) would not have any tag-alongs because of the "Stop Tag-Along Bid". The other 17 would have, as per the Assumption statement above. Merchant B creates a Tag-Along campaign (this would then be the $22^{nd}$ active campaign, and the $4^{th}$ Tag-Along campaign). They submit a "Tag Along Bid" of $0.04 CPM. Once Merchant B's campaign goes live, their ad would tag-along ALL active campaigns, including Merchant A's, since their "Tag Along Bid" of $0.04 is higher than Merchant A's "Stop Tag-Along Bid" of $0.02. Merchant A would ONLY get Merchant B's ad as the tag-along due to Merchant B's superior Tag Along Bid. Merchant A would not get the tag-along ads of the other 3 tag-along campaigns though since their Stop Tag-Along Bid is superior to the non-bids of those 3 campaigns. Merchant C creates a Standard Model campaign (this would then be the $23^{rd}$ active campaign). In the campaign creation form, it would show that "Current Tag Along Bid" is $0.04 (the highest amount for either Tag-Along Bid or Stop Tag-Along Bid). They make a "Stop Tag-Along Bid" of $0.05. When Merchant C's campaign goes live, their campaign would not get Tag-Alongs due to the superior Stop Tag-Along Bid. Merchant A's would still get a tag-along ad from Merchant B.

Referring back to FIG. 12 regarding Locations Options 5050a, when merchants are creating ad campaigns, they define the target locations they want to run the ad at. They select from a list of locations that are "near" their search criteria. Table values are derived via continuously updating the list based on the following: 1) profiles of end users; 2) target locations from "successful" ad campaigns; 3) Route learning algorithm.

In the configuration settings of the app, the Profiles of End-Users is generated as the end-user inputs his/her "Primary City". This value allows the app to build a basic list of where the app users are located. Since the Primary City can be changed by the end user and is data-entry driven, it is prone to inaccuracies since the value the user entered may not necessarily be their real primary city. Example: If user A was just interested in getting deals around where user A worked, instead of entering user's A Home city as the Primary City, user A would enter his/her work city as the Primary City. All the Primary City values are stored in the Location list table.

In another embodiment, Target Locations from "SUCCESSFUL" Ad Campaigns is utilized in deriving updating of the list. In this embodiment, a merchant can add "New" locations if the ones they want to target are not on the list. These "New" locations are not automatically added to the Location List table. They are only added to the table if the ad campaign generates at least the Minimum Notifications to Add New Location value (see global reference variable) in that target location. For Example: Nike wants to run a campaign in Providence, Rhode Island Providence is currently not on the list of locations, so Nike adds it as a "New" location. When the ad campaign runs, if Nike's ad appears at least 10× within 3 miles of Providence (assume they used the default 3 mile radius criteria), then the system adds Providence to the location list table. If there were 9 notifications and the campaign ends, Providence is not added to the table.

Route learning algorithm tools may be used to derive location data and update the location list. Since the app continuously queries an end-user's location to determine if they are in range of running ad campaigns, the queried location information can be used to create a route profile for each user. This doesn't mean the app will store all location information. Each user will typically go through the same routine almost on a regular basis. For example: Home→Stops along the way such school drop-offs, etc→Work→Lunch, errands, etc→Home. By allowing the app to "learn" this common pattern, a list of locations can be generated that the end-users typically utilize, which would essentially be the most valuable location values that advertisers/merchants would want.

Figure 18:
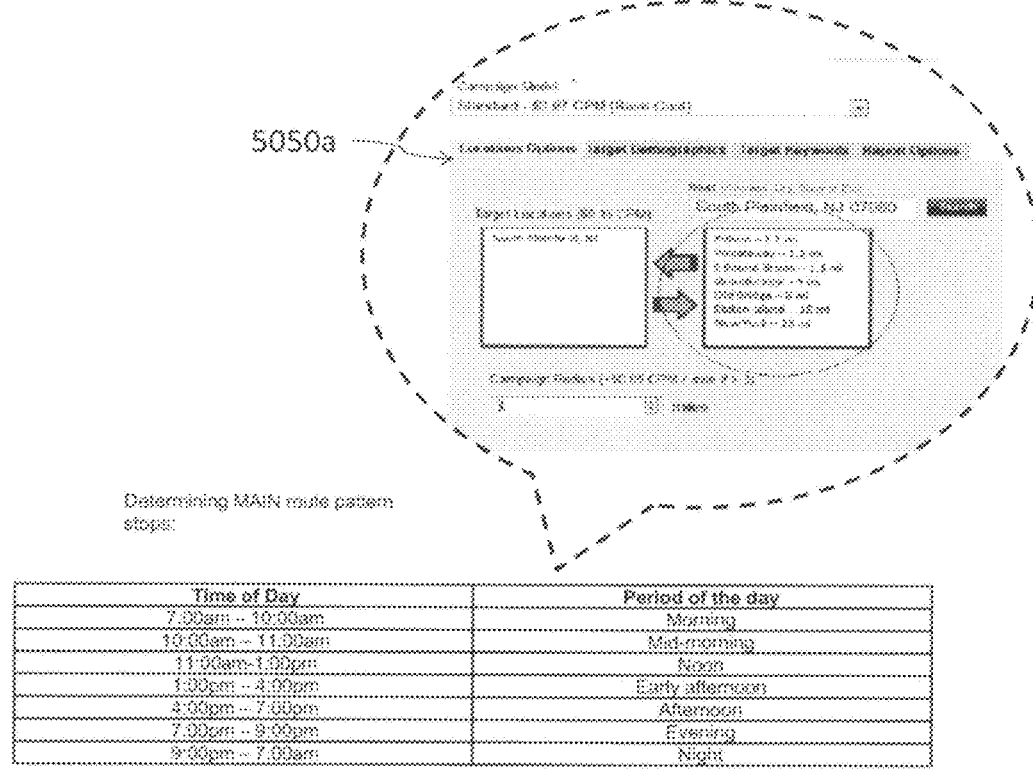
FIG. 18 illustrates a table of determination of periods of the day extrapolated by way of a route learning algorithm for determining main route pattern stops.

FIG. 18 illustrates a table of determination of periods of the day extrapolated by way of a route learning algorithm for determining main route pattern stops. FIGS. 51a-51h show a sample route pattern determined via a route learning algorithm extrapolated in FIG. 18.

Referring to FIGS. 18 and 51a-51h, the subject app continuously queries an end-user's location to determine if he/she is in range of running ad campaigns. Accordingly, the app can use the queried location information to create a route profile for each user. However, all location information is not necessarily stored. Rather, a common pattern is stored based on each user's typical daily routine. For example: Home→Stops along the way such school drop-offs, etc→Work→Lunch, errands, etc→Home. By allowing the app to "learn" this common pattern, it can build a list of locations that the end-users typically go to, which would essentially be the most valuable location values that advertisers/merchants would want. The algorithm determines main route pattern stops, such as HOME and WORK locations as the MAIN route stops. To classify as HOME or WORK, the user will repeatedly be in that same location for at least the "Main Route Qualifier" field (refer to global variables table) for five consecutive days. During the training cycle, if the system uses actual time values to compare if the user is in the same location today, tomorrow, and the next day, it will never create a "realistic" route pattern since most likely, there will be time differences when the user is at that location (i.e. he leaves for work at 7:00 am today, but leaves at 7:15 tomorrow, so where he is at 7 am today is not where he is at 7:15 tomorrow, etc). To allow for these variances, the training day is broken into "periods of the day", rather than the actual clock time. For Day 1, the system will not factor the "periods of the day" for determining main route patterns. Instead, the system software will just consider that if a user is within the same location for at least the "Main Route Qualifier" field for consecutive days, then that location is considered a Main route location and will be added to the Location List. Periods of the day will be considered at a future release. On application download, set the following: DayCounter A=0; DayCounter B=0; Learning Period=0; CounterA=0; CounterB=0; Learning Period Start=7:00 am; Learning Period End=4:00 am; LearningPeriodFlag A=0; LearningPeriodFlag B=0; MainLocationA=null; and MainLocationB=null. Check the phone's clock. If clock="Learning Period Start", set "LearningPeriodFlag A"=1 and DayCounterA=DayCounterA+1. The app is simultaneously in learning mode together with running the main MOBORD logic. This signals the app to start learning the route pattern of the user for the day. The app's learning period is 7 am-4 am local time daily.

As long as LearningPeriod FlagA=1 and clock is not Learning Period End: Refer to how the app polls for location above. During the "learning" cycle, after checking if the current polled location satisfies active ad campaigns criteria, the app records the user location, together with Period of the day. Record the location as DayLocationA, and CounterA=CounterA+1. {DayLocationA would be the location the app is sampling and testing to see if the user will be staying there for a long period of time to consider it a viable location}. On the next location poll, if the user's location is still the same as the last polled location, OR is WITHIN 1 mile of the last polled location, CounterA=CounterA+1. This means the user is still within the same location as previously polled, so the counter—CounterA that keeps track how many location polls have occurred and the user is still in the same location—is incremented. If the new location is not the same, or is MORE THAN 1 mile from the last polled location, DayLocationA=new location, and reset CounterA=0. Since the user is in another location already, the system software resets the location sample and the counter and start checking again how long that user would be in this new location. If CounterA="Main Route Qualifier"/"Location Check Interval", this means that the conditions to consider DayLocationA as a MAIN route location has been satisfied for the day's training period. Once the counter hits the qualifier value, meaning the user has stayed in the same location for that period of time, then the location becomes a viable value to consider to be added to the Location List. Next, the system software checks to determine if MainLocationA has been set: If MainLocationA=null, MainLocationA=DayLocationA, CounterA=0. If MainLocationA is NOT equal to null: If DayLocationA is equal to MainLocationA: {This means that the app has recorded the same location pattern from the previous day}; Do nothing. If DayLocationA is NOT equal to MainLocationA: This means that the app recorded that the user is in a location that can be considered a Main route location but since it's different from what was recorded previously, it will reset the location values and set this as the new location value to "train" and the training starts all over again for this location. MainLocationA=DayLocationA; DayCounter A=1; LearningPeriodFlag A=0; CounterA=0; Go to Step 4. In Step 4, since the condition for DayLocationA has been satisfied, the app will now shift to learning about DayLocationB. The app continues to query the user's location, and if the user is still in the same location after Step 3d above, do nothing. If clock=Learning Period End and CounterA<"Main Route Qualifier"/"Location Check Interval", this means the condition to classify DayLocationA as a MAIN route location has NOT been satisfied for that day. The following are reset: CounterA=0; LearningPeriodFlag A=0; Go to check to see if both locations' criteria to be added to Location List have been satisfied. Since the condition for DayLocationA has been satisfied, the app will now shift to learning about DayLocationB. The app continues to query the user's location, and if the user is still in the same location after Step 3d above, do nothing. On the next location poll, if the new location is not the same as the old location or is MORE THAN 1 mile from the last polled location, and clock is not Learning Period End: LearningPeriodFlagB=1; DayLocationB=new location, and CounterB=CounterB+1; DayCounterB=DayCounterB+1.

As long as LearningPeriodFlagB=1 and clock is not Learning Period End: On the next location poll, if the user's location is still the same as the last polled location, OR is WITHIN 1 mile of the last polled location, CounterB=CounterB+1. If the new location is not the same, or is MORE THAN 1 mile from the last polled location, DayLocationB=new location, and reset CounterB=0. If CounterB="Main Route Qualifier"/"Location Check Interval", this means that the conditions to consider DayLocationB as a MAIN route location has been satisfied for the day's training period. Check to see if MainLocationB has been set: If MainLocationB=null, MainLocationB=DayLocationB. Go to LearningPeriodFlag B=0.

If MainLocationB is NOT equal to null: If DayLocationB is equal to MainLocationB: (This means that the app has recorded the same location pattern from the previous day); DayCounter B=DayCounter B+1. If DayLocationB is NOT equal to MainLocationB: This means that the app recorded that the user is in a location that can be considered a Main route location but since it's different from what was recorded previously, it will reset the location values and set this as the new location value to "train" and the training starts all over again for this location. MainLocationB=DayLocationB; DayCounter B=1; LearningPeriodFlag B=0; CounterB=0; and Since the condition for DayLocationB has been satisfied, the app considers the training for the day completed.

If clock=Learning Period End and CounterB<"Main Route Qualifier"/"Location Check Interval", this means the condition to classify DayLocationB as a MAIN route location has NOT been satisfied for that day. The following are reset: CounterB=0; LearningPeriodFlagA=0; LearningPeriodFlagB=0; and check to see if both locations' criteria to be added to Location List have been satisfied.

Since the condition for DayLocationB has been satisfied, the app considers the training for the day completed. Check to see if both locations' criteria to be added to Location List have been satisfied: If DayCounter A="Days to Tag as Main Location", LearningPeriodFlag A=2; If DayCounter B="Days to Tag as Main Location", LearningPeriodFlag B=2; If LearningPeriodFlag A AND LearningPeriodFlag B is not equal to 2: Repeat from Step 2 above. If LearningPeriodFlag A AND LearningPeriodFlag B is equal to 2: Add MainLocationA AND MainLocationB to the Locations List table.

For Example: To qualify as HOME or WORK, user has to be in the same location for 4 hours straight everyday for 5 consecutive days; Main Route Counter=240←minutes (4 hours); Location Check Interval=10←user's location is polled every 10 minutes; Route Pattern Sampling=5←number of consecutive days. User A routine: Home at Old Bridge, NJ He typically leaves at 8 am for work. He stops to drop off the kids in school 4 miles away in East Brunswick, NJ Typically arrives at the school 8:15 am. Then drives an additional 8 miles and arrives at work in Woodbridge, NJ by 9:00 am. He then leaves work at 5 pm and arrives back home by 6 pm. Looking at Day 1 tab of the sample spreadsheet via FIG. 18 this assumes the user just downloaded the app, so Day 1 would be the first time the app starts the learning process. The app starts learning at 7:00 am. The user is still at home in Old Bridge, so Counter A starts increasing. At the 8:10 am poll, the user is outside of the 1 mile radius from Old Bridge, so the counter resets, and keeps resetting for the next couple of polls since the user is moving. At 9 am, the user arrives in the office and stays there for the duration of the day. Since there is no change in location, Counter A meets the required count of 24 polls (4 hours/10 minute polls=24 polls) at fpm. At that point, Woodbridge NJ becomes a candidate for the Location List table, so is tagged as MainLocationA. The app then starts looking for Location B, but that doesn't happen until there is a change in the location, so the learning period for Location B only starts at 3 pm when the user leaves the office. The same learning process applies for Location B, and in the example, that happens at 7:50 pm when the app detects the user being in the Old Bridge location for 24 consecutive polls. Old Bridge is tagged as a candidate for the Location List table (MainLocationB). Though the learning process doesn't end until 4 am, since the app has completed and identified MainLocationA and MainLocationB before that, the learning period flags are turned off (LearningPeriodFlagA and LearningPeriodFlagB=0) to indicate to the app to stop the learning process for the day. At 7 am the following day, the app initiates the learning cycle again and goes through the same process to confirm if the locations it has learned the previous day are the same as the new day. So for the Day 2 and Day 3 tabs of the spreadsheet, assume the user ran the same routine at the same time. At the end of Day 2 and Day 3, the app would find Woodbridge and Old Bridge as the main locations again that satisfy the criteria, so the DayCounters are incremented. As the DayCounters get closer to the target number of days (5 days), the more it will confirm the route pattern. To show that variances in time will not impact the learning process and that the user will most likely follow the same route pattern, refer to Day 4. The user leaves the house the same time, at 8 am, but stays longer in Edison NJ for a meeting (from 8:40 am to 10:20 am). The counter starts tracking the Edison location, but since it doesn't satisfy the criteria of 24 polls (user was there only for 10 consecutive polls), it won't consider Edison as a location candidate. When the user reaches the Woodbridge location, even though for Day 4, that doesn't start until the 10:40 am poll, it will still capture Woodbridge as a candidate since the 24 poll criteria will still be met, at a much later time. The same holds true with the Old Bridge location. At the end of Day 4, Woodbridge and Old Bridge would still be listed as the main locations.

Assume again that the regular pattern applies for Day 5. So at the beginning of Day 6 (see Day 6 tab) training at 7 am, the consecutive days criteria is satisfied, so the LearningPeriodFlags for A and B are set to 2, to indicate to the app to add MainLocationA and MainLocationB to the Location List table. At that point, the learning process for that user stops. The function does not execute again until a MANUAL trigger is initiated, either by a change in the Primary City value on the user's phone, or sent by the main MOBORD cloud application.

The Learning Locations A and B are independent of one another. The conditions to meet the criteria for Location A could be met already, but the ones for B might not, or vice versa, but that shouldn't stop the app from adding the location that was successfully "learned" onto the Locations List table. Locations must meet the "consecutive" days criteria. In the example above, if the user didn't go to work on Day 3, that means the condition for Location A (Woodbridge) would not have been satisfied. So on Day 4, the DayCounterA value resets to 1 to indicate that the learning for Location A restarts again. In the Location List table, add an indicator to distinguish a "learned" location vs. locations from successful campaigns vs. Primary City values from user profiles.

Figure 19:
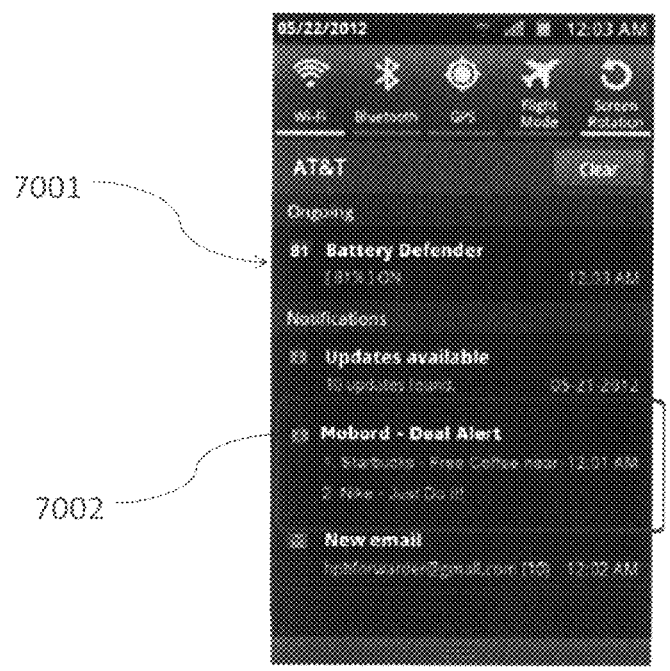
FIG. 19 illustrates a view of a Smartphone with the mobile billboard message app interface, showing Popup Notifications notification screen

FIG. 19 illustrates a view of a Smartphone with the mobile billboard message app interface 7001, showing Popup Notifications 7002. When an ad campaign is satisfied, thus sending the ad to the user's mobile phone, notifications are generated on the mobile device to alert the user. Standard notification features of the Smartphone platform are used. The header text of the notification is "MOBORD—Deal Alert Near You Now". It would then list the ad campaigns just satisfied. It doesn't show old alerts (user can access old alerts in the Deals Summary when they open the app). In the example, it lists two campaigns, since two were satisfied during the last query. The order of the listing is based on the Ranking Bids value set on the ad campaign. If there are more than one (1) ad campaign that is satisfied by the query, the app checks the Ranking Bids value of each campaign to determine the sorting order in the Notifications and Deals Summary. The higher the Ranking bid value of the campaign, the higher the position of the ad is displayed in the notification and the Deals summary. The order is based on the Ranking Bids field, not the Total CPM. So if in the screenshot, Starbucks placed a Ranking Bid of $0.05, and Nike did not, even if Nike's Total. CPM is higher than Starbucks, Starbucks is listed first since they paid extra to position themselves higher on the list. If there are no Ranking bids on the campaigns, the sorting order will be based on proximity to the position of the user—Closest to Farthest If after determining proximity the distance is equal, sorting order will be based on Total CPM.

When the user clicks on the notification, the MOBORD app is launched and the current alert is displayed (Deals Summary→Around Me Now). Day 2—add options in the CPI pricing model to allow campaigns to pay more to highlight their campaigns, aside from Ranking (i.e. Bolded, flagged, etc). Day 2 (if easy, let's try to package with Day 1)—The MOBORD notification alert should be a distinct chime/audio sound so that the user distinguishes it from other mobile notifications.

When the app initially opens, a launch screenshot is displayed. The launch screen is displayed for the duration of the app initialization. Launch screen should be displayed for at least 2 seconds (if app initialization completes before 2 seconds). App initialization should not be more than 4 seconds. After the launch screen, the default display is the Deals Summary→Around Me Now screen.

Figure 20:
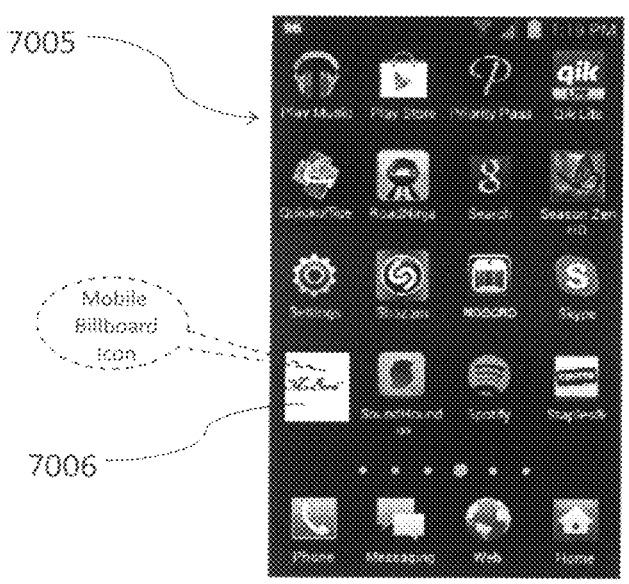
FIG. 20 illustrates an example screenshot on a Smartphone display of the User Interface.

FIG. 20 illustrates an example screenshot on a Smartphone display of the User Interface. The Screen Display 7005 after Launch Screen depends on the action of the user to trigger the app to launch. If the app is launched directly by selecting the mobile billboard app 7006, the Deals Summary→Around Me Now is the default screen that is displayed. If the app is launched by clicking a notification: a. If there is only one deal listed in the notification, then the Deal Detail screen for that deal is displayed on the app Main Screen; or b. If there are more than one deals listed in the notification, then the Deals Summary→Around Me Now screen is displayed.

Figure 21:
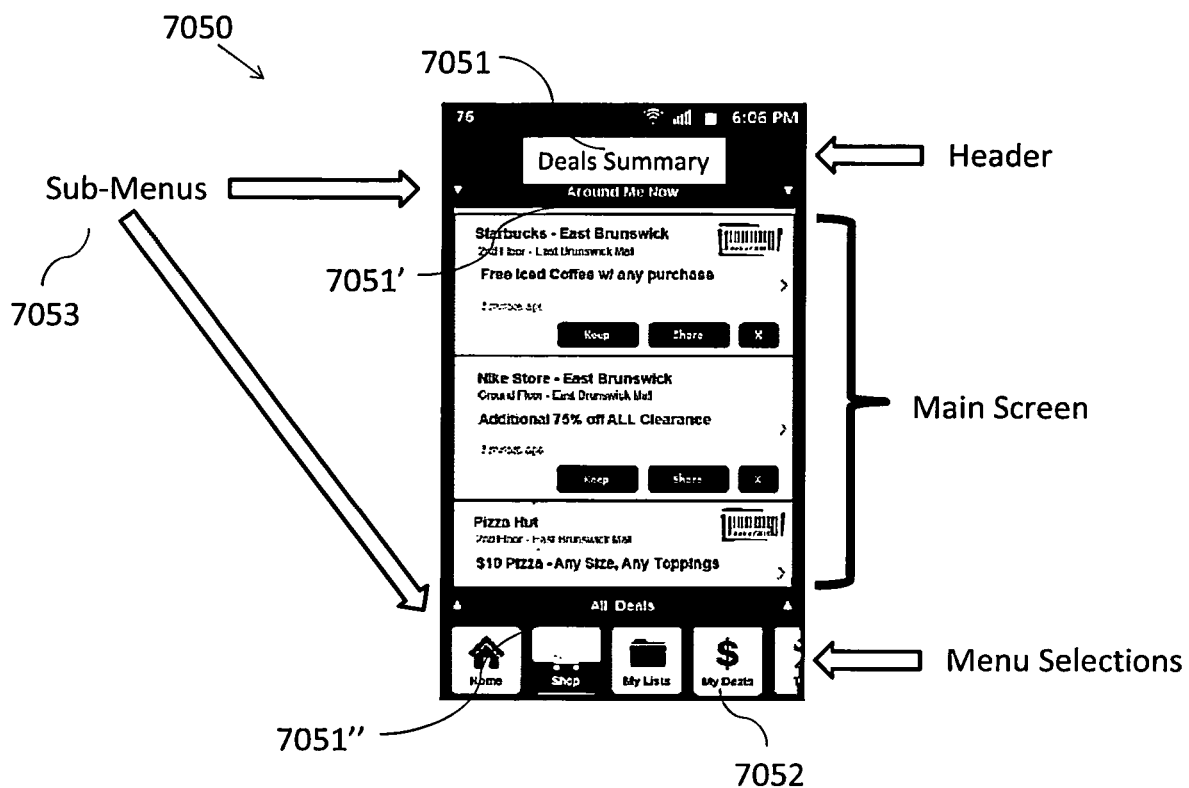
FIG. 21 illustrates an example screenshot of the apps display of the user's interface on a Smartphone display of the User Interface illustrating "Deals Summary"

FIG. 21 illustrates an example screenshot of the apps display of the user's interface on a Smartphone display of the User Interface illustrating "Deals Summary", shown generally at 7050. Screen Components include menu selection, providing the main navigation facility of the app. The button selected by the user drives what is displayed in the Main Screen. The user can scroll left to right or right to left to sift through the button choices. The Menu Selections preferably include (from left to right): a) Deals Summary 7051; b) My Deals 7052; c) Find (not shown); d) Profile (not shown); e) Settings (not shown); and f) Refresh—which provides the user the ability to refresh their Deals list data. Deals Summary 7051 provides the "Home" option and displays the Deals Summary screen. When the user selects from the Menu Selections apps, the Main Screen displays the content of that selection. The Header displays the name of the selected menu to allow the user to know which screen is currently active. Sub-Menus 7053 provide the user additional choices to browse within their selection. Depending on the selection, there may or may not be sub-menus. As an example, if the Deals Summary app is selected, Deals Summary 7051 has 2 sub-menus→Around Me Now 7051' and All Deals 7051". In the user selected Settings, there are no sub-menus displayed. As in the screenshot above, a user picks a sub-menu by dragging the sub-menu header. In the example, Around Me Now is displayed. If they want to see the All Deals list, the user would drag the All Deals sub-menu header up. That would collapse the Around Me Now screen and expand the All Deals screen. The main screen area of the app is where the details are displayed.

Figure 22:
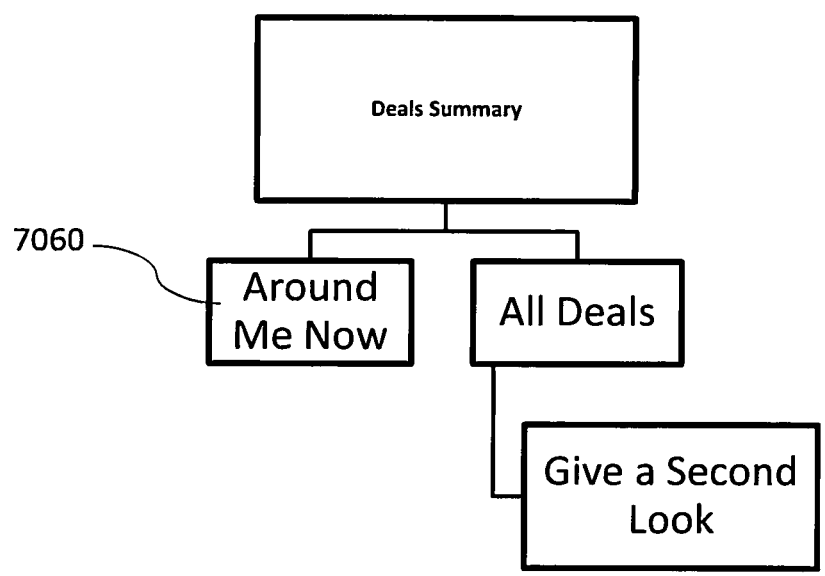
FIG. 22 illustrates a flow chart of a sub-menu for a Menu Selection of the app.

FIG. 22 illustrates a flow chart of a sub-menu for a Menu Selection. In the flow chart, Around Me Now 7060 refers to the default screen to display when the Menu Selection is selected.

Figure 23:
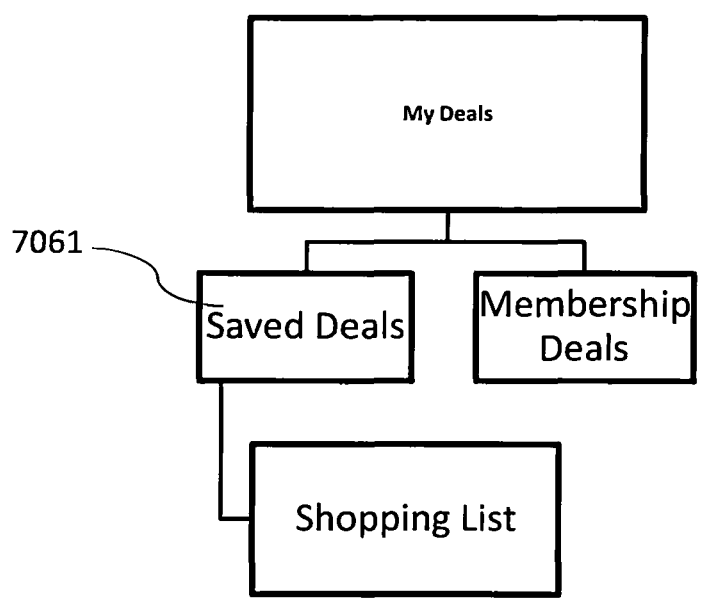
FIG. 23 illustrates a flow chart of a sub-menu for a Menu Selection of the app.

FIG. 23 illustrates a flow chart of a sub-menu for a Menu Selection. In the flow chart, Saved Deals 7061 refers to the default screen to display when the Menu Selection is selected.

Figure 24:
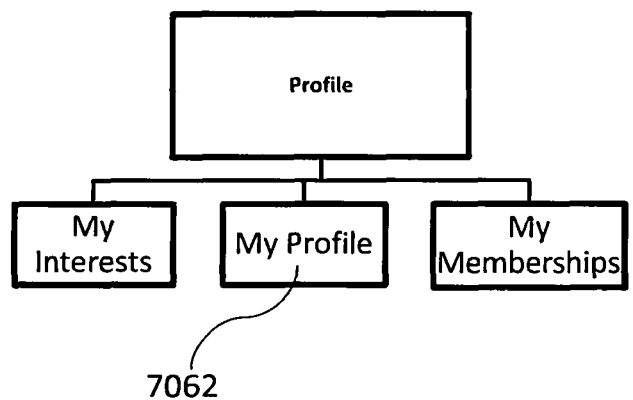
FIG. 24 illustrates a flow chart of a sub-menu for a Menu Selection of the app.

FIG. 24 illustrates a flow chart of a sub-menu for a Menu Selection. In the flow chart, My Profile 7062 refers to the default screen to display when the Menu Selection is selected.

Figure 25:
FIG. 25 illustrates a screenshot of the apps display of the user's interface on a display of a Smartphone or table or mobile device, showing the "Around Me Now" screen display of the "Deals Summary"

FIG. 25 illustrates a screenshot of the apps display of the user's interface on a display of a Smartphone or table or mobile device, showing the "Around Me Now" screen display of the "Deals Summary". Around Me Now 7050' lists all the campaigns that matched the user's profile criteria. Around Me Now 7050' will only display campaigns that are still within the radius set by the user in their "Around Me Now" Settings. The list is sorted based on ranking first; see Ranking Bids set forth herein above. After the Ranking Bids are satisfied, additional sorting is based on distance from the user. As in the sample screenshot below, it also tells the user how long ago they received the notification for the deal. If the deal has expiration, it will also display the expiration date of the promotion/deal. It does not display expired deals, even if the ad campaign is still active. If the app detects that the campaign ad is expired (promotion code date expired, etc), the system places the ad, campaign in hold status and alerts the merchant/advertiser via email. This will allow the merchant/advertiser to either update the ad material by revising the expiration date, or cancel the ad campaign. It will also ensure that no stale campaign is displayed to end-users, thus avoiding the end-users to lose interest or dislike the app due to outdated deals.

The list is filtered and displays only those that satisfy the selection of the user, i.e. distance. Around Me filters based on the Around Me Now function. 5 miles—lists campaigns within 5 miles of the user's current location; 10 miles—within 10 miles of the user's current location; greater >10 miles—lists campaigns that are more than 10 miles from current location. All Deals preferably have a sub-menu. If selected, it lists all non-expired campaigns that the user deleted (clicked the black X button). It follows the same sorting as how All Deals and Around Me Now deals are sorted.

Figure 26:
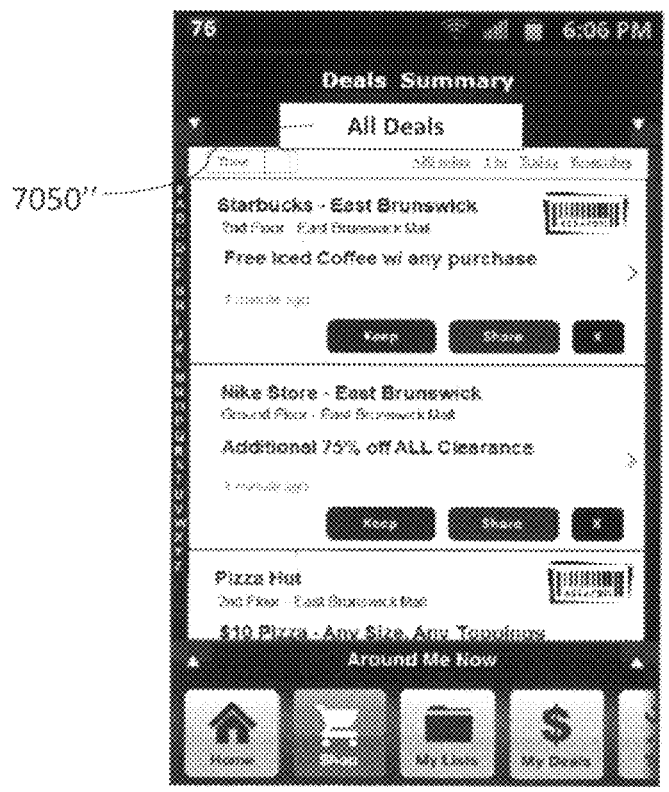
FIG. 26 illustrates a screenshot of the apps display of the user's interface on a display of a Smartphone or table or mobile device, showing the "All Deals" screen display of the "Deals Summary"

FIG. 26 illustrates a screenshot of the apps display of the user's interface on a display of a Smartphone or table or mobile device, showing the "All Deals" screen display of the "Deals Summary". All Deals 7050" refers to the Around Me Now details above since it's similar, except it lists all non-expired campaigns that matched the user's profile criteria, even those that are outside the Around Me Now radius set by the end-user in their Settings. Since the All Deals 7050" list can be extensive, the user can quickly find a specific store/deal by the Alphabetical shortcut to the left of the Main Screen. This is similar to how you can quickly search for a contact in your directory. Selecting a letter will display only the Stores/establishment that begins with that letter. The system includes the ability to reset the All Deals 7050" function so that user can see the full list again. The slider at the top of the Main Screen allows the user to filter the list based on Time or Distance. By default, as indicated above, the sorting follows the Ranking bid logic, so when the user slides the All Deals Sub-Menu, the list is sorted that way. Using the slider does not change the sorting order. It just filters the list based on the criteria selected.

Figure 27:
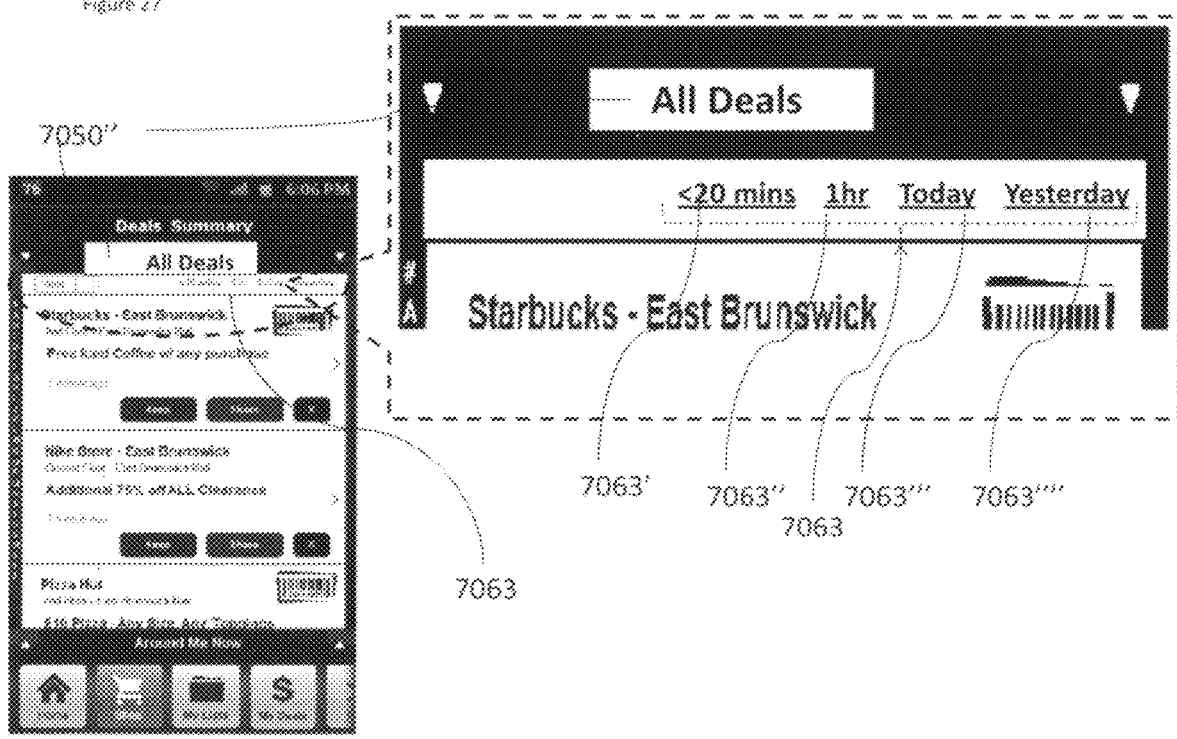
FIG. 27 illustrates a blow-up of a Time section of the screenshot of FIG. 26 on a display of a Smartphone or table or mobile device, showing the "All Deals" screen display of the "Deals Summary"

FIG. 27 illustrates a blow-up of a Time section of the screenshot of FIG. 26 on a display of a Smartphone or table or mobile device, showing the "All Deals" 7050" screen display of the "Deals Summary". A Time 7063 list is displayed. Time 7063 is filtered and preferably will display only those that satisfy the selection of the user. Time <20 mins 7063' filters the list to only display deals that came in within the last 20 minutes. This is the default filtering when the Time option is selected from the slider. Time 1 hr 7063" filters only those that came in within the last 60 minutes. Time Today 7063''' filters only those that came in within the current day, based on the user's time zone. Example: If the user picks this option and it's 3 pm where he is, then it will display the list from 12:01 am-3:00 pm of that date. If it's 5 am, it will display the list from 12:01 am-5:00 am of that date. Time Yesterday 7063'''' filters deals from the previous day. Example: If it's 3 pm Tuesday where he is, then it will display the list from 12:01 am-11:59 pm Monday. If it's 12:01 am Tuesday, it will still display the list from 12:01 am-11:59 pm Monday.

Figure 28:
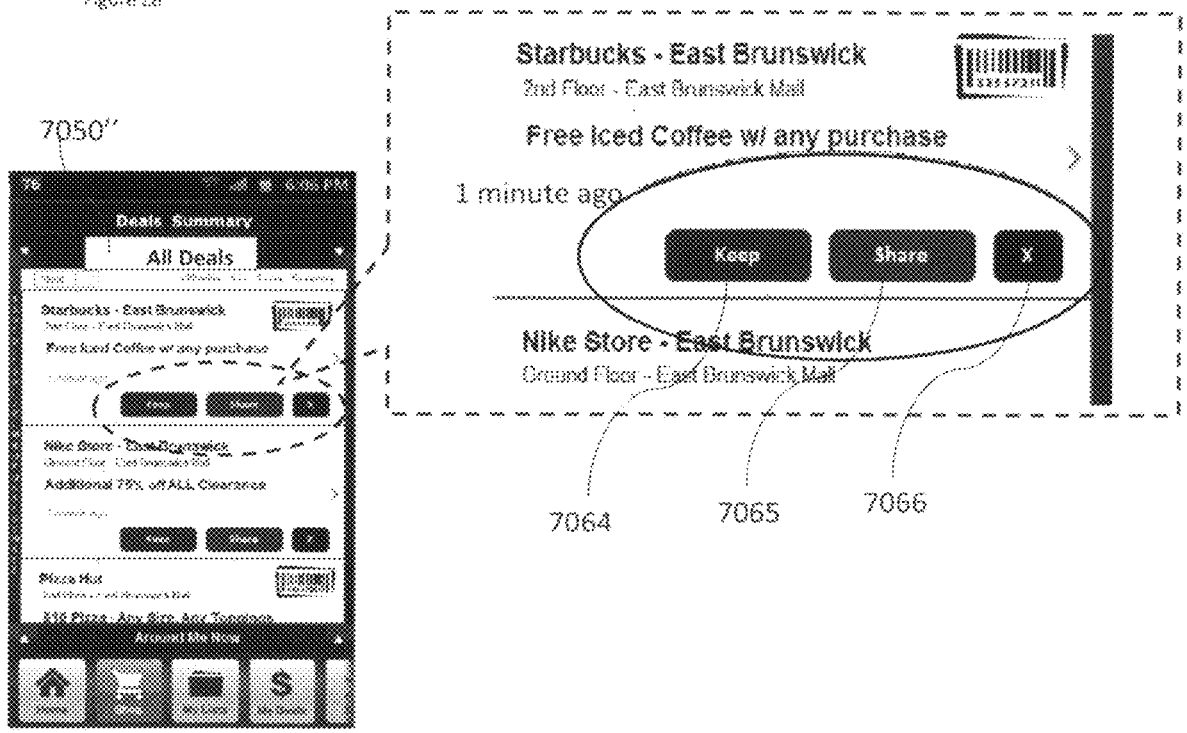
FIG. 28 illustrates a blow-up of a Keep, Share, X actions of the screenshot of FIG. 26 on a display of a Smartphone or table or mobile device, showing the "All Deals" screen display of the "Deals Summary"

FIG. 28 illustrates a blow-up of a Keep, Share, X actions of the screenshot of FIG. 26 on a display of a Smartphone or table or mobile device, showing the "All Deals" 7050" screen display of the "Deals Summary". When a Deal is displayed, a user can select KEEP 7064, SHARE 7065 and X 7066 options. These options allow the user to take action on what they want to do with the deals. If the user is viewing the list from the Deals Summary, each ad entry has the 3 buttons available. The user can easily take action on each ad by clicking a button. Keep 7064 ads the ad deal to the user's My Deals list. After the action, the Keep 7064 button is replaced with a button labeled "Added" (for example, a grey colored button). This provides a visual notice to the user that they've already added the deal in their My Deals list. The Added or grey colored button is disabled. It's just a visual representation. Alternatively, the Added or grey colored button can be enabled for further actions.

The X 7066 button removes the deal from the current list view and on any other list view—Around Me Now, All Deals, My Deals. It may add the deal to a "Give A Second Look" sub-menu. If the "Prompt" checkbox is selected in the "Delete Deal Confirmation" options under Settings, display a popup message "You might be losing out on this deal.

Continue?" User has to pick Yes to delete. No closes the popup and returns the user to the list. If the "Prompt" checkbox is not selected, there is no popup message and the deal is removed immediately.

The "GIVE A SECOND LOOK" feature presents the same look and feel and function as the all Deals sub-menu, but lists only ads deleted by the user. The ads still have the Keep and Share buttons, but not the X button. If the user clicks Keep, it will follow the same action described above for Keep. If the user clicks Share, it will follow the same action described above for Share. If the ad campaign is done, or when the deal expires, remove the ad from the list.

Figure 29:
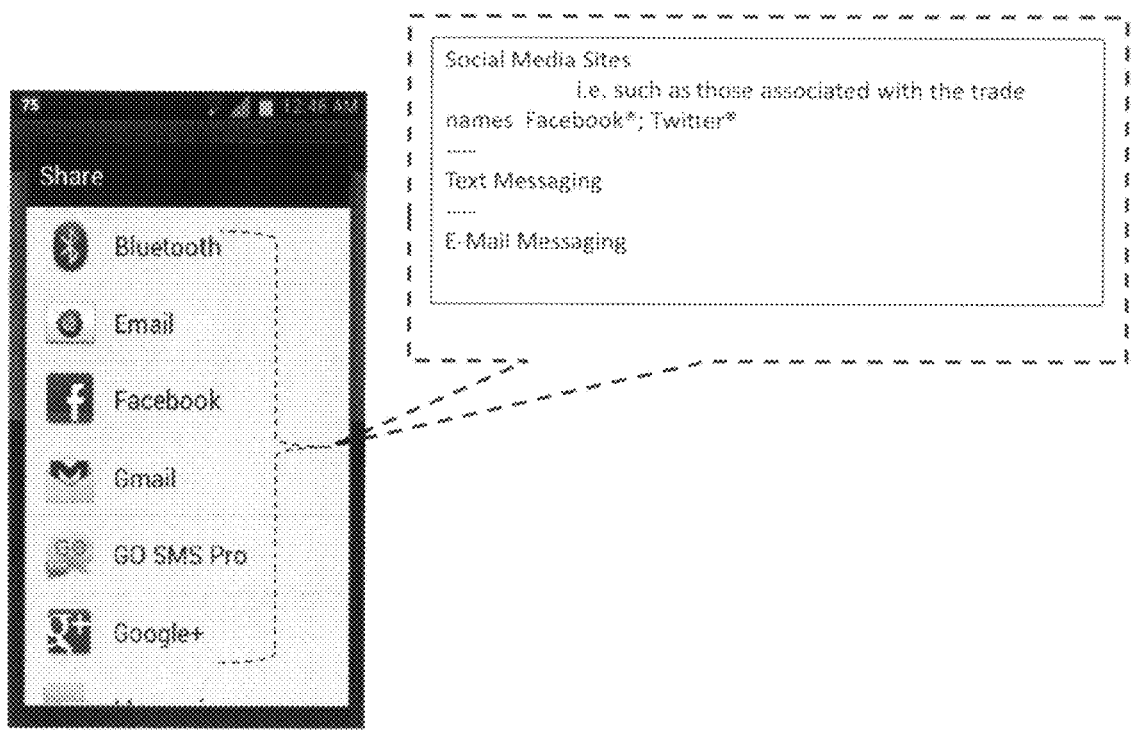
FIG. 29 illustrates a Share screenshot of the apps display of the user's interface on a display of a Smartphone or table or mobile device.
Figure 30:
FIG. 30 illustrates a screen shot wherein the social media site associated with the trade name Facebook® is utilized.
Figure 31:
FIG. 31 illustrates a screen shot wherein the social media site associated with the trade name Twitter® is utilized.
Figure 32:
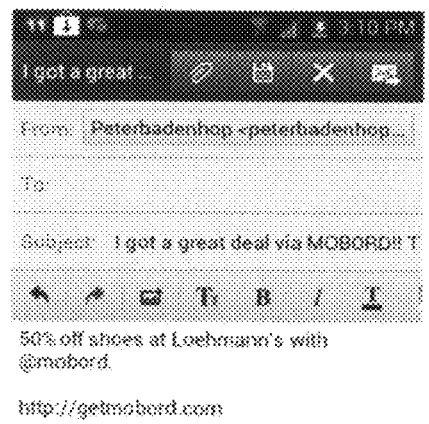
FIG. 32 illustrates a screen shot wherein E-mail is utilized.
Figure 33:
FIG. 33 illustrates a screenshot wherein text messaging is utilized.

FIG. 29 illustrates a Share screenshot of the apps display of the user's interface on a display of a Smartphone or table or mobile device. When Share 7065 is selected, a networking display is invoked, such as for example a share function as illustrated on a display of a Smartphone associated with the trade name Android Share function. The user selects which app medium to use to share details of the deal to friends, etc. FIGS. 30-34 illustrate Sharing on different social media sites and/or via email or text messaging. Specifically, FIG. 30 illustrates a screen shot wherein the social media site associated with the trade name Facebook® is utilized. FIG. 31 illustrates a screen shot wherein the social media site associated with the trade name Twitter® is utilized. FIG. 32 illustrates a screen shot wherein E-mail is utilized. Subject=I got a great deal via MOBORD!! Thought you might be interested too. Body={Ad campaign Title} with @mobord. http://getmobord.com. FIG. 33 illustrates a screenshot wherein text messaging is utilized. Text Body=Found this great deal. {Ad Campaign Title} with @mobord. http://getmobord.com. If the "Share and Keep" option is enabled in the Settings (see Settings), the deal will also be added to the My Deals list when the Share button is clicked. Track the number of shares done by the user. This data will be used to develop a future Cashback program where users are rewarded for sharing deals to their friends. The more shares, the faster to reach a cash back reward.

Figure 34:
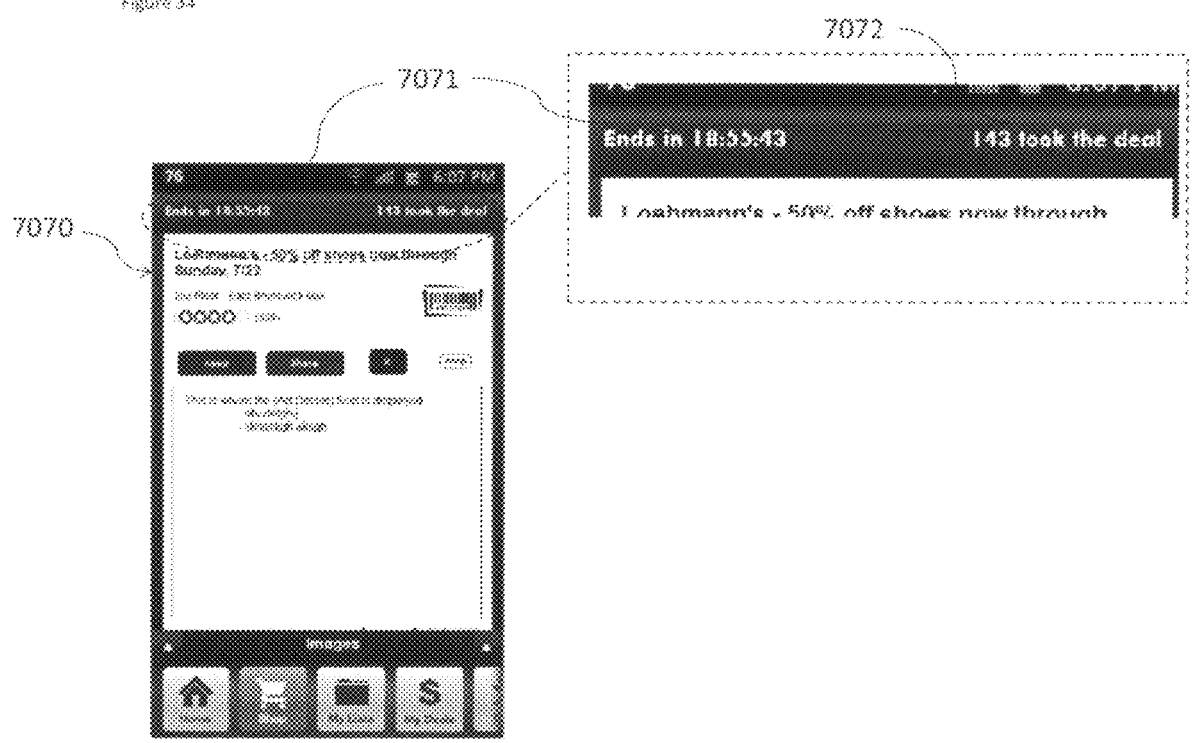
FIG. 34 illustrates an Ad Campaign Details Screen, with a blow-up of the end time.

FIG. 34 illustrates an Ad Campaign Details Screen, with a blow-up of the end time. If the notification displays only a single ad campaign, when the user clicks the notification to view details, they are taken directly to the Ad Campaign Details Screen 7070. From the Deals Summary, clicking an ad from the list will bring up the Ad Campaign Details Screen. The Ad Campaign Details Screen 7070 provides more details about the ad campaign such as the Ad Details, user community ratings, etc. The look and feel of the screen can be adjusted without departing from the scope of the invention. A Header 7071 displays how much time left before the deal ends at 7072 and how many users have taken the deal at 7073. "Coupon expires in HH:MM:SS"-HH:MM:SS is a countdown clock, displayed only if there is the ad campaign has a Coupon/Discount Code. If the Coupon Code has no expiration (Expiration field is blank), do not display. "XX took the deal"—the count is the number of users who clicked "Keep" and placed the deal in their "My Deals" list. Unless the count is equal or greater than the "Took the deal" variable (refer to the global configuration variables table) it is generally not displayed. If both the expiration and took the deal displays are not visible, the header section shows "MOBORD".

Figure 35:
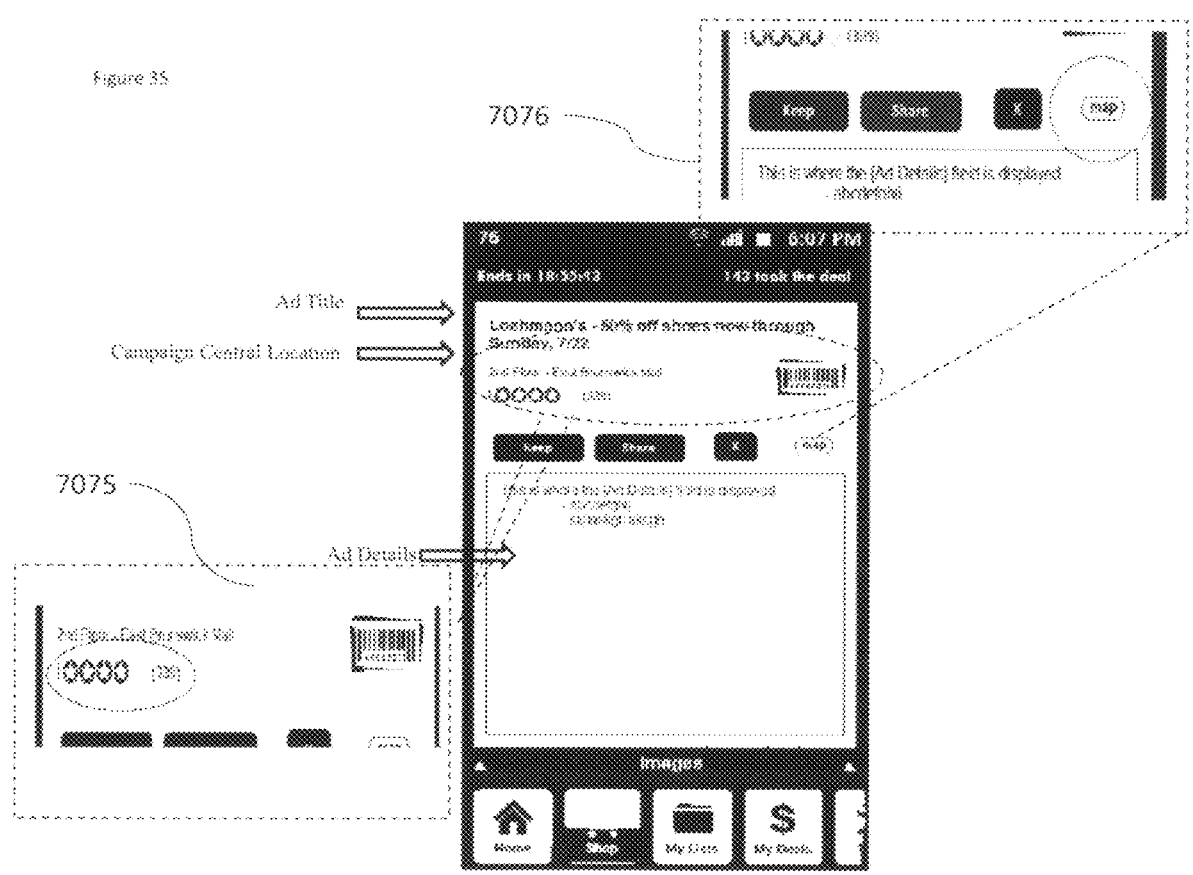
FIG. 35 illustrates an Ad Title, Ad Details and Campaign Central Location fields screen, with a blow-up of a Rating and Map functions.

FIG. 35 illustrates an Ad Title, Ad Details and Campaign Central Location fields screen, with a blow-up of a Rating and Map functions, at 7075 and 7076, respectively.

Figure 36:
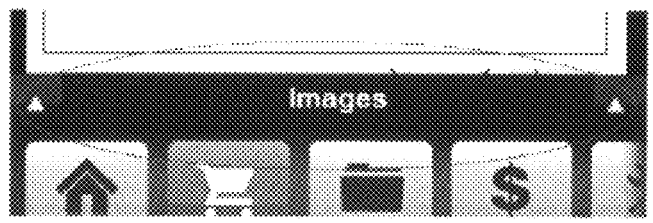
FIG. 36 illustrates an Images field screen.

FIG. 36 illustrates an Images fields screen. Images submenu—if selected, displays images of the ad deal. These images were uploaded by the merchant during the ad campaign creation.

Figure 37:
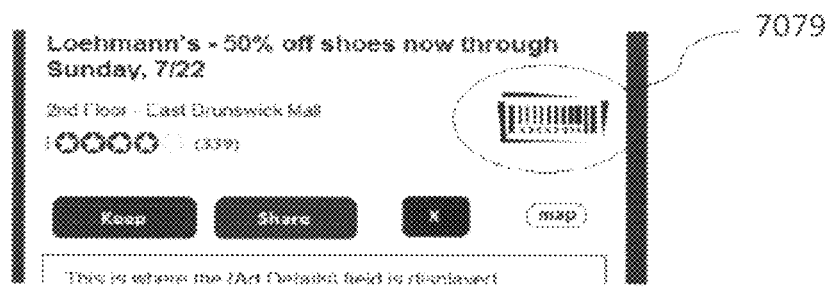
FIG. 37 illustrates a bar scanner and/or coupon code field screen.
Figure 38:
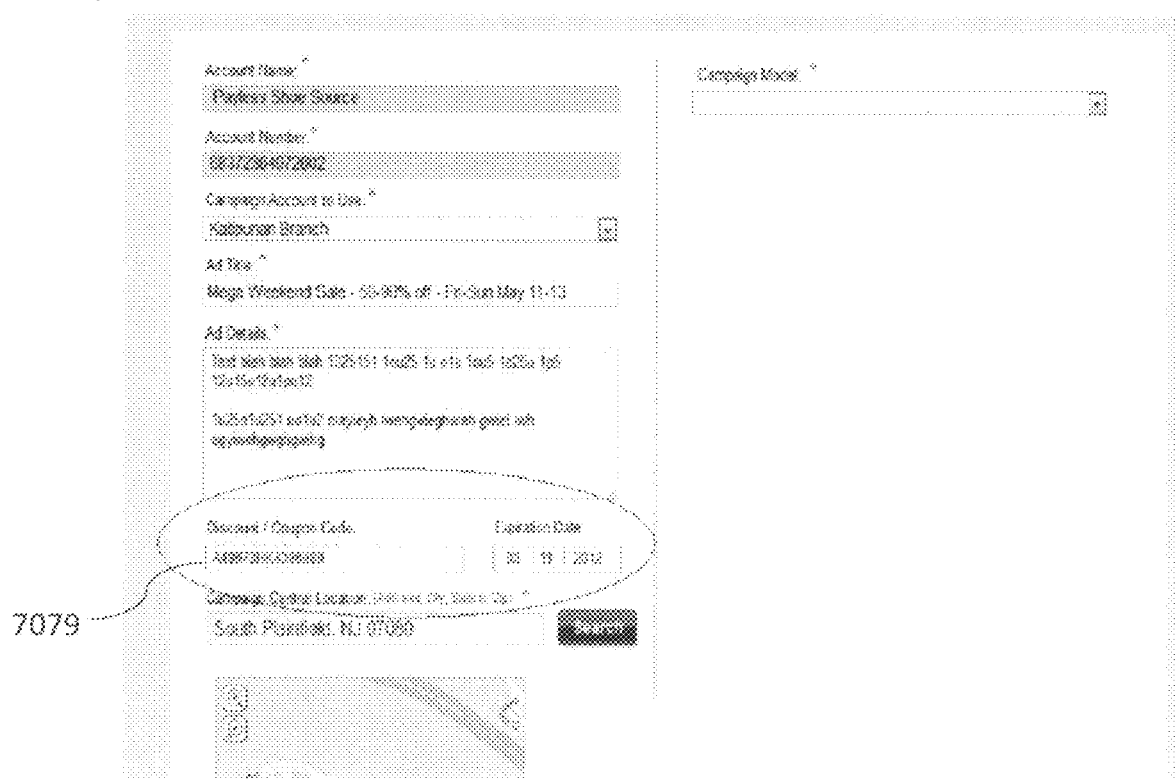
FIG. 38 illustrates a screenshot of the web site wherein the merchant/advertiser is inserting a coupon code field.

FIG. 37 illustrates a bar scanner and/or coupon code field screen. FIG. 38 illustrates a screenshot of the web site wherein the merchant/advertiser is inserting a coupon code field. In referring to FIGS. 37 and 38, Coupon/Discount Code 7079 refer to the Coupon/Discount Code section below for details. Coupon/Discount Code 7079 is created when the advertiser creates the ad campaign. When creating the ad campaign the merchant/advertiser has the option of adding a coupon code/discount code that their target audience can use to avail of the ad campaign's deal. The coupon code value the advertiser provides is a value that can be typed in or scanned (if it's the barcode image) at the advertiser's location or at an online store and it is a valid code that the advertiser's system accepts. Preferably, the number of times the coupon code is used is tracked without needing integration with the advertiser's external system to send back a return value to indicate the code has been used. If the ad campaign's Discount/Coupon Code 7079 field is populated, it displays the barcode image on the ad. This lets the user know that there is a coupon they can use.

Figure 39:
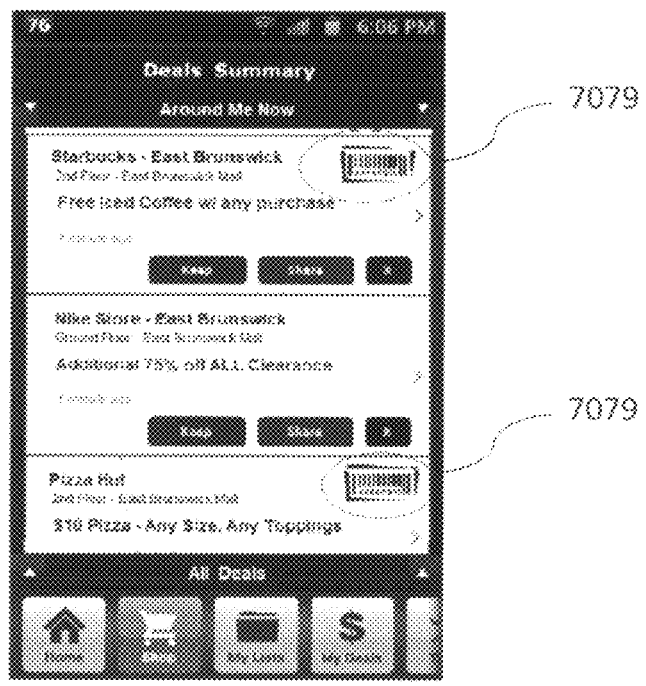
FIG. 39 illustrates a screenshot of the apps display of the user's interface display on a Smartphone (or mobile device) illustrating a Coupon/Discount Code.
Figure 40:
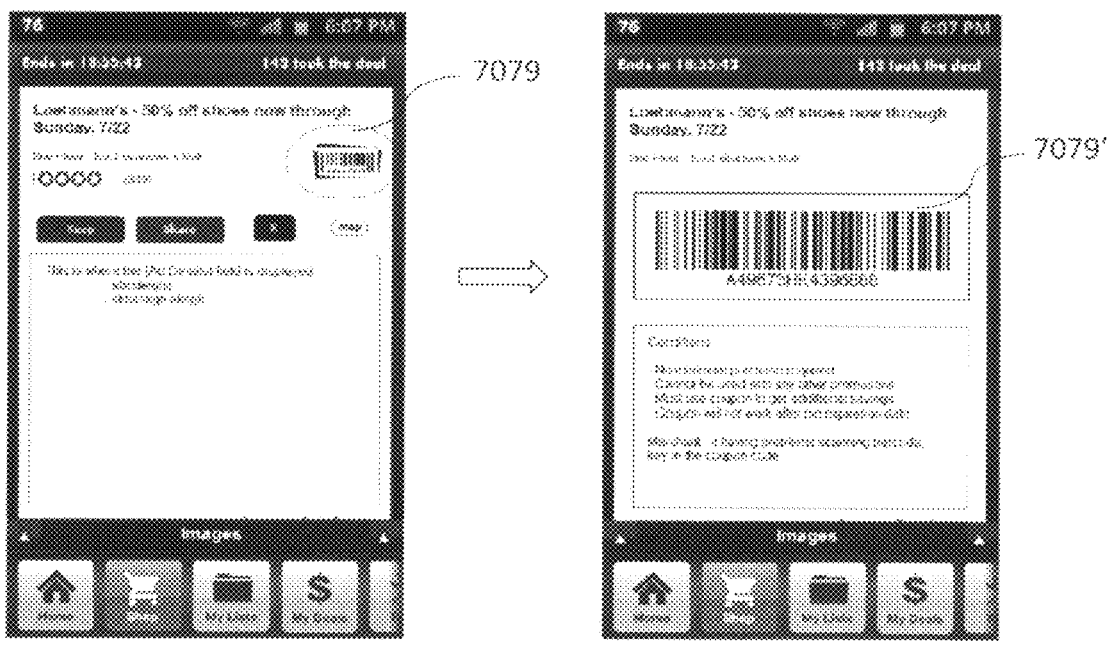
FIG. 40 illustrates a screenshot of the apps display of the user's interface display on a Smartphone (or mobile device) illustrating a Coupon/Discount Code.

FIGS. 39 and 40 illustrate screenshot displays on a Smartphone (or mobile device) illustrating a Coupon/Discount Code. If the Expiration Date occurs, the barcode Coupon/Discount Code 7079 is hidden. If the user clicks the barcode image to access the Discount/Coupon Code 7079 a screen is generated as shown in FIG. 40 at 70790'. A standard UCC barcode image is generated based on the discount code value by utilizing existing barcode generator algorithms, such as that utilized by trade names such as Android. From the Discount/Coupon Code screen, the user clicks on the BACK key of the phone to return to the previous screen. As a general functionality of the app, clicking the BACK key allows the user to go back to the previous screen.

FIG. 41 illustrates a screenshot display on a Smartphone (or mobile device) My Deals, as well as blow-up features of the screenshot, including Shopping List and Auto Populate functions. Saved Deals are presented essentially with the same look and functionality of the Deals Summary except it lists ONLY deals that the user "kept" through clicking the KEEP action button from a deal. Deals that are expired or the campaign has ended are removed from the view. The user can Share or click the X button to remove from the list. The user is allowed the ability to "tag" deals so that they go into a "Shopping List" 7080, which is essentially just a filtering criterion to limit the view to only show the "Shopping List". When the user selects "Shopping List" 7080 from the slider, the view updates to display those deals that the user tagged onto the Shopping List. An "Auto-populate" link 7081 also appears on the top section of the screen. This option appears ONLY if "Shopping List" is selected. In operation, when the Auto-populate link is clicked the app queries the user's current location. It then checks the "Saved Deals" list for campaigns that are within the radius of the current location. The radius is defined by the "auto-populate radius" variable (see global variables table). All deals on the Saved Deals list that are within the radius are automatically added to the Shopping List view. The Shopping List 7080 view refreshes to reflect the newly added deals to the list. The list is sorted by distance to the current location. Any deals that were on the shopping list prior will be kept on the list, but will most likely be at the bottom of the list due to them being farthest from the current location. If a deal is found by the auto-populate and was already on the shopping list, do not display a duplicate entry. The previous entry would just be re-sorted based on distance from the current location. The list does not automatically update again until the user clicks on the Auto-populate link again.

Membership Deals are provided through the system. Membership Deals are essentially the same look and functionality of the Deals Summary except it lists ONLY membership program deals to which the user is a member of. By default, when the user accesses this view, it lists ALL membership program deals. They can filter the list to only show those for a specific membership program by picking the name of that store/program from a dropdown menu. The dropdown menu will only lists names/programs for which the user has indicated they are a member in their profile settings. For Example: In the user's profile settings, they added a shopping plus card, such as under the trade name Shoprite Price Plus club, and store membership programs, such as that under the trade name Costco, as Membership programs. When a Costco ad campaign specific to their members runs, the user will get a notification of that deal and it will appear in the Membership Deals view. When Shoprite runs their own membership ad campaign, and displays 30 ads, those will show up in the Membership Deals view as well. If the user only wants to see the Costco deals, they pick Costco from the dropdown menu on the Membership Deals view and the list will only display the Costco deal. The dropdown menu will only list Shoprite and Costco since those are the only ones set for the user's profile settings. If another store, such as for example that under the trade name Walmart, ran a membership ad campaign, the user won't get that since they didn't indicate in their profile settings that they are a member of that Walmart program.

FIG. 37 illustrates a bar scanner and/or coupon code field screen. FIG. 38 illustrates a screenshot of the web site wherein the merchant/advertiser is inserting a coupon code field. FIGS. 39 and 40 illustrate screenshot displays on a Smartphone (or mobile device) illustrating a Coupon/Discount Code. FIG. 41 illustrates a screenshot display on a Smartphone (or mobile device) My Deals, as well as blow-up features of the screenshot, including Shopping List and Auto Populate functions. FIG. 42 illustrates a Global Configuration Variables Table utilized by the subject system and method software.

FIG. 43 illustrates a Campaign Model Table utilized by the subject system and method software.

FIG. 44 illustrates a Campaign Radius Table utilized by the subject system and method software.

FIG. 45 illustrates a Gender Table utilized by the subject system and method software.

FIG. 46 illustrates a Marital Status Table utilized by the subject system and method software.

FIG. 47 illustrates a Number of Children Table utilized by the subject system and method software.

FIG. 48 illustrates a Target App User Age Count Table utilized by the subject system and method software.

FIG. 49 illustrates a Children Age Count Table utilized by the subject system and method software.

FIG. 50 illustrates a Pricing Table utilized by the subject system and method software.

FIGS. 52a-52e show an embodiment of a pricing model of the subject mobile billboard messaging app method. A "Pricing Model" is provided set up in the Primary Campaign Setup (can only select one of the ff), including a 1) Standard (one location, max radius 3 miles); 2) Broadcast (send to all, no other criteria); 3) Non-location campaign (can select anything except location options); 4) Tag-along (broadcast. Attach to random active campaigns); 5) Tag-along (broadcast. Attach to random active campaigns); and 6) Around the Neighborhood (pick a Primary City, max radius 3 miles). The pricing model allows for base cost determination as well as bids and tag along features.

Advantages are rendered through practice of the mobile billboard messaging system and method of the present invention. These and other advantages include, for example:
1) empowers advertisers, either directly or indirectly (through advertising agencies), to deliver advertisement to potential customers through target advertising notifications on the customers' Smartphones;
2) attracts and excites a diverse audience of smart phone users with a new mobile application that will allow them to receive notifications and alerts on discounts, promotions, and savings specific to their hobbies, likes, and/or selections;
3) advertisers are capable of creating and running their own ad campaigns using their web browser;
4) a data warehouse is established with a robust reporting tool that captures vital usage data that can benefit advertisers when analyzing general customer habits and buying behavior to create more effective ad campaigns;
5) provides users/consumers with real-time promotions based on user's specific interests selected by the user and correlated with the location of the user to increase prospects that the advertisement will result in a sale.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. In connection with a mobile billboard messaging app including a computer database electronically storing merchant/advertiser and user information in communication with a software application running in a mobile device of the user, the mobile device having a determined location means, a display screen and Internet connectivity, the mobile billboard messaging app being operative to establish an Internet connection between the device and the mobile billboard messaging app software, a method comprising the steps of:
  a. providing a mobile billboard messaging app associated with software for download on at least one device that provides entry of user preferences associated with a user of the device;
  b. providing entry means for at least one ad campaign to be entered by at least one advertiser on the computer database for electronically storing at least one message;
  c. providing a radial distance entry means for determining a given radial distance from at least one location associated with at least one of the advertisers associated with said message;
  d. communicating with the device to determine the user's device location;
  e. determining if the user's device location is within the given radial distance from at least one location associated with at least one of the advertisers associated with said message;
  f. checking to determine if at least one user preference correlates with the message within the given radial distance from the location;

g. displaying a notification of the message on the device;
h. the Internet connection between the device and the mobile billboard messaging app software being automatic and the location being periodically refreshed;
i. the message being generated after a preselected period of time upon entry within the given radial distance;
j. the message being displayed on the device when the device is within a radius of a location associated with the message;
k. said selection of the mobile billboard messaging app being operative to establish an Internet connection between the device and the advertiser, thereby scanning the GPS location and providing the message related to the user's preferences within the given radial distance range from the advertiser's location;
l. said location identifying technology being operative to run on the background of said device and leverage the device network connection, first checking whether GPS of the device is on and executing same, however if the GPS is off then determining location via cellular location cell tower communication; and
m. said mobile billboard messaging app being operative to (i) detect whether the mobile device has a battery-saving application for turning off GPS or cellular connectivity, and (ii) display a notification on said display screen that the mobile billboard messaging app will not work since the battery-saving application is inhibiting determination of location information, whereby the message is triggered when the device enters within the given radii from the advertiser or when an event is activated by the system, and when triggered provides relevant advertisements for purchase of goods and services of the advertisers or sponsors related to the user preferences.

2. The method for providing a mobile billboard messaging app as recited by claim 1, wherein the device is a mobile phone or Smartphone.

3. The method for providing a mobile billboard messaging app as recited by claim 1, wherein the device is a mobile tablet.

4. The method for providing a mobile billboard messaging app as recited by claim 1, wherein no fee is paid by the user of the device.

5. The method for providing a mobile billboard messaging app as recited by claim 1, wherein a fee is paid by said user of said device for a premium account with said system, wherein said premium account includes advanced functionality associated with said user preferences.

6. The method for providing a mobile billboard messaging app as recited by claim 1, wherein said location identifying technology comprises GPS technology.

7. The method for providing a mobile billboard messaging app as recited by claim 1, wherein said location identifying technology comprises cell tower location technology.

8. The method for providing a mobile billboard messaging app as recited by claim 1, wherein the given radial distance ranges from about 2 miles to 30 mile radius.

9. The method for providing a mobile billboard messaging app as recited by claim 1, wherein the given radial distance ranges from about 5 miles to 20 mile radius.

10. The method for providing a mobile billboard messaging app as recited by claim 1, wherein the given radial distance ranges from about 3 miles to 10 mile radius.

11. The method for providing a mobile billboard messaging app as recited by claim 1, wherein said radius is a home location radius set relative to said user's home location.

12. The method for providing a mobile billboard messaging app as recited by claim 1, wherein said radius is a personal radius set relative to the mobile device itself.

13. The method for providing a mobile billboard messaging app as recited by claim 1, wherein said radius is an advertiser's radius (advertiser's circle; or campaign radius) set by the advertiser wherein the advertiser can control the display of the ad based on the advertiser's deal local radius.

14. The method for providing a mobile billboard messaging app as recited by claim 1, wherein a logic includes three separate radius logics comprising: 1) Radius one: is a home location radius set relative to said user's home location; 2) radius two: a personal radius set relative to the mobile device itself; and 3) radius three: an advertiser's radius (advertiser's circle; or campaign radius) set by the advertiser wherein the advertiser can control the display of the ad based on the advertiser's deal local radius in relation to either radius one or radius two.

15. The method for providing a mobile billboard messaging app as recited by claim 1, wherein the message is an advertisement for goods or services.

16. The method for providing a mobile billboard messaging app as recited by claim 1, wherein the message is a promotional message.

17. The method for providing a mobile billboard messaging app as recited by claim 1, wherein the user preferences comprise gender, age, hobbies, and interests.

18. The method for providing a mobile billboard messaging app as recited by claim 1, wherein said advertiser message comprises promotions, deals and/or coupons.

19. The method for providing a mobile billboard messaging app as recited by claim 1, wherein said location identifying technology provides global positioning location via longitude and latitude.

20. The method for providing a mobile billboard messaging app as recited by claim 1, wherein said Internet connection between said device and said mobile billboard messaging icon software for downloading data onto said device is provided by way of a data feed execution.

21. The method for providing a mobile billboard messaging app as recited by claim 1, wherein a data feed execution is set to automatically take place at least once during a 24 hour period.

22. The method for providing a mobile billboard messaging app as recited by claim 1, wherein said radius is a Home Location Radius based on a user's home location or selected location.

23. The method for providing a mobile billboard messaging app as recited by claim 1 comprising at least one Campaign Radius.

24. The method for providing a mobile billboard messaging app as recited by claim 1 comprising an alert radius based on said mobile device location.

25. The method for providing a mobile billboard messaging app as recited by claim 1, wherein the mobile billboard messaging app system provides an audible alert when the user is within the given radial distance range and the user preferences are matched with the advertiser's location.

26. The method for providing a mobile billboard messaging app as recited by claim 1, wherein the mobile billboard app message app website and the main database reside in a high-availability hosted environment, such as Cloud services.

27. The method for providing a mobile billboard messaging app as recited by claim 1, wherein the ad data includes ad details, merchant names, campaign radius, number of impressions, and target audience criteria.

28. The method for providing a mobile billboard messaging app as recited by claim 1, wherein the ad campaign data is sent to the mobile billboard mobile application by way of regular nightly feeds.

29. The method for providing a mobile billboard messaging app as recited by claim 1, wherein upon starting the method, the advertiser/merchant logs in to a mobile billboard website and selects a Create Ad Campaign link, wherein the advertiser completes a New Ad Campaign to create the Ad Campaign form link, and wherein the New Ad Campaign is downloaded to the mobile application on a next feed cycle.

30. The method for providing a mobile billboard messaging app as recited by claim 1, wherein a first level of navigation is provided that generates a notification window that pops-up or alerts the user when the app detects the user's device within a location range having active ad campaigns, and wherein a second level of navigation is provided that displays the messages as deals.

31. The method for providing a mobile billboard messaging app as recited by claim 1, wherein a first level of navigation is provided that generates a notification window that pops-up or alerts the user when the app is triggered, and wherein the first level navigation includes tabs having the ability to launch the application and display deals, store or keep deals, or delete or ignore deals.

32. The method for providing a mobile billboard messaging app as recited by claim 1 comprising a deals summary link setting forth the messages to the user.

33. The method for providing a mobile billboard messaging app as recited by claim 32, wherein the deals summary link includes all active and non-expired deals.

34. The method for providing a mobile billboard messaging app as recited by claim 1 comprising a settings preference tab link wherein the user can configure preferences, such as demographic information, preferred stores, hobbies, and interests.

35. The method for providing a mobile billboard messaging app as recited by claim 1 comprising a merchant "Home Page" with links to a "Dashboard" tab, "Create Campaign" tab, "Account" tab, "Register" tab, "How it Works" tab, "For Consumers" tab, and a "Help" tab.

36. The method for providing a mobile billboard messaging app as recited by claim 35, wherein the "Dashboard" tab includes active campaigns, current running ad campaigns, past campaigns, completed campaigns and canceled campaigns, and report tools.

37. The method for providing a mobile billboard messaging app as recited by claim 1, wherein the method includes linking to social media links, email and text messaging tools.

38. The method for providing a mobile billboard messaging app as recited by claim 1, wherein only registered advertisers can create ad campaigns, wherein the creation of the campaign includes an electronic fill-able form having an Account Number associated with the advertiser corresponding to the advertiser's account name, ad Title to be displayed to the user(s) in the popup notification on the mobile device, Ad Details, a Discount/Coupon Code entry, Campaign Central Location entry, ad campaign reference point for defining campaign radius, and a Campaign Model which determines the whole logic if an ad is displayed to a user or not.

39. The method for providing a mobile billboard messaging app as recited by claim 1, wherein at a minimum, each registered merchant/advertiser must have at least one Campaign Account.

40. The method for providing a mobile billboard messaging app as recited by claim 1 comprising at least one Campaign Model including a Standard Model.

41. The method for providing a mobile billboard messaging app as recited by claim 1 comprising at least one Campaign Model including a Non-location Campaign Model.

42. The method for providing a mobile billboard messaging app as recited by claim 1 comprising at least one Campaign Model including a Tag-Along Campaign Model.

43. The method for providing a mobile billboard messaging app as recited by claim 1 comprising at least one Campaign Model including a Around the Neighborhood Campaign Model.

44. The method for providing a mobile billboard messaging app as recited by claim 1 comprising at least one Campaign Model including a Tag-Along Campaign Model Bidding "War".

45. The method for providing a mobile billboard messaging app as recited by claim 44, wherein the Tag-Along Campaign Model Bidding "War" allows merchants/advertisers to bid/outbid competitors or other advertisers to either stop them from using the Tag-Along Campaign model to "tag-along" their ad campaigns, or bid/outbid them so they can "tag-along".

46. The method for providing a mobile billboard messaging app as recited by claim 44, wherein the event triggering activation of the system includes checking to determine if at least one user preference correlates with the message without regard for the device location.

* * * * *